US007916177B2

(12) United States Patent
Motomura et al.

(10) Patent No.: US 7,916,177 B2
(45) Date of Patent: Mar. 29, 2011

(54) IMAGE-CAPTURING APPARATUS, IMAGE-CAPTURING METHOD AND PROGRAM FOR DETECTING AND CORRECTING IMAGE BLUR

(75) Inventors: Hideto Motomura, Kyoto (JP); Takeo Azuma, Kyoto (JP)

(73) Assignee: Panasonic Corporation, Osaka (JP)

(*) Notice: Subject to any disclaimer, the term of this patent is extended or adjusted under 35 U.S.C. 154(b) by 249 days.

(21) Appl. No.: 12/375,316

(22) PCT Filed: Aug. 1, 2008

(86) PCT No.: PCT/JP2008/002087
§ 371 (c)(1),
(2), (4) Date: Jan. 27, 2009

(87) PCT Pub. No.: WO2009/019848
PCT Pub. Date: Feb. 12, 2009

(65) Prior Publication Data
US 2010/0231731 A1    Sep. 16, 2010

(30) Foreign Application Priority Data
Aug. 3, 2007 (JP) .............................. 2007-203674

(51) Int. Cl.
*H04N 5/228* (2006.01)
(52) U.S. Cl. .................................. 348/208.4
(58) Field of Classification Search ............... 348/208.4, 348/208.6, 208.3; 382/255
See application file for complete search history.

(56) References Cited

U.S. PATENT DOCUMENTS

| 7,619,655 B2 * | 11/2009 | Kondo et al. ............... 348/208.4 |
| 2003/0011717 A1 | 1/2003 | McConica |
| 2004/0066981 A1 | 4/2004 | Li et al. |
| 2005/0243178 A1 | 11/2005 | McConica |
| 2006/0280249 A1 | 12/2006 | Poon |

(Continued)

FOREIGN PATENT DOCUMENTS

JP    2506469    6/1996
(Continued)

OTHER PUBLICATIONS

Supplementary European Search Report issued Mar. 18, 2010 in corresponding European Application No. 08790351.4.

(Continued)

*Primary Examiner* — Jason Chan
*Assistant Examiner* — Gary C Vieaux
(74) *Attorney, Agent, or Firm* — Wenderoth, Lind & Ponack, L.L.P.

(57) ABSTRACT

In an image-capturing apparatus and image-capturing method which can, in electronic image blur correction, correct camera motion-caused blurring occurring in one frame, an image-capturing apparatus (100) includes: a first picture feature amount transforming unit (104) transforming picture feature amount of input picture (117); a blur detecting unit 105 detecting blurring by evaluating input picture feature amount (118) chronologically; a blur synthesizing unit (107) artificially causing blurring in blur-free image-captured picture (129) by using blur model (124), and generating blur-synthesized picture (130); a blur removal picture feature amount replacement table unit (110) for replacing picture feature amount of a blurred picture with picture feature amount of a blur-free picture; and a closest-picture feature amount detecting unit (113) outputting, as blur-removed picture feature vector picture (133), picture feature amount of a blur-free image-captured picture that pairs with picture feature amount closest to picture feature amount of input picture feature amount (118).

14 Claims, 38 Drawing Sheets

U.S. PATENT DOCUMENTS

| | | |
|---|---|---|
| 2007/0086675 A1 | 4/2007 | Chinen et al. |
| 2007/0098292 A1 | 5/2007 | Batur |
| 2007/0165961 A1 | 7/2007 | Lu |
| 2007/0177817 A1 | 8/2007 | Szeliski et al. |
| 2010/0013991 A1* | 1/2010 | Miyazaki et al. ............ 348/452 |

FOREIGN PATENT DOCUMENTS

| | | |
|---|---|---|
| JP | 2003-78812 | 3/2003 |
| JP | 2007-109235 | 4/2007 |

OTHER PUBLICATIONS

Michal Sorel et al., "Space-Variant Restoration of Images Degraded by Camera Motion Blur", IEEE Transactions on Image Processing, IEEE Service Center, Piscataway, NJ, vol. 17, No. 2, Feb. 2008, pp. 105-116, XP011198660.

International Search Report issued Sep. 22, 2008 in the International (PCT) Application of which the present application is the U.S. National Stage.

* cited by examiner (a)

(b)

Picture feature vector(w1, w2,···, wp)
P = 3n + 1

(a)

(b)

(a)

(b)

(a)

(b)

(a)

(b)

Direction of motion vector

FIG. 21

| Memory address portion 220 | Data portion 221 | | |
|---|---|---|---|
| | Input picture 117 | Time code 222 | Blur detection identification signal 119 |
| 00 | $x_1$ $y_1$ $R_{11}$ $G_{11}$ $B_{11}$ | 13:05:25 | 0 |
| 01 | $x_1$ $y_2$ $R_{12}$ $G_{12}$ $B_{12}$ | 13:05:25 | 0 |
| 02 | $x_1$ $y_3$ $R_{13}$ $G_{13}$ $B_{13}$ | 13:05:25 | 1 |
| ⋮ | ⋮ | ⋮ | ⋮ |
| ⋮ | ⋮ | ⋮ | ⋮ |
| FFFFFF | $x_i$ $y_i$ $R_{ij}$ $G_{ij}$ $B_{ij}$ | 13:10:25 | 0 |

(a)

(b)

(c)

IMAGE-CAPTURING APPARATUS, IMAGE-CAPTURING METHOD AND PROGRAM FOR DETECTING AND CORRECTING IMAGE BLUR

TECHNICAL FIELD

The present invention relates to an image-capturing apparatus, image-capturing method and program which remove blurring which occurs in image-capturing.

BACKGROUND ART

In recent years, the densification of imaging devices is advancing, and there has been a significant increase in the level of high-definition and miniaturization of digital video cameras and digital still cameras. When the element-density of an imaging device increases, the surface area of light-collecting elements decreases, and a long exposure time becomes necessary to ensure Signal-to-Noise (SN) ratio. Since image blur occurs when the camera position moves during exposure, an image-capturing person takes measures such as steadying the camera on a tripod or steadying his arms in the case of a hand-held camera, in order to keep the camera from moving.

In order to reduce the burden of image blur prevention on the image-capturing person, models in which the camera is equipped with an image blur correction function have been brought to practical use. The basic idea is to detect the motion of the camera and obtain image-captured pictures so as to cancel out such motion. The specific method for canceling out camera motion can be broadly classified into two, namely, "electronic" and "optical". The electronic-style cancels out image blur using a method of clipping out a part of an image-captured picture and moving the clip-out position in the opposite direction of the camera motion.

FIG. 34 is an explanatory diagram describing an example of the electronic image blur correction function.

For example, as shown in FIG. 34(a), a camera sets a clip-out frame 11 which is smaller than an image-captured picture 10. The camera outputs the picture inside the clip-out frame 11 as an output picture 12, and displays the output picture on a display or stores it in a recording medium. An image-captured picture 13 in FIG. 34(b) is a picture that is one frame ahead of the image-captured picture 10. Camera motion 14 occurs between the image-capturing in FIG. 34(a) and the image-capturing in FIG. 34(b), and even when a subject 15 is still, the in-picture position of the subject 15 moves, as in output picture 16, when there is no image blur correction function. The difference between the output picture 12 and the output picture 16 is the "image blur". When the camera does not move and the subject also does not move, there should be no change in the position of the subject in the output picture.

Consequently, a camera having an image blur correction function solves the image blur and obtains an output picture 18 which is the same as the output picture 12 by moving the clip-out frame 11 according to a camera motion correction vector 17 which is in the opposite direction and of the same size as the camera motion 14, as shown in FIG. 34(c).

On the other hand, a camera having an optical image blur correction function mechanically moves the lens system and/or imaging device so as to cancel out the camera motion. Therefore, image blur correction is performed on the picture formed in the imaging device itself.

As described above, with the electronic image blur correction, it is necessary to accurately detect the motion of the camera since the clip-out frame 11 is to be moved according to the motion of the camera as described using FIG. 34. In addition, such motion of the camera is detected based on the motion of the image-captured picture. When the subject is still, it is easy to accurately detect camera motion. However, in actuality, there are cases of image-capturing a moving subject and, in particular, with a video camera it is very rare that the subject is still since the primary purpose is to record video which temporally pursues the motion of the subject.

Consequently, for example, Patent Reference 1 discloses an electronic image blur correction technique which allows image blur correction even when a moving subject is image-captured.

FIG. 35 is a configuration diagram showing the configuration of the motion vector detecting device included in the image-capturing apparatus of the aforementioned Patent Reference 1. The motion vector detecting device includes a motion vector detecting unit 31, a motion vector judging unit 32, a divergence degree calculating unit 33, LPF 34, a transforming unit 35, and a control unit 36. The motion vector detecting unit 31 detects the motion vector for each block of an image-captured picture.

FIG. 36 is a diagram showing the motion vector for each block. As shown in FIG. 36(a), the motion vector detecting unit 31 divides an image-captured picture 20 into plural blocks and detects the motion vector for each block. When the subject is still, the motion vectors of all the blocks are identical, which indicates camera motion. On the other hand, when there is a moving subject, the motion vectors of all the blocks are not identical. Therefore, the motion vector detecting unit 31 detects motion vectors having different orientations, as shown in FIG. 36(b). Consequently, the divergence degree calculating unit 33 calculates a "divergence degree" which indicates the degree of divergence of the motion vectors. Then, the control unit 36 calculates the motion vector for the whole of the image-captured picture 20 (camera motion) according to the divergence degree. Specifically, the transforming unit 35 sets a relationship between the divergence degree and a motion vector coefficient which controls the size of the motion vector for the whole image-captured picture and, as the divergence degree increases, the transforming unit 35 suppresses the size of the motion vector for that divergence degree.

FIG. 37 is a diagram showing the relationship between the motion vector coefficient and the divergence degree. The transforming unit 35 suppresses the effects of a motion vector of a large divergence degree on the motion vector for the whole image-captured picture by decreasing the motion vector coefficient for a motion vector of a higher divergence degree. Based on the result of such processing by the transforming unit 35, the control unit 36 controls the size of the motion vector for the whole image-captured picture.

Patent Reference 1: Japanese Patent No. 2506469.

DISCLOSURE OF INVENTION

Problems that Invention is to Solve

Now, when an image sensor moves during the exposure of one frame, an image blur referred to as blurring occurs.

FIG. 38 is an explanatory diagram describing blurring which occurs during the exposure of one frame. For example, consider the case where a state 43 in which a point A on a subject 40 is being formed on a pixel 42 of an image sensor 41 as shown in FIG. 38(a) is lost and changes to a state 44 due to the movement of the image sensor 41. In the state 44 shown in FIG. 38(b), the light from the point A on the subject incidents on a region B of the image sensor 41. Since the light from one point (point A) on the subject incidents on plural pixels (region B) on the image sensor, the focus shifts and the light-collecting position likewise moves, from the pixel 42 to the region B. Between the transition from the state 43 to the state 44, when the shutter of the image sensor 41 is open, the light from the point A on the subject continuously changes its incidence position, from the pixel 42 to the region B, and is integrated in each pixel and an image-captured picture is obtained. As described above, when the image sensor 41 moves while the shutter of the image sensor 41 is held open, the light from one point on the subject incidents on plural pixels of the image sensor, and blurring such as that in picture 46 shown in FIG. 38(c) occurs and picture quality deteriorates.

However, with the conventional electronic image blur correction technique, the position of the clip-out frame 11 is controlled so as to cancel out the camera motion 14, as described in FIG. 34. Therefore, in such a method, even when image blur is corrected by placing the subject 15 at a steady position within the output picture 12, there is the problem that the blurring which occurs in the output picture 12 cannot be removed and thus image blur correction is insufficient.

Consequently, the present invention is conceived in view of the above-described circumstances, and has as an object to provide an image-capturing apparatus and image-capturing method which enable correction of blurring which occurs within one frame due to camera motion, in electronic image blur correction.

Means to Solve the Problems

In order to achieve the aforementioned object, the image capturing apparatus according to the present invention is an image-capturing apparatus which corrects blurring that occurs in an image-captured picture, the image-capturing apparatus includes: an image-capturing unit which image-captures pictures in video form; a blur detecting unit which detects occurrence of blurring in an image-captured picture that is image-captured by the image-capturing unit, and a temporal position at which the blurring has occurred; a blur synthesizing unit which generates blur-synthesized pictures by using blur-free image-captured pictures and a blurred image-captured picture, and synthesizing artificial blurring onto the blur-free image-captured pictures, the blur-free image-captured pictures being image-captured pictures in which the blurring is not detected by the blur detecting unit, and the blurred image-captured picture being a picture in which the blurring is detected; a picture feature amount transforming unit which transforms each of the blur-free image-captured pictures, the blur-synthesized pictures, and the blurred image-captured picture into a picture feature amount; and a blur correcting unit which corrects the blurring in the blurred image-captured picture by identifying a blur-synthesized picture having a picture feature amount that is similar to the picture feature amount of the blurred to image-captured picture and replacing the picture feature amount of the blurred image-captured picture with the picture feature amount of a blur-free image-captured picture corresponding temporally to the identified blur-synthesized picture, the identifying and replacing being performed for each of pixels or blocks in the temporal position at which the blurring is detected by the blur detecting unit.

Here, the picture feature amount is an amount based on the brightness distribution of plural pixels including a target pixel. For example, an example of the picture feature amount is the brightness value of the 25 pixels included in a 5 pixel×5 pixel block having the target pixel as a center, the feature amount reflecting the difference in brightness value between the target pixel and pixels surrounding it, and so on. Blur removal can be implemented by replacing the picture feature amount of a blurred picture with the picture feature amount of a blur-free picture.

With this, it is possible to correct the blurring which occurs due to camera motion, using image processing, and it is possible to improve picture quality in electronic image blur correction which cancels out camera motion by moving the framing position.

It should be noted that the present invention can be implemented, not only as such an image-capturing apparatus, but also as an image-capturing method having, as steps, the characteristic units included in such an image-capturing apparatus, and as a program which causes a computer to execute such steps. In addition, it goes without saying that such a program can be distributed via a recording medium such as a CD-ROM and via a transmission medium such as the Internet.

Effects of the Invention

With to the image-capturing apparatus according to the present invention, it is possible to obtain a picture for which the effects of blurring which occurs within one frame due to camera motion is reduced. As a result, the image-capturing person no longer needs to consider using a tripod or hold a camera still by steadying his arms in order to prevent image blur, and thus can concentrate on the framing-centered act of image-capturing itself. Furthermore, since blurring which occurs due to under-exposure can be removed through image processing, and even a beginner lacking in image blur-related knowledge can image-capture images without image blur, ease of video image-capturing is improved which leads to the expansion of user demographics and use situations.

BRIEF DESCRIPTION OF DRAWINGS

FIG. 21 is a diagram describing an example of a recording format.

NUMERICAL REFERENCES

Figure 1:
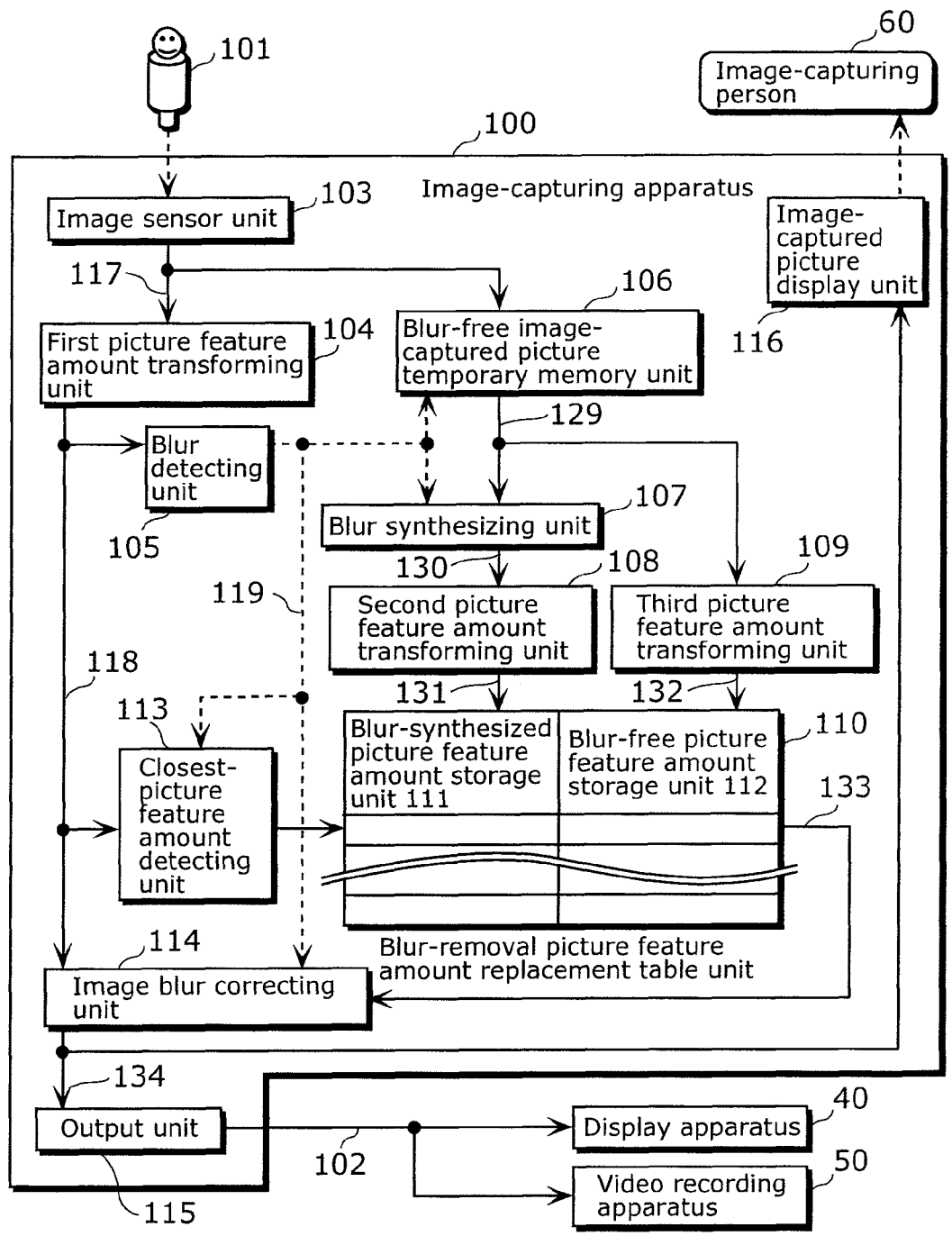
FIG. 1 is a block diagram showing the configuration of an image-capturing apparatus in a first embodiment of the present invention.

100 Image-capturing apparatus
200, 300 Image-capturing, recording and reproducing apparatus
101 Subject
102 Output picture
103 Image sensor unit
104 First image-captured picture feature amount transforming unit
105 Blur detecting unit
106 Blur-free image-captured picture temporary memory unit
107 Blur synthesizing unit
108 Second image-captured picture feature amount transforming unit
109 Third image-captured picture feature amount transforming unit
110 Blur removal picture feature amount replacement table
111 Blur-synthesized picture feature amount storage unit
112 Blur-free picture feature amount storage unit
113 Closest-picture feature amount detecting unit
114 Image blur correcting unit
115 Output unit
116 Image-captured picture display unit

BEST MODE FOR CARRYING OUT THE INVENTION

The image capturing apparatus according to an embodiment of the present invention is an image-capturing apparatus which corrects blurring that occurs in an image-captured picture, the image-capturing apparatus includes: an image-capturing unit which image-captures pictures in video form; a blur detecting unit which detects occurrence of blurring in an image-captured picture that is image-captured by the image-capturing unit, and a temporal position at which the blurring has occurred; a blur synthesizing unit which generates blur-synthesized pictures by using blur-free image-captured pictures and a blurred image-captured picture, and synthesizing artificial blurring onto the blur-free image-captured pictures, the blur-free image-captured pictures being image-captured pictures in which the blurring is not detected by the blur detecting unit, and the blurred image-captured picture being a picture in which the blurring is detected; a picture feature amount transforming unit which transforms each of the blur-free image-captured pictures, the blur-synthesized pictures, and the blurred image-captured picture into a picture feature amount; and a blur correcting unit which corrects the blurring in the blurred image-captured picture by identifying a blur-synthesized picture having a picture feature amount that is similar to the picture feature amount of the blurred image-captured picture and replacing the picture feature amount of the blurred image-captured picture with the picture feature amount of a blur-free image-captured picture corresponding temporally to the identified blur-synthesized picture, the identifying and replacing being performed for each of pixels or blocks in the temporal position at which the blurring is detected by the blur detecting unit.

With this, it is possible to correct the blurring which occurs within one frame due to camera motion.

Here, the blur correcting unit may include: a replacement table unit which generates a replacement table in which the picture feature amounts of the blur-synthesized pictures and the picture feature amounts of the blur-free image-captured pictures are associated with each other, each of the blur-synthesized pictures corresponding temporally to a corresponding one of the blur-free image-captured pictures; and a correcting unit which identifies a blur-synthesized picture with a picture feature amount that is closest to the picture feature amount of the blurred image-captured picture by using the replacement table, and replaces the picture feature amount of the blurred image-captured picture with the picture feature amount of the blur-free image-captured picture corresponding temporally to the identified blur-synthesized picture.

Furthermore, the blur synthesizing unit may generate each of the blur-synthesized pictures by detecting a motion of the image-capturing apparatus, creating a blur model which temporally interpolates between the blur-free image-captured picture and the blurred image-captured picture according to the motion of the image-capturing apparatus during a period between the blur-free image-captured picture and the blurred image-captured picture, and synthesizing the artificial blurring onto the blur-free image-captured picture using the created blur model.

The blur correcting unit may separately execute a table generating mode in which a replacement table unit generates a replacement table, and a correcting mode in which the correcting unit corrects the blurring in the blurred image-captured picture using the replacement table. With this, the replacement table can be created, for example, during the idle time after the end of image-capturing up to before the start of reproduction.

The image-capturing apparatus may further include a storage unit which stores the image-captured pictures that are image-captured by the image-capturing unit, together with blur detection information indicating the occurrence of the blurring detected by the blur detecting unit and a position at which the blurring has occurred, wherein the blur detecting unit, the blur synthesizing unit, and the picture feature amount transforming unit may each read the pictures and the blur detecting information stored in the storage unit, and perform processing on the read pictures.

Furthermore, the picture feature amount transforming unit may transform each of the image-captured pictures that are image-captured by the image-capturing unit into a picture feature amount on a per pixel basis or a per block basis; and the blur detecting unit may track similarity of the picture feature amounts of the image-captured pictures in chronological order, and judge, when an amount of change in a picture feature amount exceeds a predetermined threshold value, that the blurring has occurred in a position of a pixel or a block of the picture feature amount that exceeded the threshold value.

Furthermore, the image-capturing apparatus may further include a temporary storage unit which temporarily stores the blur-free image-captured pictures, wherein, when the blur detection unit detects the blurring, the blur synthesizing unit may generate the blur-synthesized pictures by synthesizing the artificial blurring onto the blur-free image-captured pictures stored in the temporary storage unit.

Furthermore, the image-capturing apparatus may further include an instruction accepting unit which accepts a selection for whether or not blur correction is to be performed, wherein the blur correcting unit may correct the blurring in the blurred image-captured picture only when the selection to perform the blur correction is accepted by the instruction accepting unit. With this, the image-capturing person can disable the blur removal processing and thus enabling a wider range of image representation.

Furthermore, instruction accepting unit may further accept a region on which the blur correction is to be performed, and the blur correcting unit may correct the blurring in the burred image-captured picture only on the region on which the blur correction is to be performed accepted by the instruction accepting unit. Furthermore, the instruction accepting unit may further accept a region on which the blur correction is not to be performed, and the blur correcting unit may not correct the blurring in the burred image-captured picture on the region on which the blur correction is not to be performed accepted by the instruction accepting unit. With this, it is possible to perform blur correction processing only on the region selected by the image-capturing person.

Furthermore, blur detection unit may include: a blur detection frequency calculating unit which calculates a blur detection frequency within the blurred image-captured picture; a threshold value comparing unit which judges whether to execute the replacement of the picture feature amounts for correcting the blurring, on a whole or part of the blurred image-captured picture, by comparing the blur detection frequency with a threshold value; and a blur detection information generating unit which adds a unit of picture-feature-amount replacement to the blur detection information, based on a result of the judgment by the threshold value comparing unit, and when the blur detection information specifies replacement of the picture feature amounts on the whole of the blurred image-captured picture, the blurring is corrected by replacing the whole of the blurred image-captured picture with the blur-free image-captured picture instead of executing the replacement of the picture feature amounts. With this, for example, when the blur detection frequency is high, it is possible to perform faster processing than the picture feature amount replacement on a per pixel basis or a per block basis, and perform blur correction through replacement of the entire picture which is more resistant to the effects of artifacts caused by picture feature amount replacement.

Furthermore, the image-capturing apparatus may further include: a zoom setting unit which sets a zoom factor defining an angle of view for the image-capturing, wherein the threshold value comparing unit may perform the judgment by comparing the blur detection frequency with the threshold value that is adjusted according to the zoom factor set by the zoom setting unit. With this, by lowering the threshold value during high-factor zoom image-capturing in which blur occurrence possibility increases, and facilitating the execution of replacement of the entire picture, it is possible to reduce processing load, and generate high-quality blur-removed pictures having few artifacts.

Hereinafter, the embodiments of the present invention shall be described with reference to the Drawings.

First Embodiment

In the present embodiment, an image-capturing apparatus which removes blurring by replacing the picture feature amount of a blurred picture with the picture feature amount of a blur-free picture shall be described.

Figure 2:
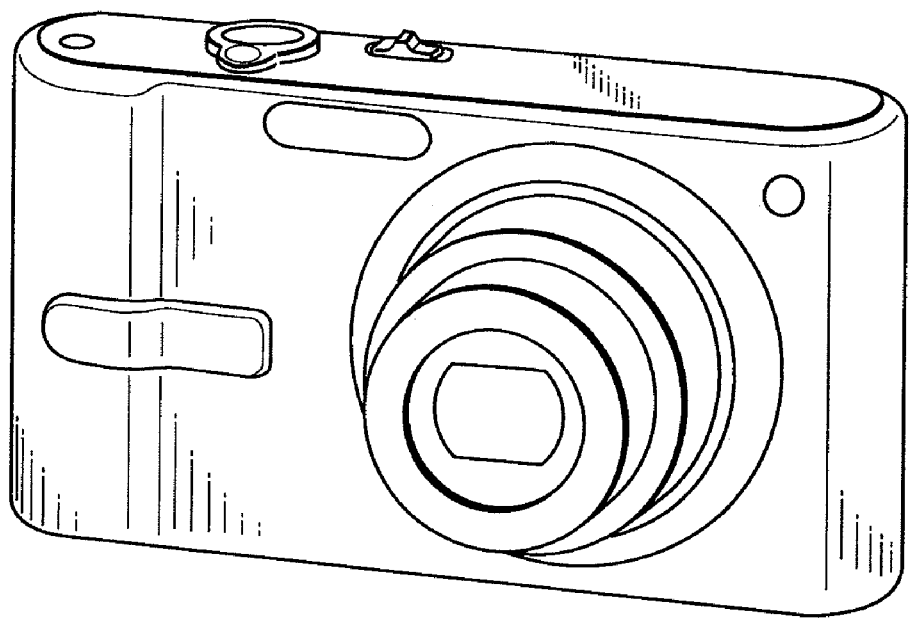
FIG. 2(a), (b) is a diagram showing specific examples of devices to which the image-capturing apparatus in the first embodiment of the present invention is applied.
Figure 2:
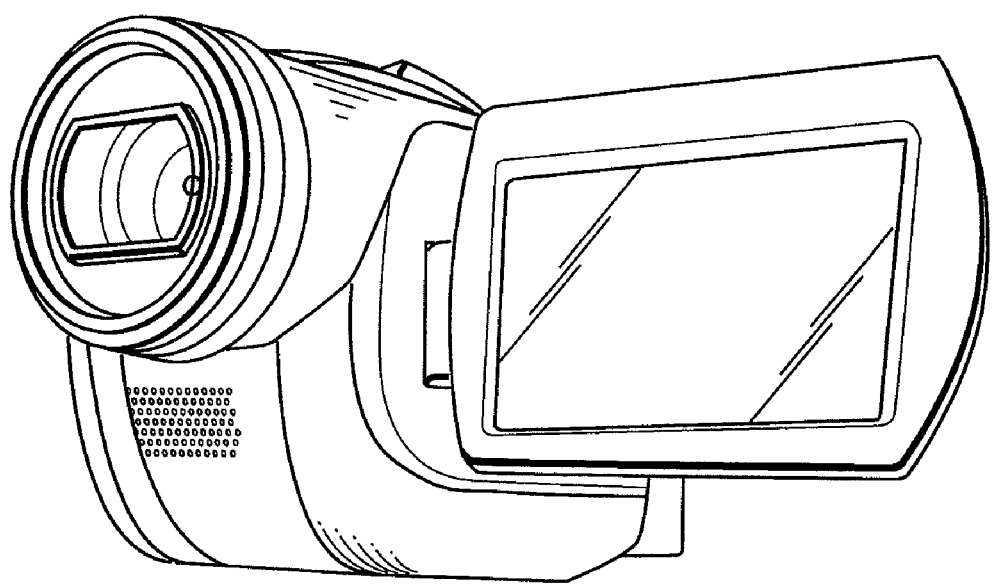

FIG. 1 is a block diagram showing the configuration of an image-capturing apparatus 100 according to the first embodiment of the present invention. FIG. 2 is diagram showing specific examples of apparatuses to which the image-capturing apparatus 100 according to an embodiment of the present invention is applied.

The image-capturing apparatus 100 is an apparatus which image-captures a subject 101 in the form of video, removes blurring and corrects image blur, and outputs an output picture 102 in the form of video. As shown in FIG. 1, the image-capturing apparatus 100 includes: an image sensor unit 103, a first picture feature amount transforming unit 104, a blur detecting unit 105, a blur-free image-captured picture temporary memory unit 106, a blur synthesizing unit 107, a second picture feature amount transforming unit 108, a third picture feature amount transforming unit 109, a blur-removal picture feature amount replacement table unit 110, a blur-synthesized picture feature amount storage unit 111, a blur-free picture feature amount storage unit 112, a closest-picture feature amount detecting unit 113, an image blur correcting unit 114, an output unit 115, and an image-captured picture display unit 116. The image-capturing apparatus 100 can be applied to, for example, a digital still camera equipped with a video image-capturing function, as shown in FIG. 2(a), and to a video movie camera as shown in FIG. 2(b), and the like.

The output picture 102 is shown, for example, on a display apparatus 40 connected to the image-capturing apparatus 100. Alternatively, the output picture 102 is recorded on a video recording apparatus 50 connected to the image-capturing apparatus 100.

The image sensor unit 103 image-captures the subject 101 and outputs the image-captured picture as an input picture 117.

The first picture feature amount transforming unit 104 transforms the input picture 117 into a picture feature amount, and outputs this as an input picture feature amount 118. The picture feature amount is a characteristic value reflecting the difference in the brightness value of a target-pixel and its surrounding pixels, and is calculated using wavelet transformation, for example.

Figure 3:
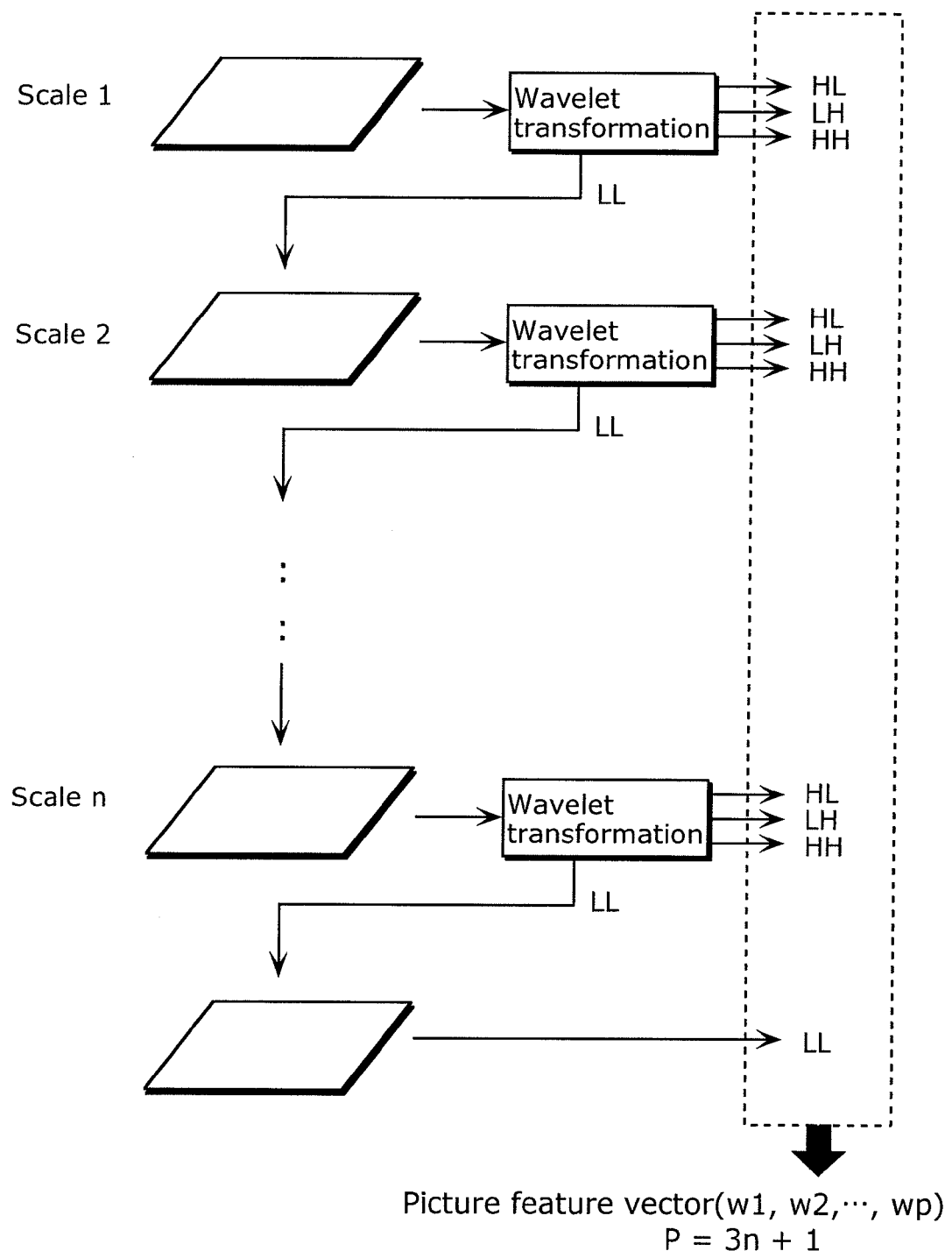
FIG. 3 is a diagram describing a method of generating picture feature vectors ($w_1, w_2, \ldots, w_p$) from a multiresolution representation using wavelet transformation.
Figure 4:
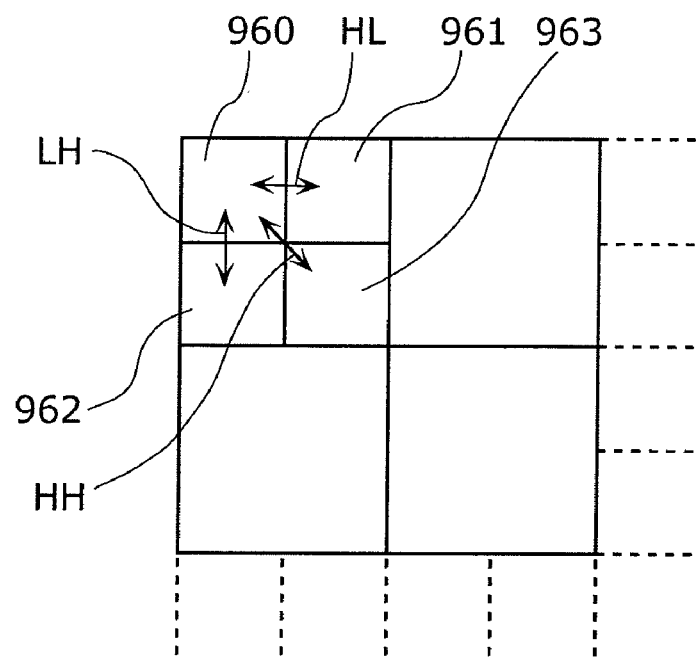
FIG. 4(a), (b) is a diagram describing wavelet transformation outputs HL, LH, and HH.
Figure 4:
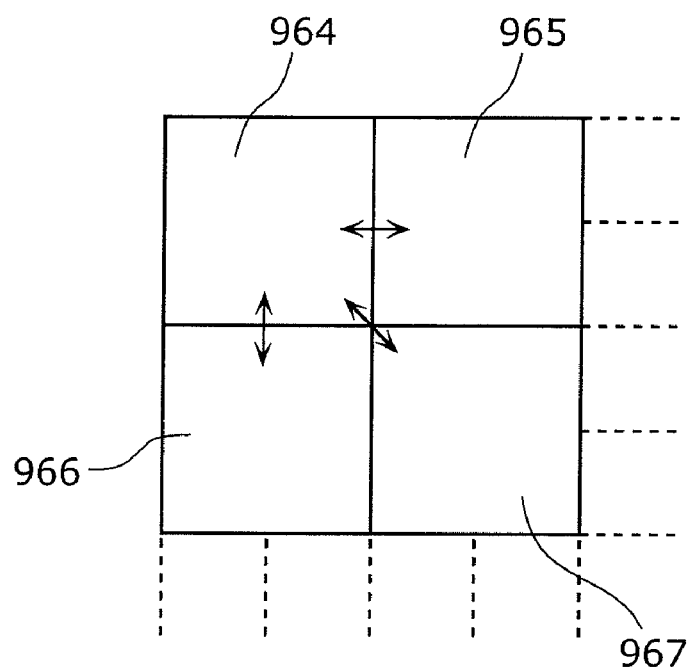

FIG. 3 is a diagram showing an example of method of generating picture feature vector $(w_1, w_2, \ldots, w_p)$ from a multiresolution representation using wavelet transformation. FIG. 4 is a diagram describing the wavelet transformation outputs HL, LH, and HH.

The wavelet transformation outputs HL, LH, HH, and LL shown in FIG. 3 are examples of cases where a Haar-type mother wavelet is used. As shown in FIG. 4(a), the output HL is the difference value between a processing target pixel 960 and the right-adjacent pixel 961 with respect to the pixel 960; the output LH is the difference value between the processing target pixel 960 and the bottom-adjacent pixel 962 with respect to the pixel 960; the output HH is the difference value between a processing target pixel 960 and the oblique-bottom-adjacent pixel 963 with respect to the pixel 960; and the output LL is the average value of the total of four pixels, namely, the pixel 960 and the pixels at the right, bottom, and oblique bottom thereof. FIG. 4(a) is equivalent to a scale 1, and FIG. 4(b) is equivalent to a scale 2. In scale 2, the output LL which is the average of the four pixels in scale 1 becomes the target for difference value calculation; the output HL in scale 2 becomes the difference value between block 964 and block 965; the output LH in scale 2 becomes the difference value between block 964 and block 966, and the output HH in scale 2 becomes the difference value between block 964 and block 967. Furthermore, the output LL in scale 2 becomes the average value from block 964 to block 967.

Figure 5:
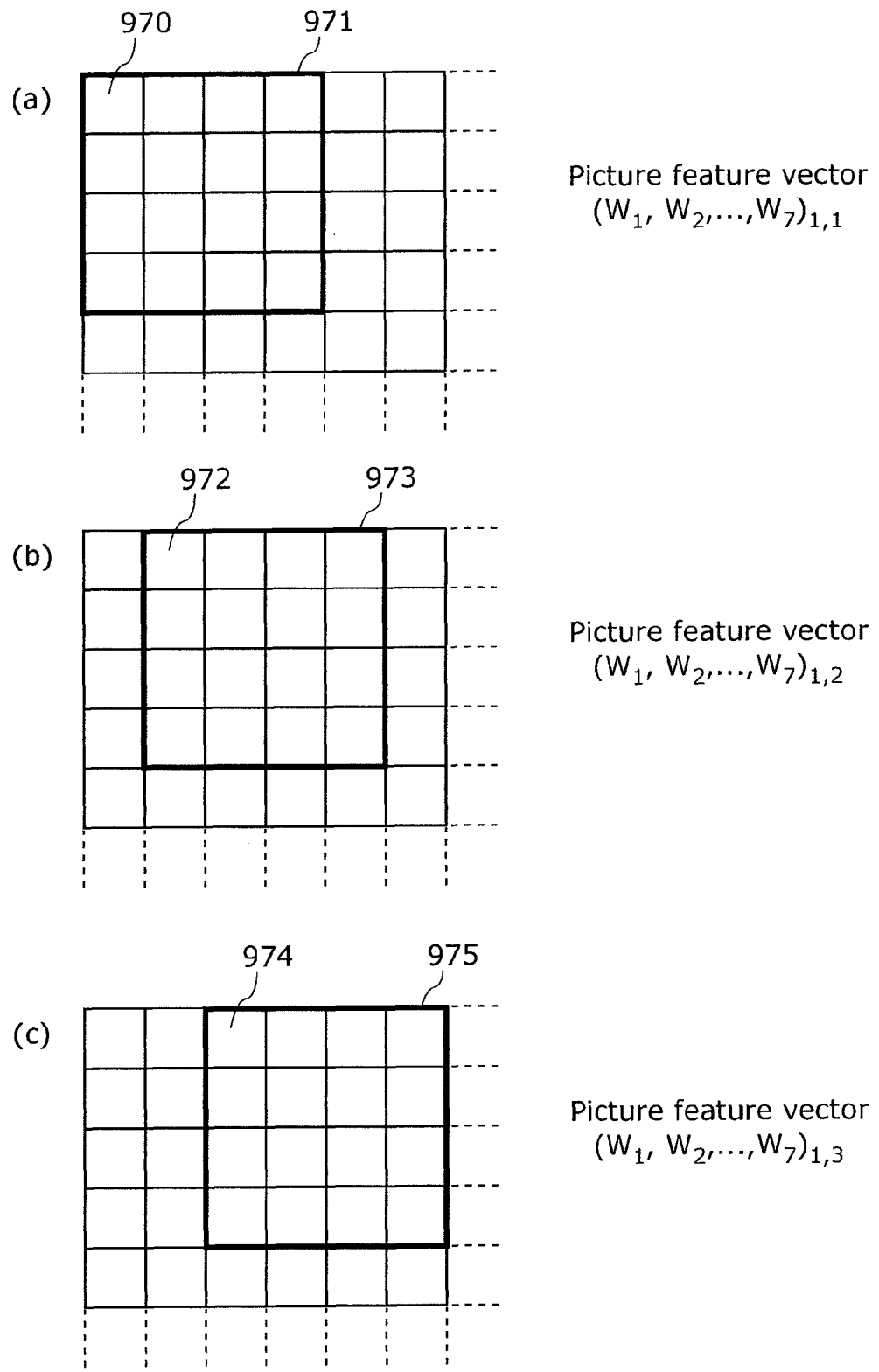
FIG. 5(a), (b), (c) is a diagram describing a method for calculating, on a per pixel basis, the picture feature amount for scale level n=2.

FIG. 5 is a diagram describing a method of calculating the picture feature amount on a per pixel basis, using a scale level n=2 as an example. FIG. 5(a) shows a method of calculating the pixel feature amount $(w_1, w_2, \ldots, w_7)_{1,1}$ of a pixel 970. 16 pixels inside a block 971 are referred to in wavelet transformation and a 7-dimensional picture feature amount is calculated. In the same manner, FIG. 5(b) shows a method of calculating the pixel feature amount $(w_1, w_2, \ldots, w_7)_{1,2}$ of a pixel 972. 16 pixels inside a block 973 are referred to in wavelet transformation and a 7-dimensional picture feature amount is calculated. FIG. 5(c) shows a method of calculating the pixel feature amount $(w_1, w_2, \ldots, w_7)^{1,3}$ of a pixel 974. 16 pixels inside a block 975 are referred to by wavelet transformation and a 7-dimensional picture feature amount is calculated. As described above, the picture feature amount is calculated on a per pixel basis by moving the block referred to in the wavelet transformation one pixel at a time.

In the same manner, in the case of a scale level n=3, ten wavelet coefficients are calculated, and a 10-dimensional picture feature vector $(w_1, w_2, \ldots, w_{10})$ having such coefficients as elements can be defined for each pixel.

It should be noted that the present invention does not provide a restriction on the method for generating the picture feature amount, and the picture feature amount can be generated using an arbitrary method. For example, the brightness value string of 25 pixels included in block 971 in FIG. 5(a) may be adopted as a picture feature vector. Furthermore, the spatial relationships between block 971, block 973, and block 975 in FIG. 5 are arbitrary, and respective blocks may overlap by one pixel or by two pixels.

Figure 6:
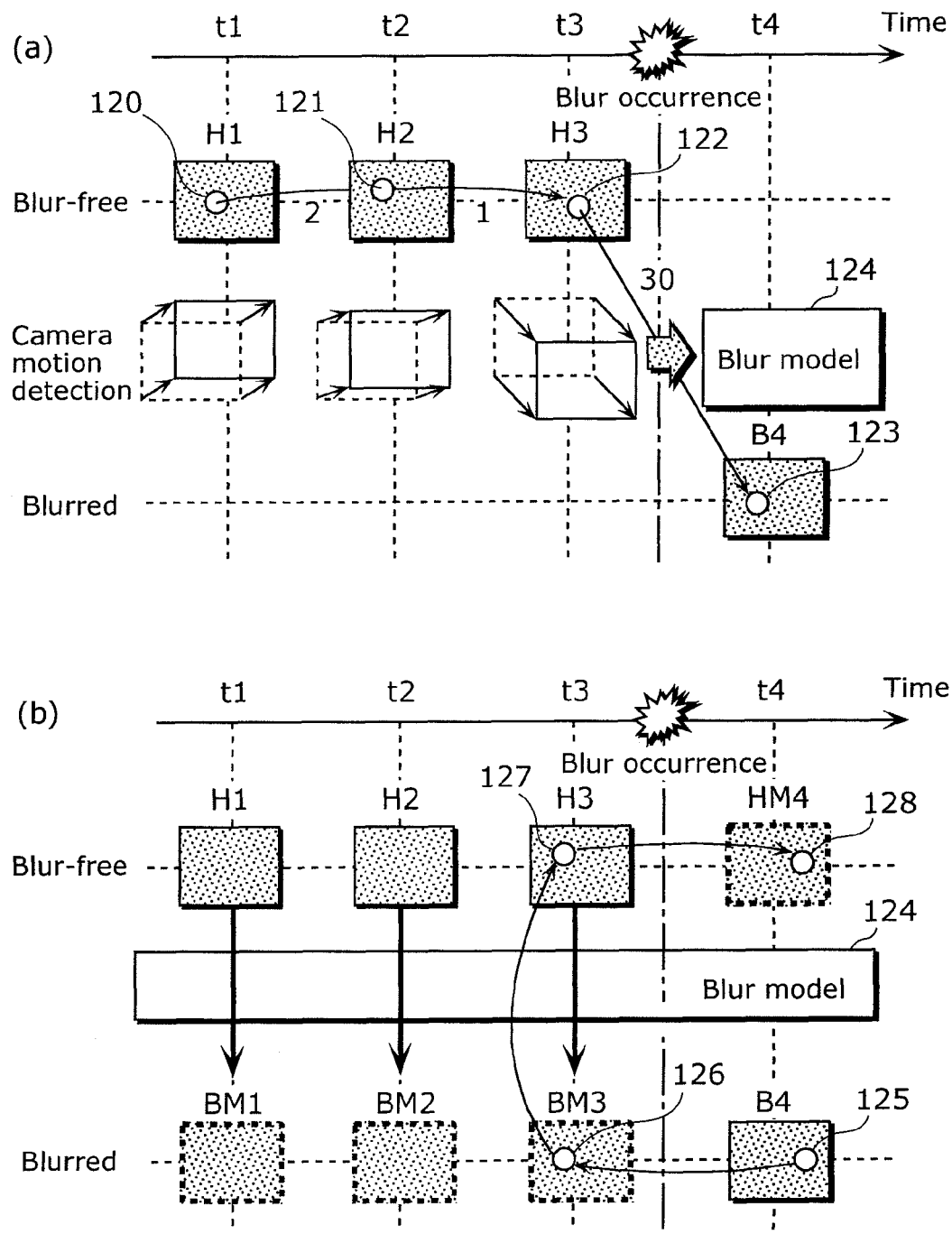
FIG. 6(a), (b) is a diagram describing the principle of blur removal.

FIG. 6 is a diagram describing the principle of blur removal; FIG. 6(a) is a diagram showing the flow up to when blurring which occurs between a time t3 and a time t4 is detected and a blur model is generated based on the camera motion.

In the blur detection, similar picture feature amount vectors between temporally successive pictures are tracked and blurring is judged to have occurred when the distance change of a picture feature vector exceeds a threshold value tf (for example, 5). In the example shown in FIG. 6(a), the distance of the picture feature vector between pixel 120 of picture H1 and pixel 121 of picture H2 is 2, and the distance of the picture feature vector between pixel 121 of picture H2 and pixel 122 of picture H3 is 1. Here, since threshold value tf=5 has been set, it is judged that there is no blurring. However, since the distance of the picture feature vector between pixel 122 of picture H3 and pixel 123 of picture B4 is 30, it is judged that blurring has occurred.

Figure 38:
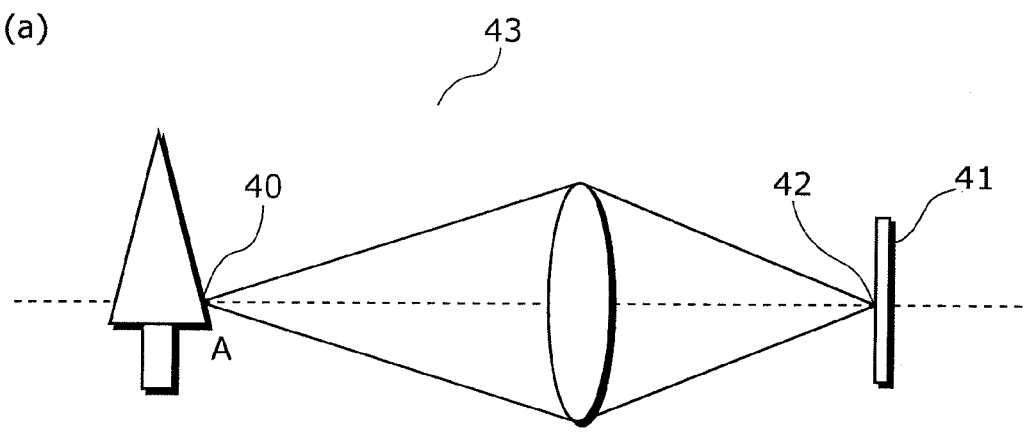
FIG. 38(a), (b), (c) is a diagram describing the cause for the occurrence of blurring.
Figure 38:
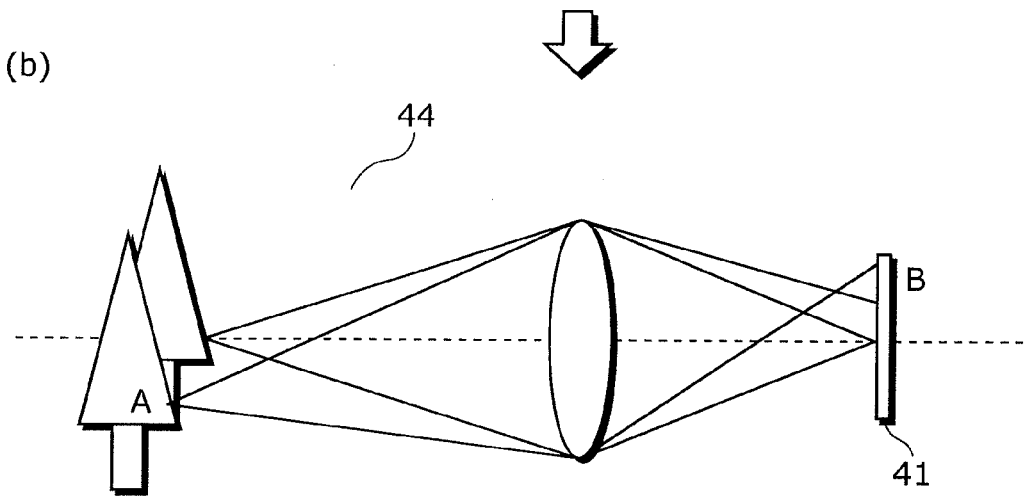
Figure 38:
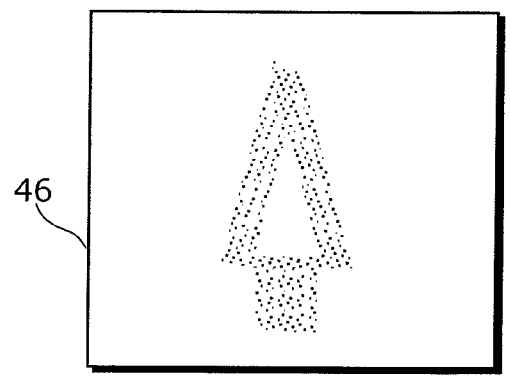

A blur model 124 models the occurrence of blurring, based on camera motion in the interval from the time t3 to the time t4. As described using FIG. 38, blurring occurs since one point (the point A in FIG. 38) on the subject incidents on plural pixels (the region B in FIG. 38) of the imaging device. Therefore, the blurred picture B4 can be generated by integrating picture H3 according to the camera motion.

Figure 7:
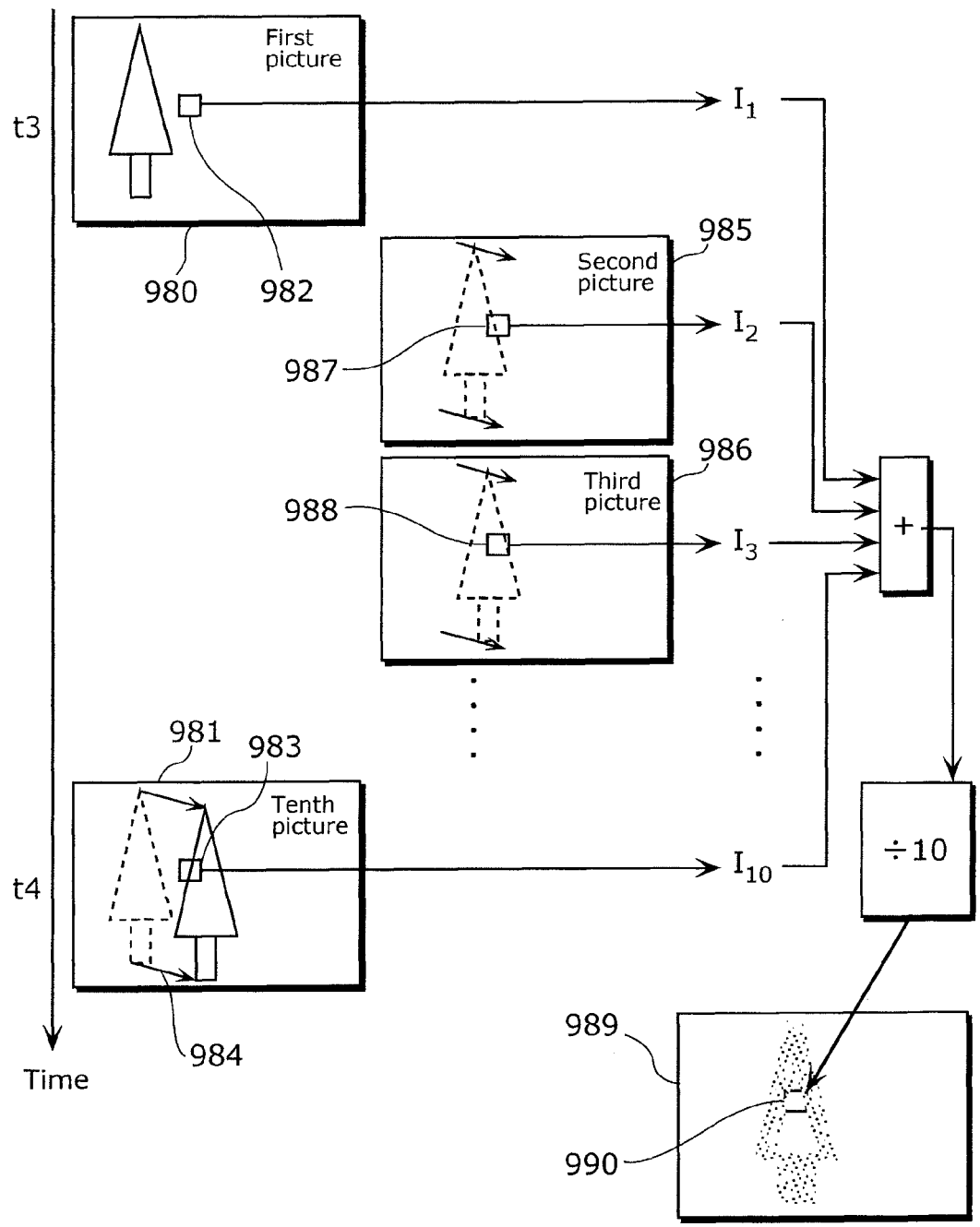
FIG. 7 is a diagram describing a camera motion-based blur generation method.

FIG. 7 is a method describing a method of blur generation based on camera motion. Attention is placed on pixel 982 and pixel 983 which are located in identical positions in a picture 980 which is image-captured at the time t3 and picture 981 which is image-captured at the time t4, respectively. When the camera does not move during the time t3 and the time t4, there is no change in the amount of light incident on pixel 982 and pixel 983, and blurring does not occur. On the other hand, assuming that, for example, camera motion occurs in the direction and size of arrow 984 indicated inside the picture 981 in the interval from the time t3 to the time t4, the amount of light inputted to pixel 982 and pixel 983 are different. In addition, the change in such incident light amount is in a continuous manner. Consequently, assuming that the camera motion is of a constant speed and linear, it is possible to create, by calculation, picture 985, picture 986, and so on, which are intermediate pictures that are not actually image-captured, as shown in FIG. 7. In FIG. 7 shows an example in which 8 intermediate pictures are generated by calculation, and a total of 10 pictures, including picture 980 and picture 981, are discretized. It is possible to calculate the pixel value of pixel 990 of the blurred picture 989 by adding the pixel values $I_1, I_2, I_3, \ldots, I_{10}$ of pixel 987, pixel 988, pixel 983, and so on, located at identical positions as pixel 982, and dividing the sum by 10.

It should be noted that blurring also occurs when the camera does not move but the subject moves. However, the target of the present invention is the blurring which occurs due to camera motion, and the motion of the subject is not modeled.

FIG. 6(b) is a diagram showing the flow for generating a blur-removed image-captured picture HM4 by replacing the picture feature amount of the blurred image-captured picture B4 with the picture feature amount of any of the blur-free image-captured pictures H1, H2, and H3. Using the blur model 124 described in FIG. 6(a), blur-synthesized pictures BM1, BM2, and BM3 are generated by artificially causing blurring to occur in the blur-free image-captured pictures H1, H2, and H3. The picture feature amount of pixel 125 of the blurred image-captured picture B4 is compared with the respective picture feature amounts of the blur-synthesized pictures BM1, BM2, and BM3, and the pixel having the most similar closest-picture feature amount is detected. FIG. 6(b) shows an example of the case where pixel 126 of the blur-synthesized picture BM3 is detected as having the most similar closest-picture feature amount. In this case, the picture feature amount of pixel 127 of the blur free image-captured picture H3, which is located at an identical position as pixel 126, is determined for pixel 128 of the blur-removed image-captured picture HM4 to be switched with the picture feature amount of pixel 125 of the blurred image-captured picture B4.

It should be noted that the present invention does not provide a restriction on the method for selecting the picture feature amount, and an arbitrary method can be applied. For example, the picture feature amounts falling within a predetermined distance may be collected and their average obtained as the picture feature amount of the blur-free image-captured picture.

In this manner, in the present invention, blurring is removed by replacing the picture feature amount of a "blurred image-captured picture" with the picture feature amount of a "blur-free image-captured picture" that is image-captured before the "blurred image-captured picture".

As described using FIG. 6(a), the blur detecting unit 105 evaluates the input picture feature amount 118, in chronological order, with respect to all the pixels, judges that blurring has occurred when the distance change of the picture feature vector exceeds the threshold tf, and switches the blur presence/absence information inside the blur detection information 119 to ON. Furthermore, the blur detecting unit 105 outputs information indicating the position of a pixel in which blurring has occurred, as blur position information in the blur detection information 119. In addition, continuing after the blur detection, the blur detection unit 105 evaluates, in chronological order, the change in the picture feature vector. When the distance change of the picture feature vector does not exceed the threshold value tf in the situation in which blurring occurs, it indicates that the situation has not changed and thus is equivalent to the continuing occurrence of blurring. When a distance change exceeding the threshold value tf occurs once again in the situation in which blurring occurs, it is equivalent to the disappearance of the blurring. In this case, the blur detecting unit 105 switches the blur presence/absence information in the blur detection information 119 to OFF. When the blur presence/absence information is OFF, the blur detecting unit 105 does not output the blur position information in the blur detection information 119. However, since there are cases where even larger blurring in which the distance change in the picture feature vector exceeds the threshold value tf occurs during the occurrence of blurring, it is necessary to check the distance change and component change of the picture feature vectors. More specifically, since light from plural locations on the subject are inputted into one point in the imaging device when blurring occurs, the high frequency components of the picture feature vectors are lost and the frequency distribution shifts to the low frequency band-side, as in picture 46 in FIG. 38(c). In the wavelet transformation described in FIG. 3, the components shift to the deep direction of the scale level, that is, the scale level having a large n value. Consequently, when the distance change of a picture feature vector exceeds the threshold value tf and the component of the picture feature vector shifts to the low frequency band, it is judged that the camera has made a bigger motion and an even larger blurring has occurred. Conversely, when the distance change of a picture feature vector exceeds the threshold value tf and the component of the picture feature vector shifts to the high frequency band, it is judged that the blurring has disappeared. It should be noted that the change in the frequency component can be judged from the size of the difference of the respective components of the picture feature vectors. In the case of the wavelet transformation in FIG. 3, scale level 1 is the component having the highest frequency and, when transformation up to scale level 5 is performed, scale level 5 is the component having the lowest frequency.

In the initial setting immediately after activation, the blur detecting unit 105 resets the blur presence/absence information in the blur detection information 119 to OFF.

It should be noted that, the possibility for the occurrence of blurring due to the camera can be predicted based on the change in the shutter speed or camera orientation, auto-focus operation, and so on. Specifically, when the shutter speed is slowed down, the light-collecting time in the image sensor unit 103 becomes long and the possibility for the occurrence of blurring becomes high. Conversely, when the shutter speed becomes fast, the light-collecting time in the image sensor unit 103 becomes short and the possibility for the occurrence of blurring becomes low. Furthermore, change in camera orientation is directly connected to the occurrence of blurring. In the case where an auto-focus function is provided in the image-capturing apparatus 100, it is possible to refer to the operation of the auto-focus and judge that blurring occurs when focusing is not successful. Consequently, when the blur detecting unit 105 judges in an integrated way by taking into consideration the change in shutter speed or camera motion, and the auto-focus operation, together with the threshold judgment for the distance change of the picture feature vector, this is effective in terms of increasing blur detection accuracy. Furthermore, it is also possible to judge the occurrence of blurring using at least one of the change in shutter speed or camera motion, and the auto-focus operation, without performing the threshold determination for the distance change of the picture feature vector.

The blur-free image-captured picture temporary memory unit 106 writes the input picture 117 into a memory when the blur presence/absence information in the blur detection information 119 is OFF, and temporarily holds blur-free image-captured pictures until blurring occurs. In the case of the example shown in FIG. 6(a), the blur-free image-captured pictures H1, H2, and H3 are temporarily recorded on the blur-free image-captured picture temporary memory unit 106. Since the image-captured scene changes as the image-capturing progresses, the number of blur-free image-captured pictures that can be used in blur removal becomes limited. Consequently, the blur-free image-captured picture temporary memory unit 106 maintains, for example, a 30-picture memory capacity, and, when this capacity is exceeded, performs writing by sequentially overwriting, one picture at a time, from the oldest blur-free image-captured picture. When the blur presence/absence information in the blur detection information 119 is switched to ON, the blur-free image-captured picture temporary memory unit 106 sequentially reads and outputs recorded blur-free image-captured pictures 129 to the blur synthesizing unit 107 and the third picture feature amount transforming unit 109.

When the blur presence/absence information is ON, blur synthesizing unit 107 creates the blur model 124 described using FIG. 6(a) based on the motion of the camera. Here, for the method for detecting camera motion, camera motion may be detected by providing a gyro, or the like, or by detecting based on the image-captured picture, for example. In addition, using the created blur model 124, the blur synthesizing unit 107 generates blur-synthesized pictures 130 by artificially causing blurring to occur with respect to each of the blur-free image-captured images 129.

Using the same method as with the first picture feature amount transforming unit 104, the second picture feature amount transforming unit 108 transforms the blur-synthesized pictures 130 into respective picture feature amounts and outputs respective blur-synthesized picture feature amounts 131.

Using the same method as with the first picture feature amount transforming unit 104, third picture feature amount transforming unit 109 transforms the blur-free image-captured pictures 129 into respective picture feature amounts and outputs respective blur-free image-captured picture feature amounts 132.

The blur-removal picture feature amount replacement table unit 110 is a pairing for replacing the picture feature amount of a picture including blurring with the picture feature amount of a picture without blurring. The input-side of the blur-removal picture feature amount replacement table unit 110 is a blur-synthesized picture feature amount storage unit 111 in which the blur-synthesized picture feature amounts 131 are stored. The output-side of the blur-removal picture feature amount replacement table unit 110 is a blur-free picture feature amount storage unit 112 in which the blur-free image-captured picture feature amounts 132 are stored. More specifically, the blur-synthesized picture feature amounts 131 and the blur-free image-captured picture feature amounts 132 are stored, for example, on a per picture (frame) basis, with their respective picture feature amounts for the same pixel positions being associated with each other. It should be noted that although the picture feature amounts are stored on a per picture basis here, storage is not limited to such. For example, storage may be carried out in a sorted format according to the picture feature amounts, and the picture feature amounts may be transformed into pixel positions.

The closest-picture feature amount detecting unit 113 operates in the state where the blur presence/absence information in the blur detection information 119 is ON, after the writing of the picture feature amounts into the blur-removal picture feature amount replacement table unit 110, and detects a picture feature amount that is similar to the picture feature amount of the input picture feature amount 118, from inside the blur-synthesized picture feature amount storage unit 111. Here, as the aforementioned similar picture feature amount, the closest-picture feature amount detecting unit 113 may detect a picture feature amount which is closest to the picture feature amount of the input picture feature amount 118, from inside the blur-synthesized picture feature amount storage unit 111. When the closest blur-synthesized picture feature amount is detected, the closest-picture feature amount detecting unit 113 reads, from the blur-free picture feature amount storage unit 112, the picture feature amount of the blur-free picture that is a pair to the detected closest blur-synthesized picture feature amount and outputs this as a blur-removal picture feature vector picture 133.

The image blur correcting unit 114 corrects the image blur of the input picture feature amount 118 when the blur presence/absence information in the blur detection information 119 is OFF, and corrects the image blur of the blur-removal picture feature vector picture 133 when the blur presence/absence information in the blur detection information 119 is ON, and outputs the result as an image blur-corrected picture 134. The image blur correcting unit 114 obtains an outer-frame region by image-capturing the subject with an angle of view that is wider than that for the output picture 120, and calculates the camera motion by extracting only the in-picture motion of an object that is actually still, from within the motion vectors calculated in the outer-frame region. The image blur correcting unit 114 corrects the image blur by moving the position of the region matching the output picture 102 (framing region) on the input picture 117 so as to cancel out the camera motion. The image blur correcting unit 114 obtains an output picture by clipping out a picture from the input picture 117 in the corrected framing region, and performing picture enlargement to match the size of the clipped-out picture to the size of the output picture. According to the above-described configuration, even when the subject 101 to be image-captured by an image-capturing person 60 moves, a still object present around the subject can be captured within the outer-frame region, and thus stable image blur correction becomes possible through the capturing of the motion vectors of the still object. Hereinafter, details of the image blur correcting unit 114 shall be described using FIG. 8 to FIG. 16.

Figure 8:
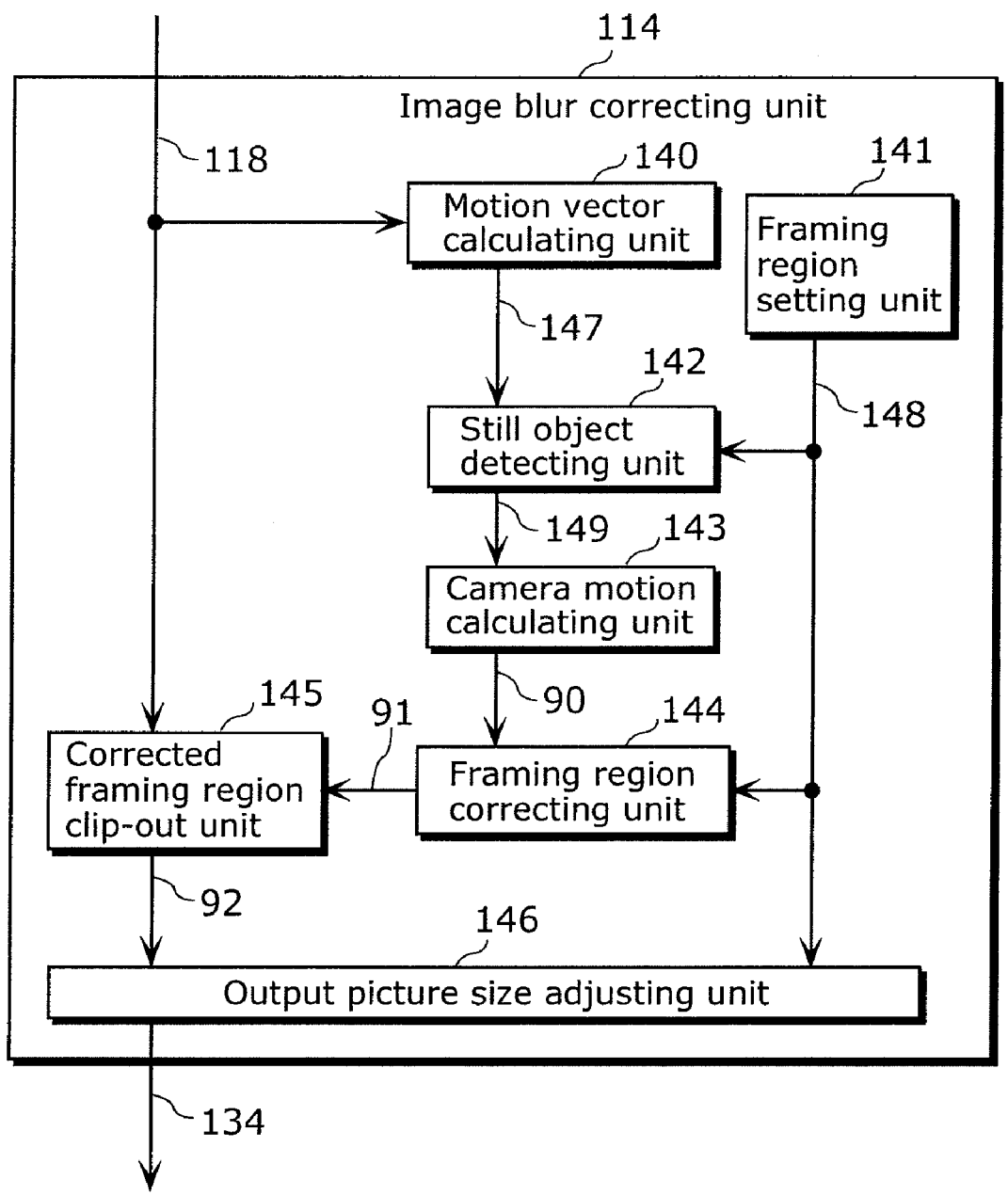
FIG. 8 is a block diagram showing the internal configuration of an image blur correcting unit.

FIG. 8 is a block diagram showing the internal configuration of the image blur correcting unit 114.

As shown in FIG. 8, the image blur correcting unit 114 includes a motion vector calculating unit 140, a framing region setting unit 141, a still object detecting unit 142, a camera motion calculating unit 143, a framing region correcting unit 144, a corrected framing region clip-out unit 145, and an output picture size adjusting unit 146.

The motion vector calculating unit 140 detects all the feature points included in an input picture (image-captured picture), and detects, as a motion vector signal 147, the motion of feature points between such input picture (image-captured picture) and an input picture (image-captured picture) of another time.

Figure 9:
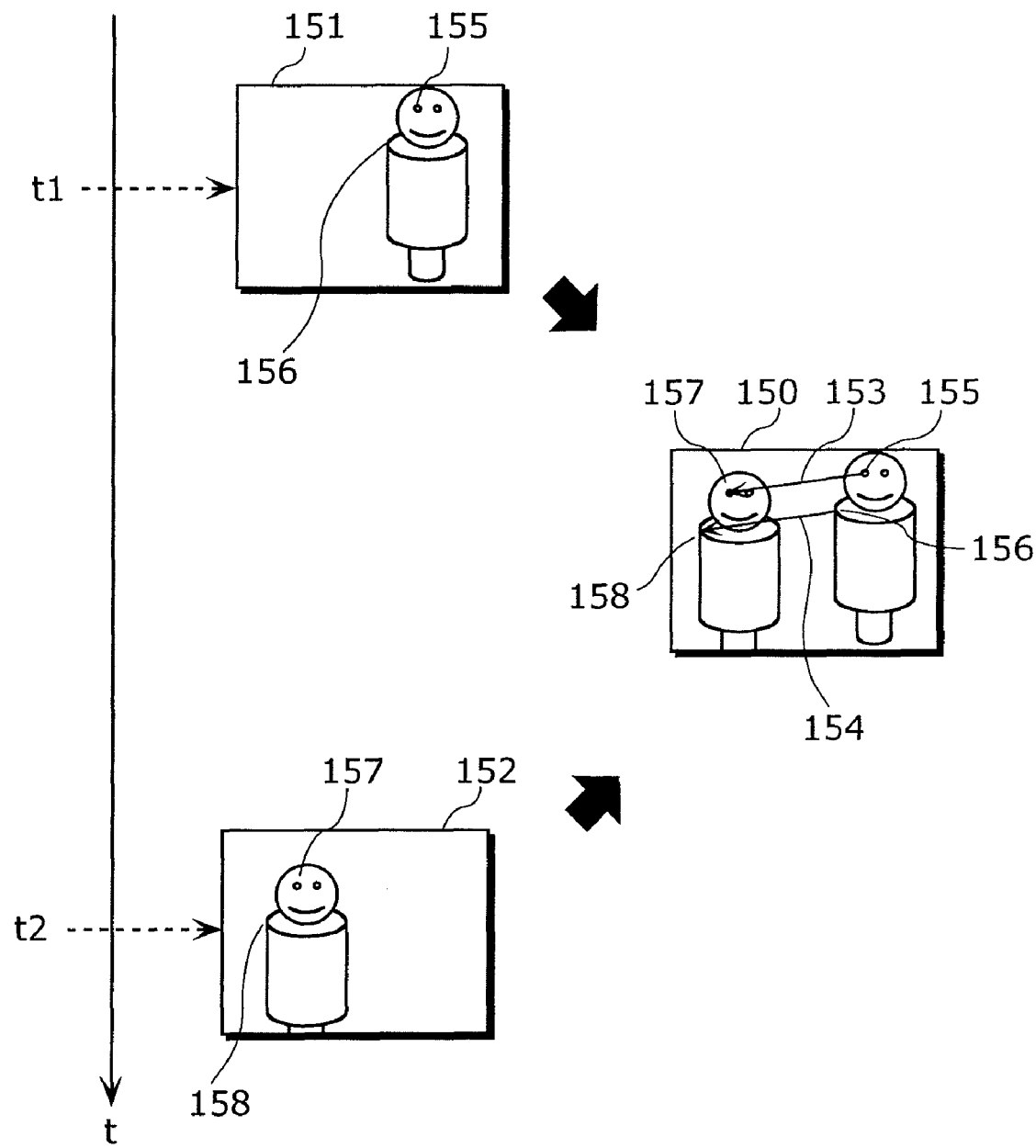
FIG. 9 is a diagram showing an example of motion vector calculation.

FIG. 9 is a diagram showing an example of motion vector calculation.

For example, the image-captured picture changes from an image-captured picture 151 at a time t1 to an image-captured picture 152 at a time t2. Here, a picture 150 is an overlapping of the image-captured picture 151 at the time t1 and the image-captured picture 152 at the time t2. In this example, the motion vector calculating unit 140 calculates a motion vector 153 from the difference between a feature point 155 and a feature point 157 which are the eye positions of the subject, detected by the tracking of the picture feature amounts. Furthermore, the motion vector calculating unit 140 calculates a motion vector 154 from the difference in positions between a feature point 156 and a feature point 158 which are the positions of a shoulder. It should be noted that in the present invention, the method of calculating the motion vector is arbitrary, and restrictions are not provided. For example, the motion vector may be calculated without using the picture feature amounts of the input picture feature amount 118, by detecting a feature point using a brightness value of the input picture 117, and tracking such feature point.

Figure 10:
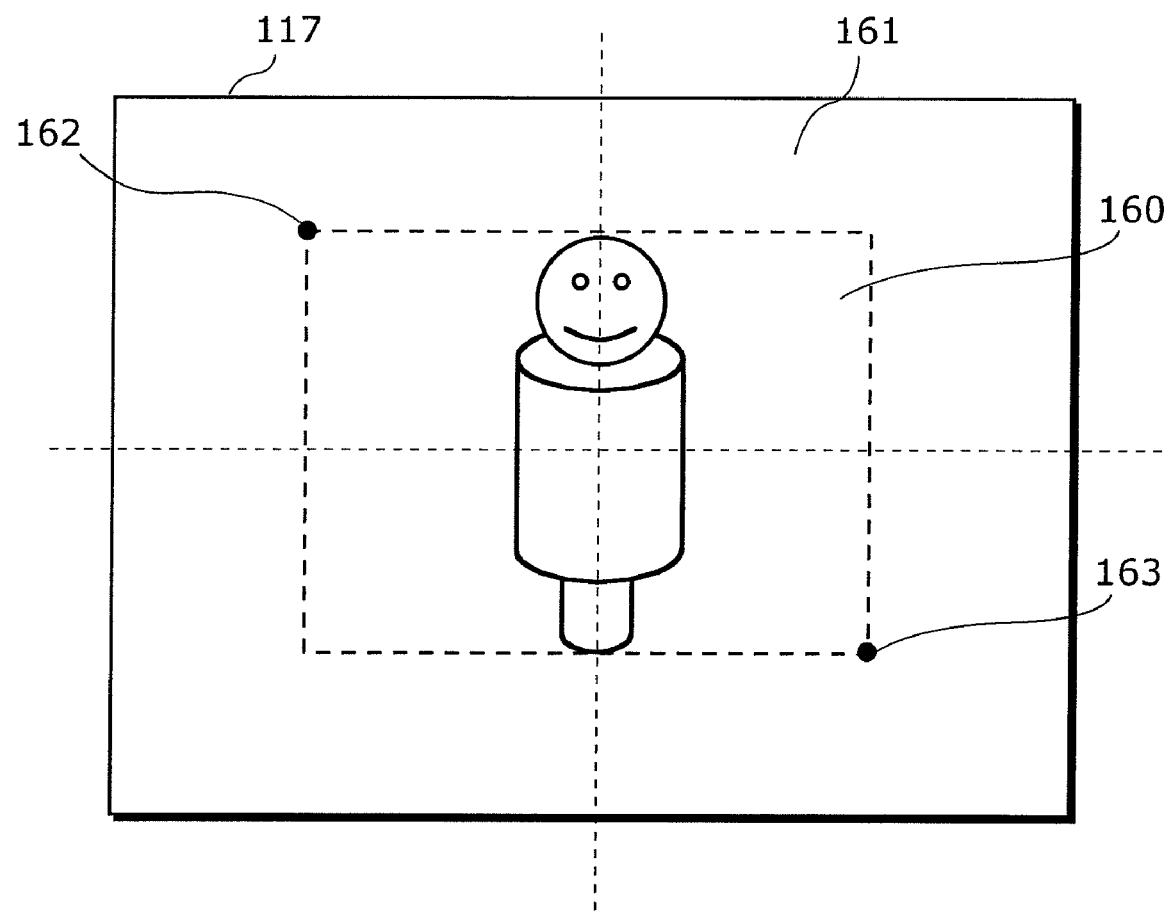
FIG. 10 is a diagram describing a framing region and an outer-frame region.

FIG. 10 is a diagram showing a framing region and outer-frame region set inside the input picture 117.

As shown in FIG. 10, the framing region setting unit 141 sets a framing region 160 and an outer-frame region 161 in the input picture 117. The framing region 160 is the region surrounded by the square in dotted lines shown in FIG. 10, and is the region of the picture that is displayed on the image-captured picture display unit 116 described later. Note that the image-capturing person 60 recognizes the picture displayed on the displayed framing region 160 to be the image-captured picture (angle of view), and adjusts the camera position and orientation accordingly. The outer-frame region 161 is the region in the input picture 117 outside of the framing region 160, and is set for correcting image blur using a motion vector calculated using this region, as described later. More specifically, the framing region setting unit 141 defines the framing region 160, for example, as a point 162 and a point 163 which are an x-coordinate and a y-coordinate respectively, and outputs information indicating these coordinates as a framing region setting signal 148.

The still object detecting unit 142 detects a still object using only the motion vectors outputted using the outer-frame region 161, from among the motion vectors indicated by the motion vector signal 147. Specifically, the still object detecting unit 142 extracts the motion vectors of the outer-frame region 161 from among the motion vectors of all the feature points included in the input picture 117. In addition, the still object detecting unit 142 extracts, from among the motion vectors of the outer-frame region 161, only the motion vectors which are assumed to be for the still object. In general, in the case of wide-angle image-capturing, still objects are often image-captured in the background of the subject. Therefore, the reason for using only the outer-frame region 161 as described above is based on the presumption that, in the image-capturing by video camera of the movement of a subject to be recorded, a still object is image-captured as a background of the subject, around the region framed by the image-capturing person (that is, the framing region 160).

Figure 11:
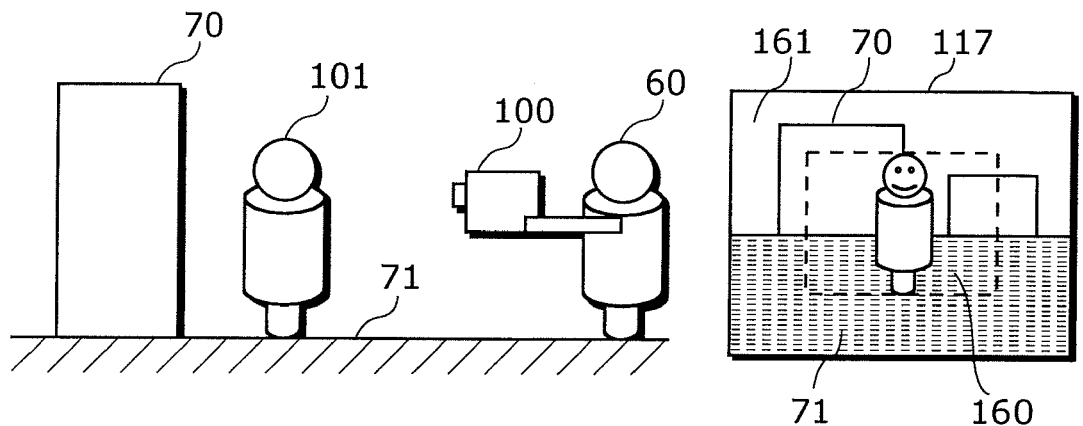
FIG. 11(a), (b) is a block diagram describing the reason for using the outer-frame region in the detection of a still object.
Figure 11:
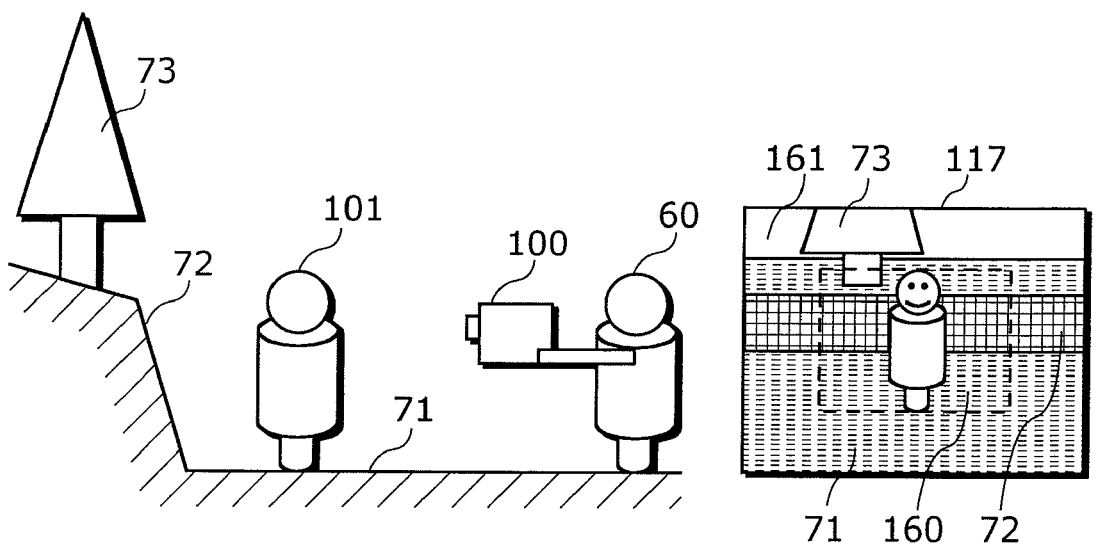

FIG. 11 is a diagram showing an example of pictures displayed in the framing region 160 and the outer-frame region 161.

Figure 34:
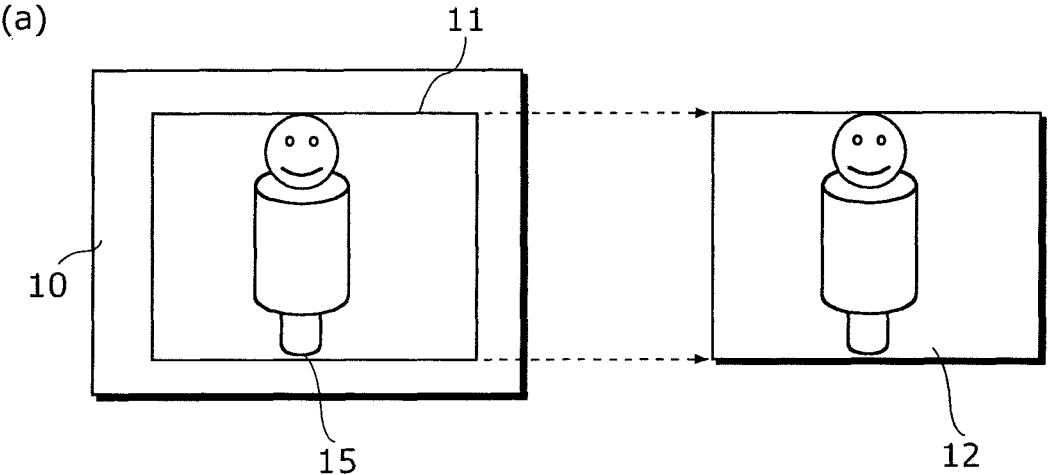
FIG. 34(a), (b), (c) is a diagram describing the principle of electronic image blur correction.
Figure 34:
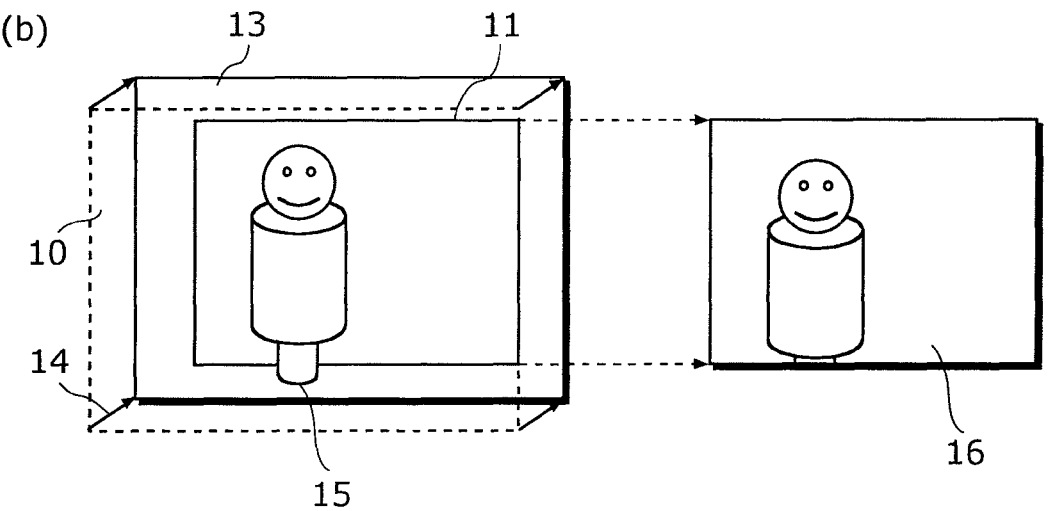
Figure 34:
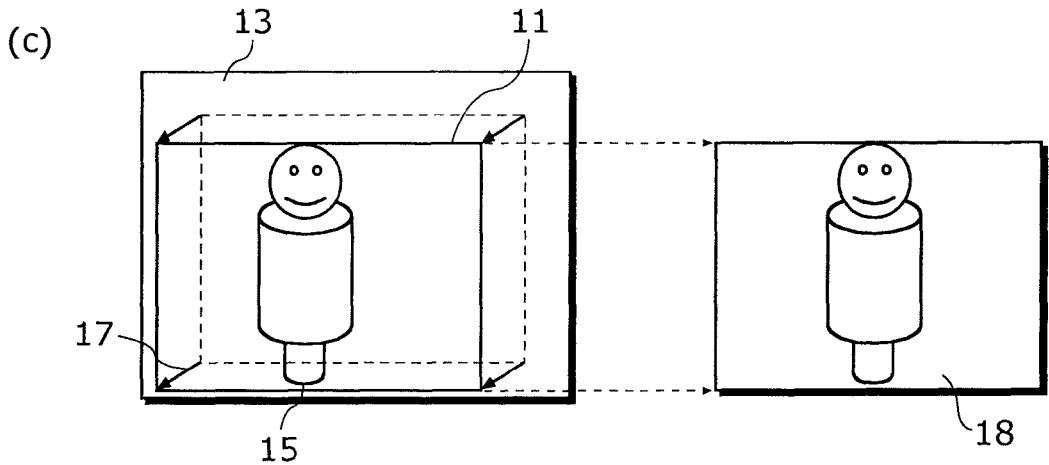

As shown in FIG. 11(a) and FIG. 11(b), in the case where the image-capturing person 60 and a still object 70 are on a single, continuing land surface, or floor, wall, and so on of a building, when the image-capturing person 60 is still, the positional relationship between the image-capturing person 60 and the still object 70 or a still object 73 is fixed, and the still object 70 or the still object 73 will be image-captured on the same positions on the input picture 117. Furthermore, the land surface or the floor, wall, and so on, of a building generally have texture (collective term for patterns or gloss, shading caused by asperity, and so on), and thus it is possible to detect feature points from differences in brightness, even from a flat land surface or floor surface, wall surface. Consequently, a land surface 71 and a wall surface 72 can be used as still objects, and it is possible to detect a still object in the outer-frame region 161. On the other hand, when the attitude of the image-capturing apparatus 100 carried by the image-capturing person 60 is moved, the still object 70 or still object 73 is image-captured in different positions on the input picture 117, and as a result, motion vectors are generated as described in FIG. 9. These motion vectors represent the direction and size of the image blur, and thus it is possible to correct the image blur in the same manner as shown in FIG. 34(c), by using these motion vectors.

Figure 12:
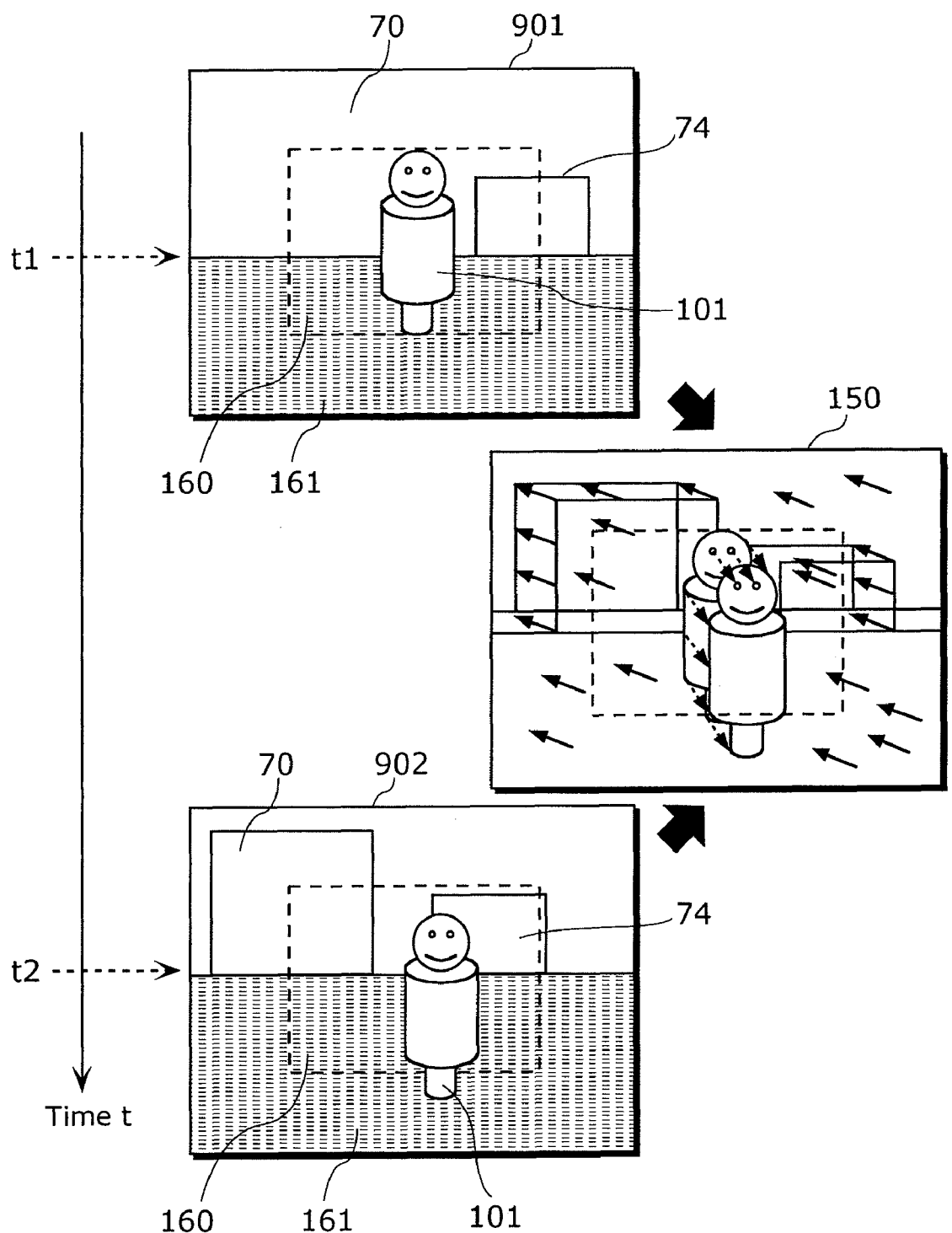
FIG. 12 is a diagram describing a method for detecting a still object based on motion vectors.

FIG. 12 is a diagram for describing a method in which the still object detecting unit 142 detects a still object (motion vectors of the still object).

For example, the subject 101 moves in a left-forward direction as seen from the subject 101, during the transit from the time t1 to the time t2. The picture 150 is a picture which displays, by overlapping, an input picture 901 of the time t1, an input picture 902 of the time t2, and motion vectors. Since the motion vectors of the still objects are generated due to the movement of the image-capturing apparatus 100, all have an identical direction and size.

Here, since the 3-dimensional spatial information of the scene to be image-captured is projected on the 2-dimensional surface of the image sensor 103, the direction and size of motion vectors of a still object that is a long distance away from the image-capturing apparatus 100 and a still object that is a short distance away do not match perfectly but show largely the same trend. Furthermore, due to the peripheral distortion of the lens provided in the image sensor 103, there are cases where motion vectors are different at the picture-screen center and picture-screen periphery. Consequently, the still object detecting unit 142 is provided with an allowable range for the direction and size of the motion vectors, and motion vectors that fall within this allowable range, among the motion vectors of the outer-frame region 161, are interpreted as the motion vectors of the still object, and the motion represented by the motion vectors is adopted as the image blur of the image-capturing apparatus 100. Furthermore, although there are cases where either the start point or end point of a motion vector exists inside the framing region 160, there are cases where the still object (the still object 70 and the still object 74 shown in FIG. 12) is also image-captured inside the framing region 160. Therefore, when the start point or the end point of the motion vectors exist in the outer-frame region 161, the still object detecting unit 142 judges that such motion vectors belong to the motion vectors of the outer-frame region 161.

Figure 13:
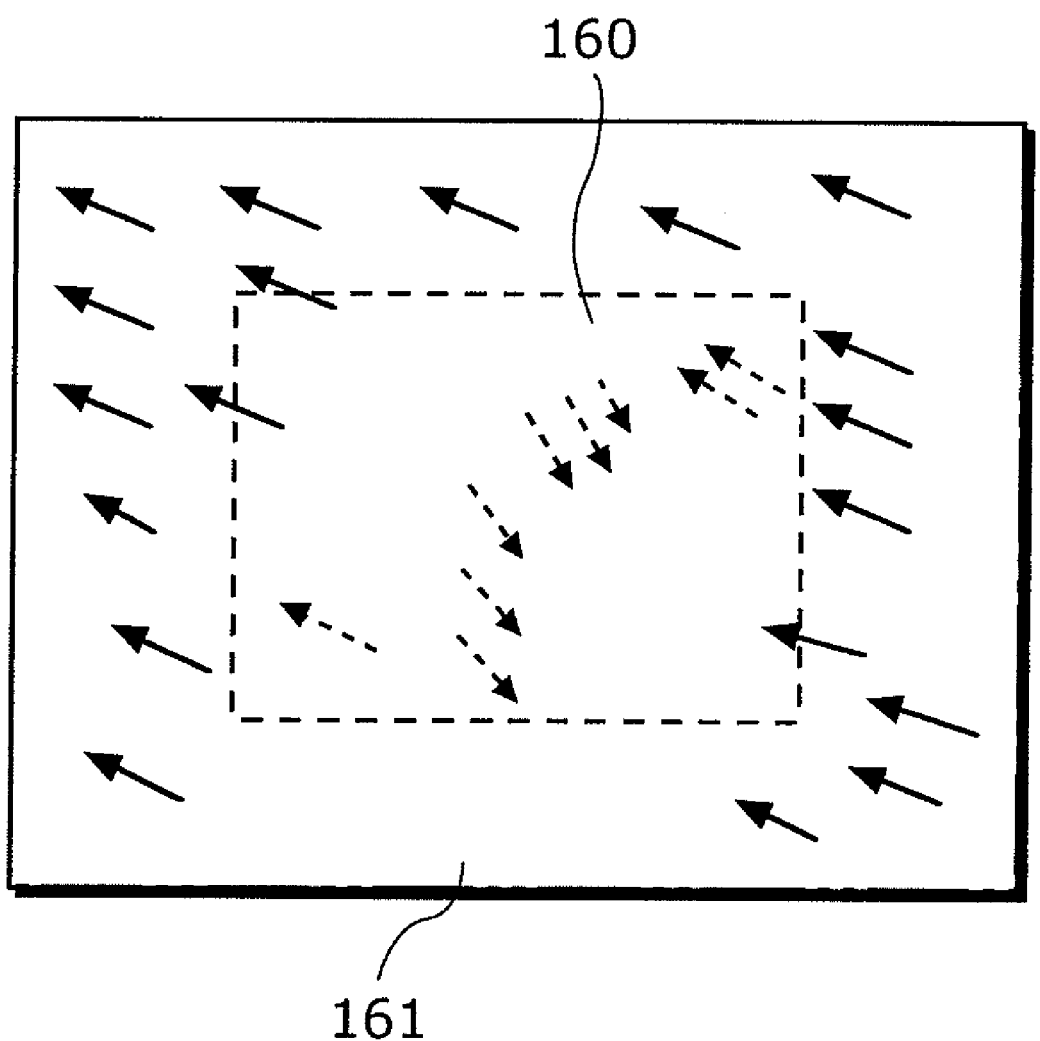
FIG. 13 is a diagram showing motion vectors of an outer-frame region.

FIG. 13 is a diagram showing the motion vectors of the outer-frame region 161.

The still object detecting unit 142 extracts the motion vectors indicated by the arrows in solid line in FIG. 13 as the motion vectors of the outer-frame region 161. In other words, the still object detecting unit 142 extracts only the motion vectors having at least a start point or end point inside the outer-frame region 161. In addition, the still object detecting unit calculates the average vector of the extracted motion vectors, and sets the distance to the average vector (distance threshold value tv) as the allowable range, and detects motion vectors having a distance to the average vector that is less than the distance threshold value tv as the motion vectors of the still object. More specifically, the motion vector calculating unit 140 and the still object detecting unit 142 which serve as a motion detecting unit, detect plural motion vectors in the above-described outward region, and preferentially extract, from the detected plural motion vectors, the motion vectors having a high similarity to the average of the plural motion vectors, as the motion vectors for the picture of the still object.

However, there are instances where a still object cannot be image-captured in the outer-frame region 161.

Figure 14:
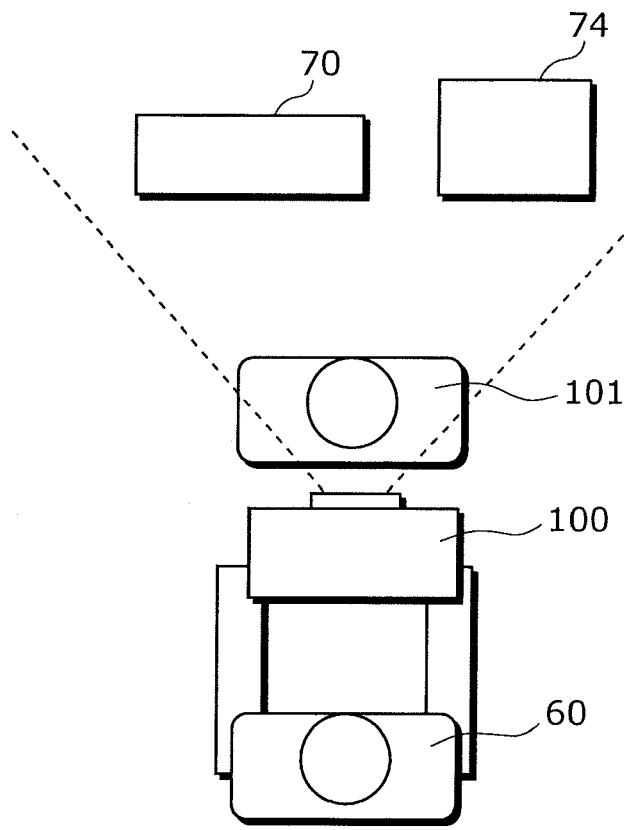
FIG. 14(a), (b) is a diagram showing cases where a still object cannot be image-captured in the outer-frame region.
Figure 14:
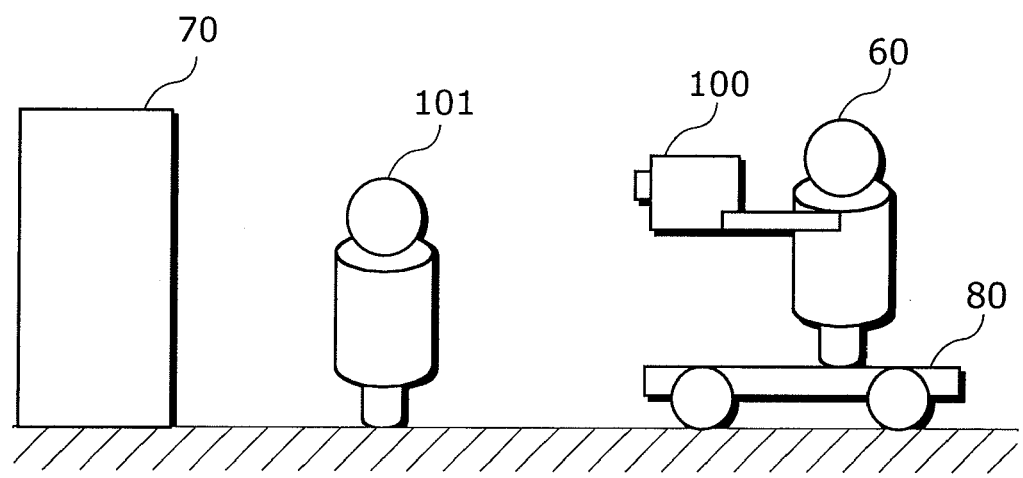

FIG. 14 is a diagram showing cases where a still object cannot be image-captured.

For example, it is not possible to image-capture a still object in the case where the distance between the image-capturing apparatus 100 and the subject 101 is extremely short, as shown in FIG. 14(a), or the case where the image-capturing person 60 is moving by riding on a moving unit 80, as shown in FIG. 14(b). Both cases show a situation in which movement is viewed on the entire screen, and it is natural to have images in which movement is felt.

Therefore, the still object detecting unit 142 distinguishes whether or not a still object is being image-captured, based on the input picture 117, and detects the motion vectors of the still object in the above-described manner, when it distinguishes that the still object is being image-captured On the other hand, when it distinguishes that a still object is not being image-captured, the still object detecting unit 142 executes a correction interrupting process in which the detection of motion vectors of a still object is not performed and image blur correction is not performed. In this case, the image-capturing apparatus 100 outputs the input picture 117 directly as the output picture 102.

For example, when the motion vectors of the outer-frame region 161 and the motion vectors of the framing region 160 respectively have roughly the same sizes and orientation, the still object detecting unit 142 distinguishes that a still object is not being image-captured. Furthermore, when the variation in the motion vectors of the outer-frame region 161 is great, the still object detecting unit 142 distinguishes that a still object is not being image-captured.

As described above, when it distinguishes that a still object is being image-captured, the still object detecting unit 142 detects a still object (the motion vectors of the still object) based on the motion vectors belonging to the outer-frame region 161, and outputs the detected one or plural motion vectors as a still object motion vector signal 149. On the other hand, when it distinguishes that a still object is not being image-captured, the still object detecting unit 142 does not perform the detection of motion vectors of a still object, and outputs a still object motion vector signal 149 indicating no still object, as the correction interrupting process. For example, as the still object motion vector signal 149 indicating no still object, the still object detecting unit 142 outputs a still object motion vector signal 149 indicating a motion vector having all components as 0, or a still object motion vector signal 149 indicating a motion vector in which all components have a value that is clearly greater than the biggest value for the size of a motion vector (specifically the length between the diagonally-opposing corners of the picture).

Upon receiving the still object motion vector signal 149 indicating no still object, the camera motion calculating unit 143 described later stops the operation for calculating camera motion. As a result, the operation of the framing region correcting unit 144 is also stopped, and the corrected framing region clip-out unit 145 directly outputs the input picture 117 obtained from the image sensor unit 103.

In such manner, it is possible to stop the image blur correction function in accordance with the image-capturing circumstances, and output images in which movement can be viewed on the entire screen or images from which movement can be felt.

The camera motion calculating unit 143 calculates a camera motion signal 90 from the still object motion vector signal 149 received from the still object detecting unit 142. As described above, the still object motion vector signal 149 includes plural motion vectors whose directions and sizes are different within the allowable range. Consequently, the camera motion calculation unit 143 transforms these motion vectors into one motion vector using their simple average or a frequency distribution-based weighted average, and the like, and outputs a motion vector (camera motion) having the same size in the opposite direction as the motion vector resulting from the transformation, as the camera motion signal 90.

Figure 35:
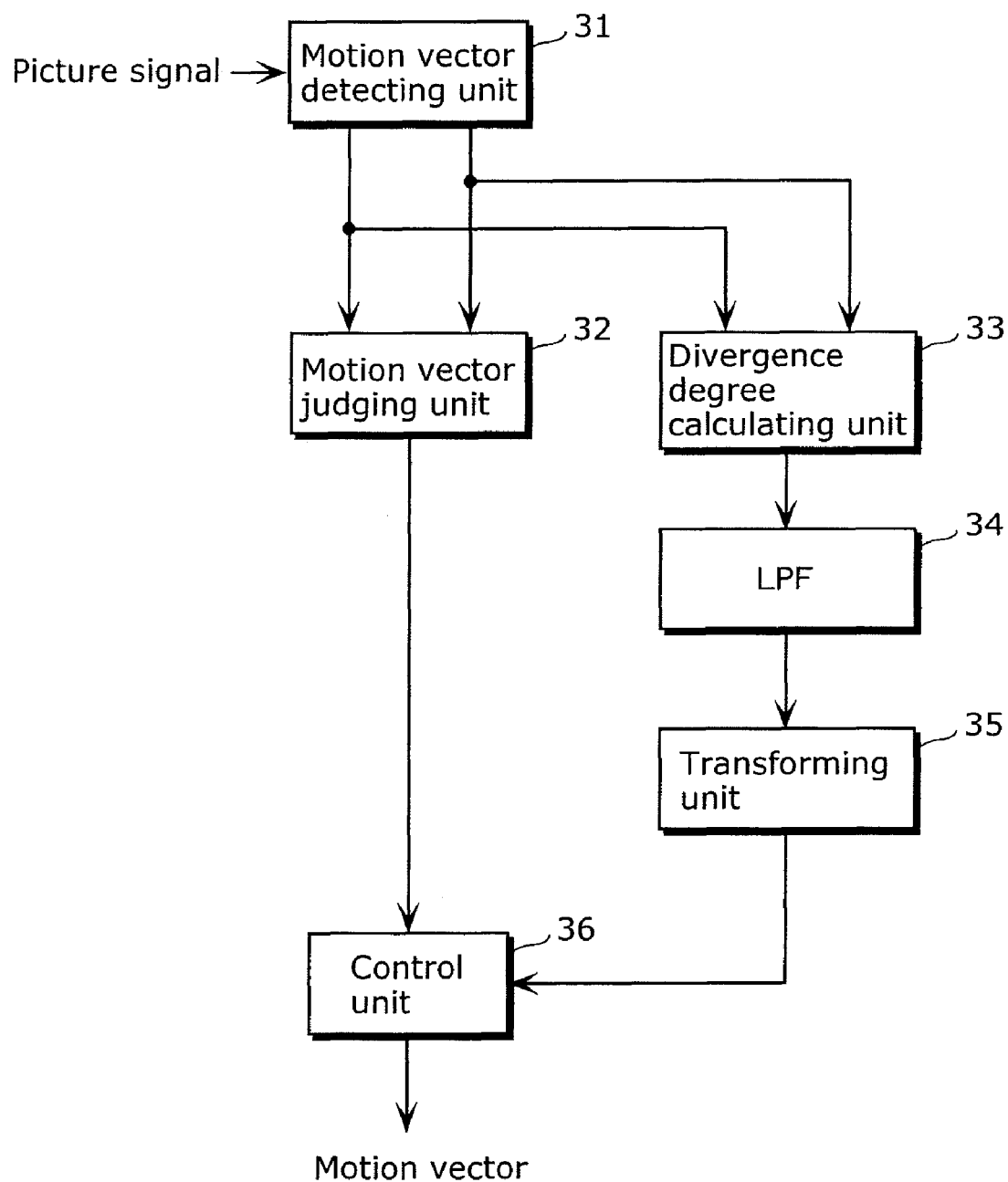
FIG. 35 is a block diagram showing the configuration of the motion vector detecting device included in a conventional image-capturing apparatus.
Figure 36:
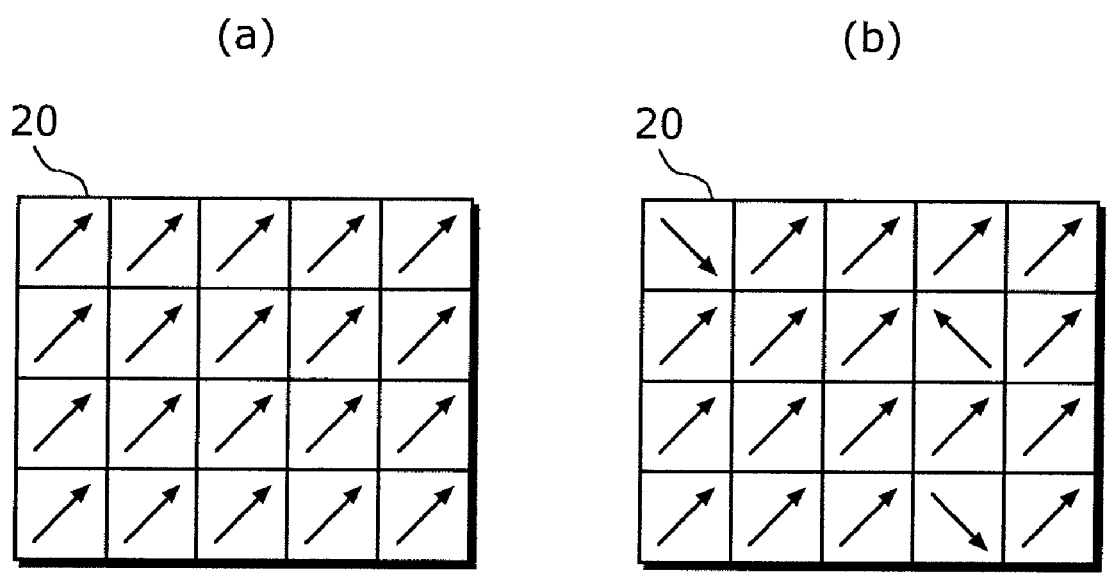
FIG. 36(a), (b) is a diagram showing an example of motion vectors.
Figure 37:
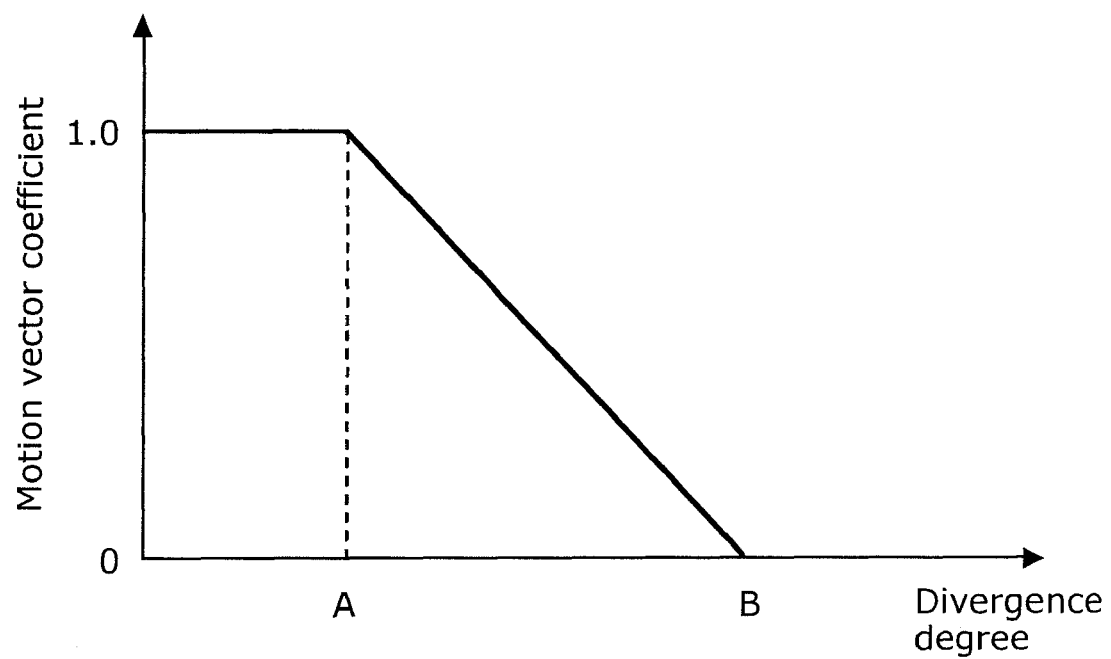
FIG. 37 is a diagram showing the relationship between a motion vector coefficient and a divergence degree included in a conventional image-capturing apparatus.

The framing region correcting unit 144 corrects the framing region to a position that cancels out the image blur, by using the camera motion signal 90 obtained from the camera motion calculating unit 143. The procedure for the correction is the same as in the processing described using FIG. 34. In other words, the camera motion signal 90 indicates the same motion as the camera motion 14 in FIG. 35(*b*). Consequently, upon obtaining the framing region setting signal 148 from the framing region setting unit 141, the framing region correcting unit 144 moves the coordinates (the coordinates of points 162 and 163 shown in FIG. 10) of the framing region 160 indicated by the framing region setting signal 148 by as much as a camera motion correction vector having the same length but opposite direction as the motion vector indicated by the camera motion signal 90. In addition, the framing region correcting unit 144 outputs, as a corrected framing region signal 91, information indicating the position of the framing region that has been corrected through the movement of the coordinates.

The corrected framing region clip-out unit 145 obtains the input picture 117 from the image sensor unit 103, and obtains the corrected framing region signal 91 from the framing region correcting unit 144. Subsequently, the corrected framing region clip-out unit 145 clips-out, from the input picture 117, the framing region for which image blur has been corrected, indicated by the corrected framing region signal 91, and outputs the clipped-out picture as an image blur-corrected framing picture 92.

The output picture size adjusting unit 146 obtains the image blur-corrected framing picture 92 from the corrected framing region clip-out unit 145 converts the picture size (number of horizontal pixels and lines) thereof so as to match the size of the picture displayed on the display apparatus 40 or the size of the picture recorded on the video recording apparatus 50, that is, the size of the above-described targeted output picture 20. In addition, the output picture size adjusting unit 164 outputs the picture size-converted image blur-corrected framing picture 92 as an image blur-corrected picture 134.

It should be noted that when the number of horizontal pixels and lines of the image blur-corrected framing picture 92 is set by the framing region setting unit 141 so as to match that of the targeted image blur-corrected picture 134, the output picture size adjusting unit 146 does not need to convert the picture size, and outputs the image blur-corrected framing picture 92 directly as the image blur-corrected picture 134.

Furthermore, when the number of horizontal pixels and lines of the image blur-corrected framing picture 92 is greater than that of the targeted image blur-corrected picture 134, the output picture size adjusting unit 146 performs reduction processing. For example, when the size of the image blur-corrected framing picture 92 is 720 pixels×480 lines and the size of the targeted image blur-corrected picture 134 is 360 pixels×240 lines, the output picture size adjusting unit 146 reduces both the number of horizontal pixels and lines of the image blur-corrected framing picture 92 by ½. In reduction processing, in general, in order to prevent picture deterioration due to replication, the high-frequency component is canceled using a low-pass filter, and the number of pixels and lines is reduced by sub-sampling.

On the other hand, when the number of horizontal pixels and lines of the image blur-corrected framing picture 92 is less than that of the targeted image blur-corrected picture 134, the output picture size adjusting unit 146 performs enlargement processing. For example, when the size of the image blur-corrected framing picture 92 is 720 pixels×480 lines and the size of the targeted image blur-corrected picture 134 is 2160 pixels×1440 lines, the output picture size adjusting unit 146 enlarges both the number of horizontal pixels and lines of the image blur-corrected framing picture 92 threefold. Although re-sampling by binary interpolation or bi-cubic interpolation is available in the enlargement processing, high-frequency components are difficult to create using interpolation, and thus an out-of-focus picture of low sharpness normally results. Furthermore, this trend becomes stronger as the rate of enlargement increases and, the smaller the input picture 117 is compared to the framing region 160, the more the picture quality of the image blur-corrected picture 134 deteriorates.

Consequently, in the present invention, when enlargement processing is performed, the output picture size adjusting unit 146 constructs the image blur-corrected picture 134 from already-image-captured, past pictures. More specifically, the output picture size adjusting unit 146 uses pictures which were image-captured in the past as a database for picture enlargement, and constructs the image blur-corrected picture 134 using picture data referred to from the database.

Figure 15:
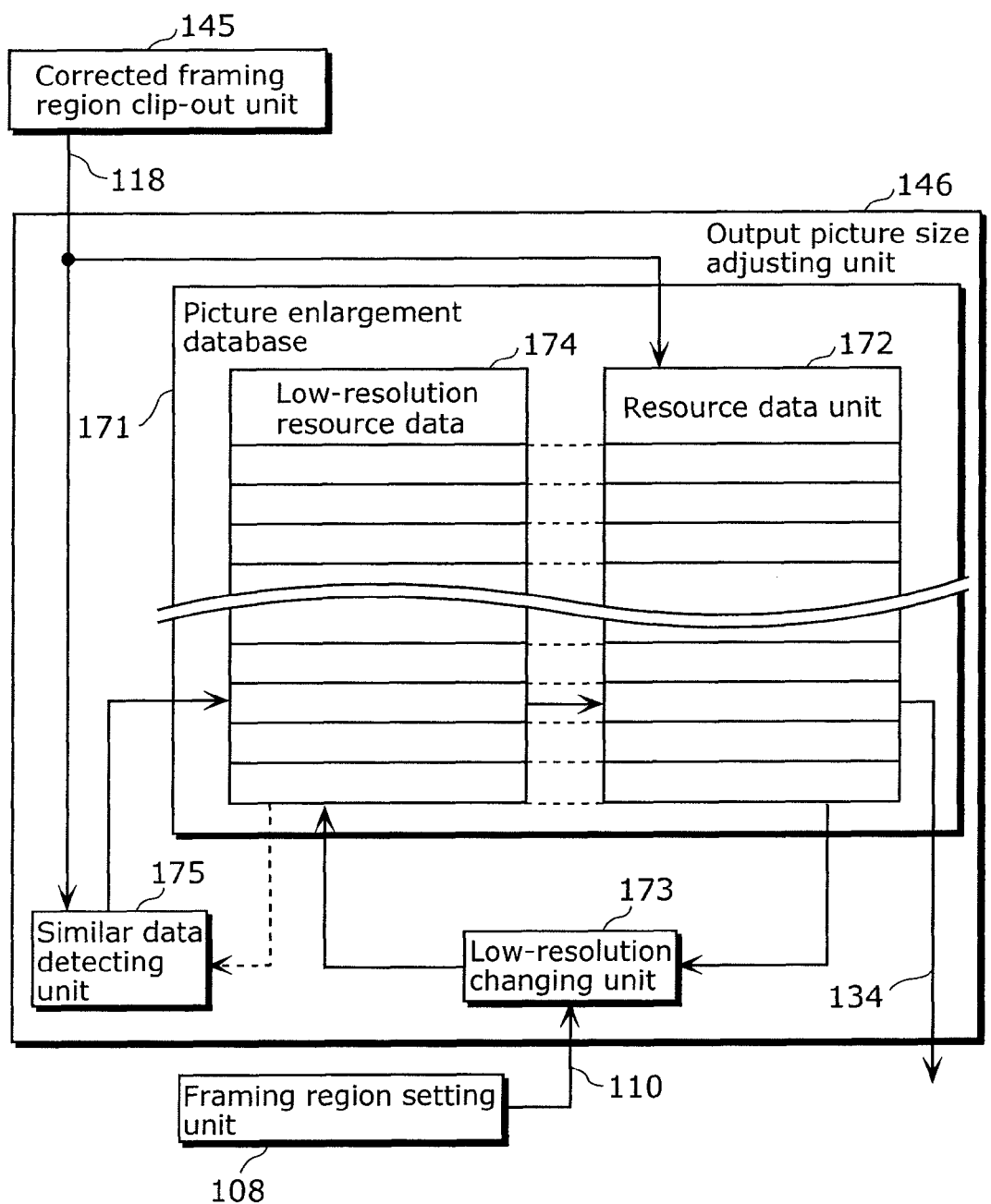
FIG. 15 is a block diagram for picture-enlarging an image blur-corrected framing picture by referring to a picture enlargement dictionary, and calculating an image blur corrected picture.

FIG. 15 is a block diagram showing an example of the internal configuration of the output picture size adjusting unit 146 which performs the enlargement processing. The output picture size adjusting unit 146 enlarges the image blur-corrected framing picture 92 by referring to a picture enlargement database 171, and includes the picture enlargement database 171, a low-resolution changing unit 173, and a similar data detecting unit 175. Furthermore, the picture enlargement database 171 includes a resource data unit 172, and a low-resolution resource data unit 174.

When performing the enlargement processing, the output picture size adjusting unit 146 builds the resources of the picture enlargement database 171 in advance, and performs the enlargement processing using such resources.

First, the building of resources of the picture enlargement database 171 by the output picture size adjusting unit 146 shall be described.

The resource data unit 172 holds pictures which were image-captured in the past as resources for picture enlargement. Therefore, the resource data unit 172 obtains the image blur-corrected framing pictures 92 outputted from the corrected framing region clip-out unit 145, and holds them as picture enlargement resources.

The low-resolution changing unit 173 changes, to low-resolution, the picture enlargement resources held by the resource data unit 172, according to the ratio of the number of pixels and lines of the framing region 160 with respect to the targeted image blur-corrected picture 134 or a low-resolution changing model of the image sensor 103. With the low-resolution changing model of the image sensor 103, a picture reduction database is created by image-capturing low-resolution pictures and high-resolution pictures using plural samples, and a low-resolution changing function is analytically derived based on the samples, in advance. Alternatively, the performance of low-pass filtering and sub-sampling on the picture enlargement resources can be adopted as the low-resolution changing model.

The low-resolution changing unit 173 stores the resources that have been changed to low-resolution into the low-resolution resource data unit 174. At this time, the low-resolution changing unit 173 associates the picture enlargement resources (the high-resolution pictures image-captured in the past) of the resource data unit 172 and the resources (low-resolution pictures) generated by changing to low-resolution such picture enlargement resources. Therefore, by using the picture enlargement database 171, pictures of low resolution can be replaced with pictures of high resolution. It should be noted that the resource data unit 172 and the low-resolution resource data unit 174 may hold low-resolution and high-resolution pictures on a per picture basis or by blocks making up the picture.

Next, the enlargement processing by the output picture size adjusting unit 146 shall be described.

The similar data detecting unit 175 obtains the image blur-corrected framing picture 92 from the corrected framing region clip-out unit 145. Then, the similar data detecting unit 175 refers to the low-resolution resource data unit 174, and detects a low-resolution resource (picture) having the highest similarity with the image blur-corrected framing picture 92. Then, the similar data detecting unit 175 searches out the original resource (high-resolution picture) associated with the detected low-resolution resource from the resource data unit 172. The similar data detecting unit 175 adopts the searched-out resource as the image blur-corrected picture 134, and causes this to be outputted from the resource data unit 172.

It should be noted that although the criterion for similarity used by the similar data detecting unit 175 is arbitrary, the similarity between spatial frequency characteristics may also be used, for example. Specifically, the data stored in the resource data unit 172 and the low-resolution resource data unit 174, respectively, need not be the picture data itself, and may be the picture feature vector resulting from the wavelet transformation described using FIG. 3, for example. By using the picture feature vector resulting from the wavelet transformation, in the case of scale n=3, it is possible to calculate 10 wavelet coefficients, and define a 10-dimensional picture feature vector $(w_1, w_2, \ldots, w_{10})$ having these coefficients as elements, as previously described. In this case, degree of similarity will be the amount of distance of the picture feature vectors in the 10-dimensional picture feature space, and the picture feature vector of the low-resolution resource data that that is closest to the picture feature vector of the image blur-corrected framing picture 92 is detected.

When using such spatial frequency characteristics similarity, it is necessary to transform the respective picture data into spatial frequency data.

Figure 16:
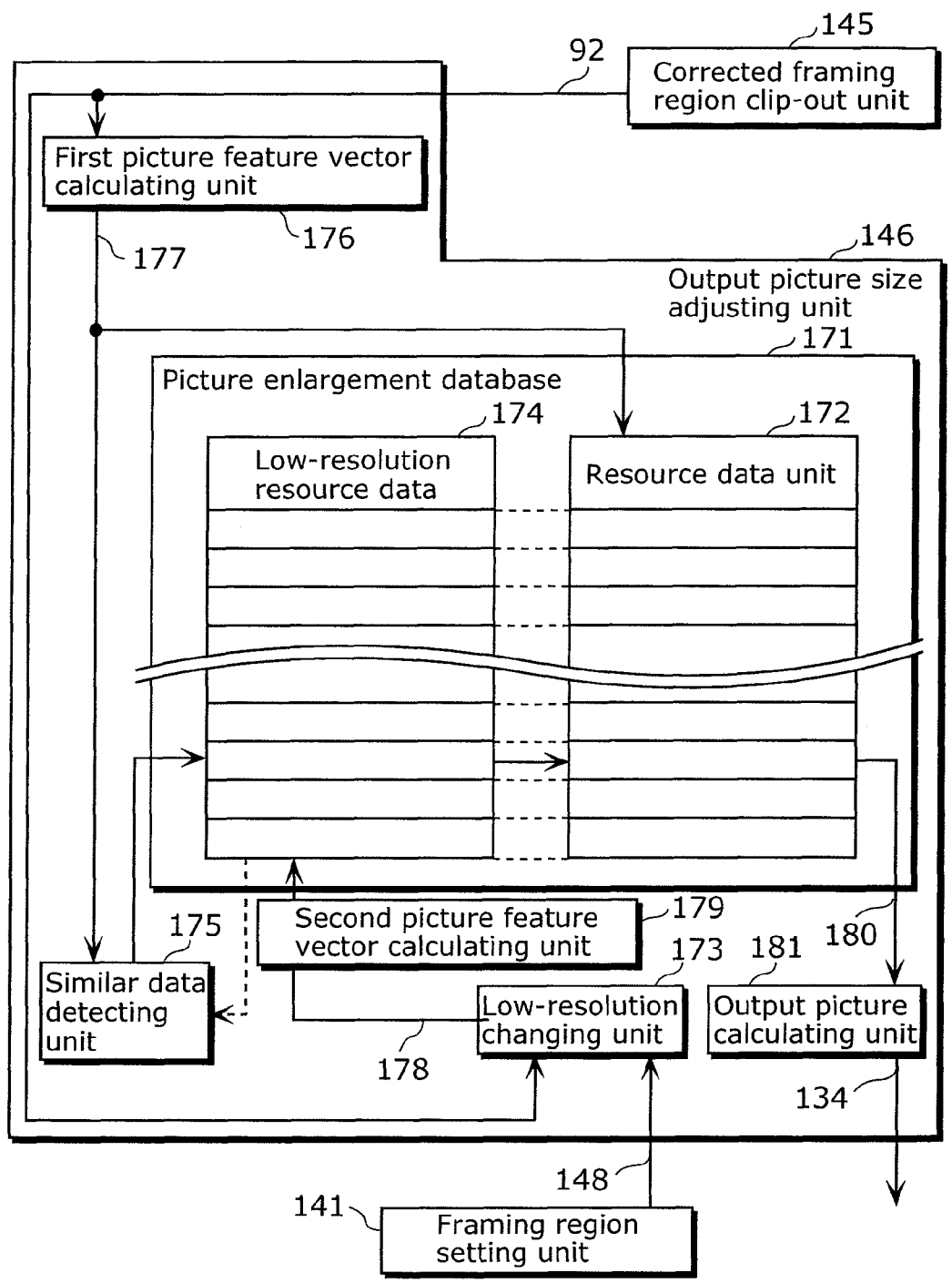
FIG. 16 is a block diagram describing the configuration of an output picture size adjusting unit.

FIG. 16 is a block diagram showing an example of the internal configuration of the output picture size adjusting unit 146.

The output picture size adjusting unit 146 includes a first picture feature vector calculating unit 176, a second picture feature vector calculating unit 179, the picture enlargement database 171, the low-resolution changing unit 173, the similar data detecting unit 175, and an output picture calculating unit 181.

When performing the enlargement processing in the same manner as described above, the output picture size adjusting unit 146 builds the resources of the picture enlargement database 171 in advance, and performs the enlargement processing using such resources.

First, the processing when the output picture size adjusting unit 146 performs the enlargement processing in the state where the resources of the picture enlargement database 171 have been built shall be described.

The picture feature vector indicating a high-resolution picture, and the picture feature vector indicating the low resolution picture corresponding to the high-resolution picture are stored in association with each other, in each of the resource data unit 172 and the low-resolution resource data unit 174.

When the output picture size adjusting unit 146 performs the enlargement processing, the first picture feature vector calculating unit 176 obtains the image blur-corrected framing picture 92 outputted from the corrected framing region clip-out unit 145, and transforms the image blur-corrected framing picture 92 into a picture feature vector 177, and outputs this to the similar data detecting unit 175. Here, the first picture feature vector calculating unit 176 calculates the picture feature vector, for example, in the same manner as shown in FIG. 3.

The similar data detecting unit 175 searches out the picture feature vector that is closest to the picture feature vector 177 of the image blur-corrected framing picture 118, from the low-resolution resource data unit 174. Then, the similar data detecting unit 175 causes high-resolution picture feature vector associated with the searched-out low-resolution picture feature vector to be outputted from the resource data unit 172.

Specifically, the similar data detecting unit 175 which serves as the previously described similar data searching unit, searches for the low-resolution resource data indicating the spatial frequency characteristic that is similar to the spatial frequency characteristic of the picture clipped-out by the clip-out unit.

The output picture calculating unit 181 transforms an output picture feature vector 180 into the image blur-corrected picture 134 by performing, on the high-resolution picture feature vector outputted from the resource data unit 172, inverse-transformation of the wavelet transformation performed by the first picture feature vector calculating unit 176, and outputs the image blur-corrected picture 134.

On the other hand, when the output picture size adjusting unit 146 builds the resources of the picture enlargement database 171, the first picture feature vector calculating unit 176 calculates the high-resolution picture feature vector 177 corresponding to the image blur-corrected framing picture 92, and stores it in the resource data unit 172 of the picture enlargement database 171. The picture feature vector 177 stored in such manner is referred to as the picture feature amount of an enlarged picture.

The low-resolution changing unit 173 obtains the image blur-corrected framing picture 92 corresponding to the picture feature vector 177 calculated by the first picture feature vector calculating unit 176. Then, the low-resolution changing unit 173 changes to low-resolution the image blur-corrected framing picture 92 according to the ratio of the number of pixels and lines of the framing region 160 with respect to the targeted image blur-corrected picture 134 or the low-resolution changing model of the image sensor 103, and outputs a low-resolution-changed image blur-corrected framing picture 178.

The second picture feature vector calculating unit 179 calculates the picture feature vector of the low-resolution-changed image blur-corrected framing picture 178, and stores the calculated picture feature vector in the low-resolution resource data unit 174. The picture feature vector calculation method used by the second picture feature vector calculating unit 179 is the same as that used by the first picture feature vector calculating unit 176 and, as a result, compatibility with the resource data unit 172 is ensured.

Since the output picture size adjusting unit 146 is configured in this manner, the similar data detecting unit 175 can detect, in the picture feature amount vector space, the low-resolution resource having the greatest similarity to the image blur-corrected framing picture 92. In addition, the similar data detecting unit 175 can refer to the high-resolution resource that served as the original for generating the detected low-resolution resource, from the resource data unit 172, and output it as the output picture feature vector 180.

It should be noted that to enable high-speed processing by the similar data detecting unit 175, it is effective to adopt a method in which the reference range is narrowed down once using the LL component of the scale n shown in FIG. 3, and perform the picture feature vector distance comparison within the narrowed-down range.

The output unit 115 has the same interface as the display apparatus 40 or the video recording apparatus 50, and outputs the output picture 102 to the display apparatus 40 or the video recording apparatus 50. It should be noted that the display apparatus 40 or the video recording apparatus 50 is an example of an external video device, and the present invention does not provide restrictions on the external video device.

The image-captured picture display unit 116 displays the image blur-corrected framing picture 92 to the image-capturing person 60. The image-capturing person 60 can visually check the image-capturing angle of view by looking at the image blur-corrected framing picture 92 displayed by the image-captured picture display unit 116. Normally, based on the size of the image-capturing apparatus 100, the length between diagonally opposing corners of the display panel utilized in the image-captured picture display unit 116 is more or less 3 inches, and the number of horizontal pixels is about 320 pixels and the number of lines is about 240 lines. Therefore, in most cases, the number of horizontal pixels and lines of the display panel is less than that of the image sensor unit 103, and the picture size conversion in the image-captured picture display unit 116 is, substantially, reduction processing. In reduction processing, normally, in order to prevent picture deterioration due to replication, the high-frequency component is canceled using a low-pass filter, and the number of pixels and lines is reduced by sub-sampling.

Figure 17:
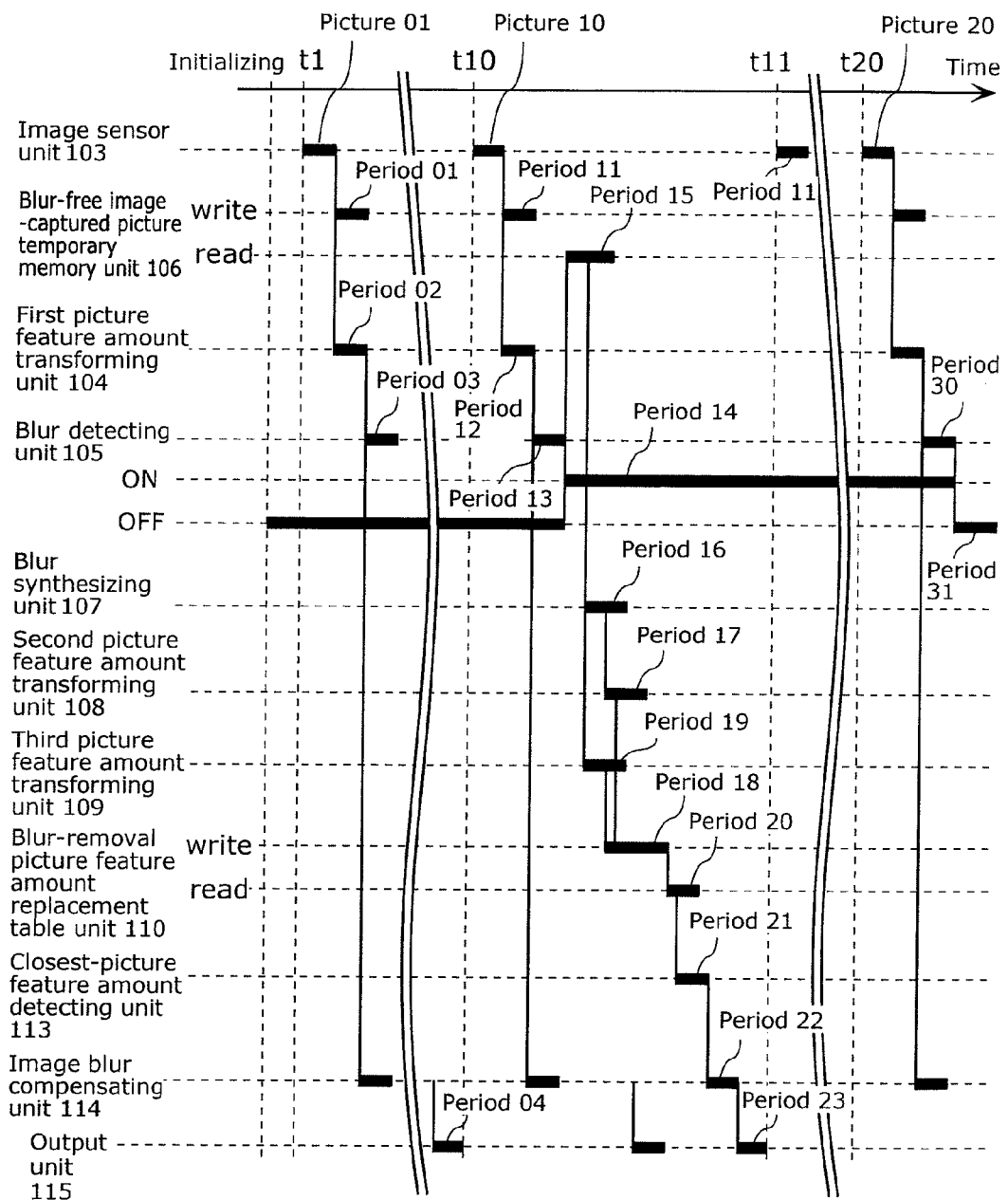
FIG. 17 is a diagram showing the operational timing of each constituent element of the image-capturing apparatus.

FIG. 17 is a diagram showing the operational timing of each constituent element of the image-capturing apparatus 100.

All the elements making up the image-capturing apparatus 100 are immediately initialized after activation when power is supplied. The blur presence/absence information in the blur detection information 119 outputted by the blur detecting unit 105 is reset to OFF (blur-free) by the initialization.

Image-capturing is started at the timing in time t1, and the image sensor 103 image-captures a picture 01. The picture 01 is written into the blur-free image-captured picture temporary memory unit 106 (period 01) and, at the same time, transformed into a picture feature amount by the first picture feature amount transforming unit 104 (period 02). The picture feature amount of the first picture feature amount transforming unit 104 is inputted to the blur detecting unit 105 and blur detection processing is performed (period 03). Assuming that blurring is not detected in period 03, the blur presence/absence information in the blur detection information 119 is kept on OFF, and the parts concerned with blur removal do not operate. The picture 01 is inputted to the image blur correcting unit 114, the image blur-corrected picture 134 is generated and is placed on stand-by until the operation of the output unit 115. The output unit 115 outputs the image blur-corrected picture 134 to the outside, as the output picture 102, at the timing in period 04.

In continuing, image-capturing is started at the timing in time t2 and, when the occurrence of blurring is not detected as in time t1, the same operation is performed as in period 01 to period 04.

Next, the operational timing during the occurrence of blurring shall be described with time t10 as an example.

The image sensor 103 image-captures a picture 10. The picture 10 is written into the blur-free image-captured picture temporary memory unit 106 (period 11) and, at the same time, transformed into a picture feature amount by the first picture feature amount transforming unit 104 (period 12). The picture feature amount from the first picture feature amount transforming unit 104 is inputted to the blur detecting unit 105 and blur detection processing is performed (period 13). When blurring is detected in period 13, blur presence/absence information in the blur detection information 119 is switched to ON (period 14). When the blur presence/absence information in the blur detection information 119 is switched to ON, the blur-free image-captured picture temporary memory unit 106 shifts from the write mode to the read mode, the blur-free image-captured pictures 129 are read and outputted to the blur synthesizing unit 107 and the third picture feature amount transforming unit 109 (period 15). Upon obtaining the blur-free image-captured pictures 129, the blur synthesizing unit 107 starts the blur synthesizing operation (period 16) and, upon the end of synthesizing, sequentially outputs the blur-synthesized pictures 130 to the second picture feature amount transforming unit 108. Upon calculating the blur-synthesized picture feature amounts 131 (period 17), the second picture feature amount transforming unit 108 writes them into the blur-synthesized picture feature amount storage unit 111 (period 18). In the same manner, upon calculating the blur-free image-captured picture feature amounts 132 (period 19), the third picture feature amount transforming unit 109 writes them into the blur-free picture feature amount storage unit 112. When the writing into the blur-removal picture feature amount replacement table unit 110 is completed (period 18 ends), the blur-removal picture feature amount replacement table unit 110 shifts to the read mode (period 20), and the closest-picture feature amount detecting unit 113 starts searching for the closest-picture feature amount (period 21). When the closest-picture feature amount is detected and the blur-removal picture feature vector picture 133 is outputted from the blur-removal picture feature amount replacement table unit 110, the image blur correcting unit 114 corrects the image blur in the blur-removal picture feature vector picture 133 and outputs the image blur-corrected picture 134 (period 22). The output unit 115 outputs the image blur-corrected picture 134 to the outside, as the output picture 102, at the timing in period 23.

In continuing, although the image sensor 103 image-captures a picture 11 at the timing in time 11, in the example shown in FIG. 17, the occurrence of blurring continues up to time 19 and the blur presence/absence information in the blur detection information 119 continues to be in the ON state.

In a picture 20 that is image-captured at time t20, blurring does not occur, and it is judged as blur-free in period 30, and the blur detection information 119 outputted by the blur detecting unit 105 is switched to OFF (period 31).

Figure 18:
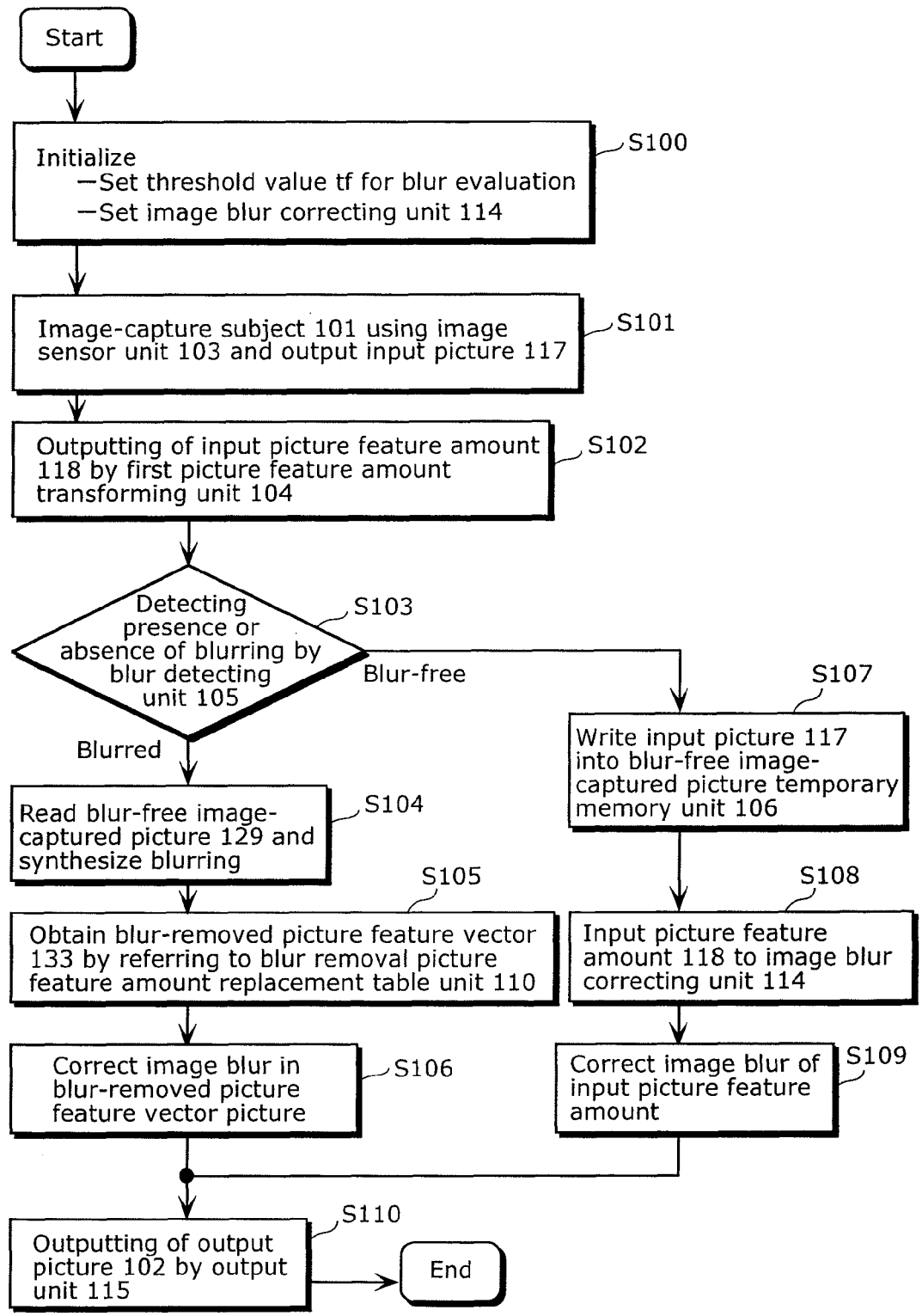
FIG. 18 shows the operation flow of the block diagram of the image-capturing apparatus.

FIG. 18 is a flowchart showing the operation of the image-capturing apparatus 100.

First, the image-capturing apparatus 100 performs two initializations sequentially described below (step S100). The first initialization is the setting of a blur evaluation threshold value tf. The blur detecting unit 105 tracks the distance change of the picture feature amount vectors in chronological order and judges "blurred" when the distance change amount exceeds the blur evaluation threshold value tf, and judges "blur-free" when not exceeded.

The second initialization is for settings which concern the operation of the image blur correcting unit 114. The settings for the image blur correcting unit 114 are made up of the following two.

The first setting for the image blur correcting unit 114 is the setting for motion vector similarity (allowable range) in the detection of motion vectors of a still object. As shown in FIG. 12, a motion vector is obtained as the motion of a feature point of the same pixel value at the time t1 and the time t2. However, in actuality, there are cases were the pixel value changes even for the same feature point due to various reasons such as camera noise or changes in lighting, and anisotropy of subject reflectance. Therefore, as shown by the arrows in solid line in FIG. 19, even motion vectors of still objects are of various directions and sizes. Consequently, the still object detecting unit 142 gathers similar motion vectors from among the motion vectors of the outer-frame region 161, and it is necessary to perform processing such as having the camera motion calculating unit 143 calculate the average of the similar motion vectors and adopt such average as the camera motion, for example.

Figure 19:
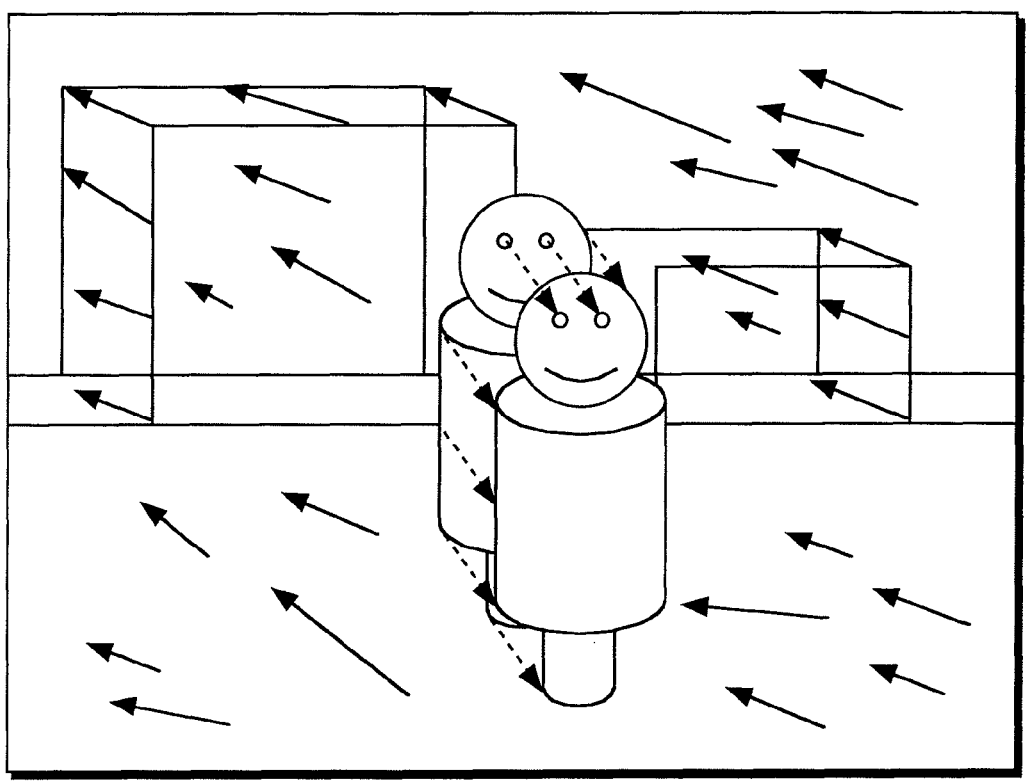
FIG. 19(a), (b) is a diagram describing the effects imparted on the motion vectors of a still object by camera noise and a change in lighting.
Figure 19:
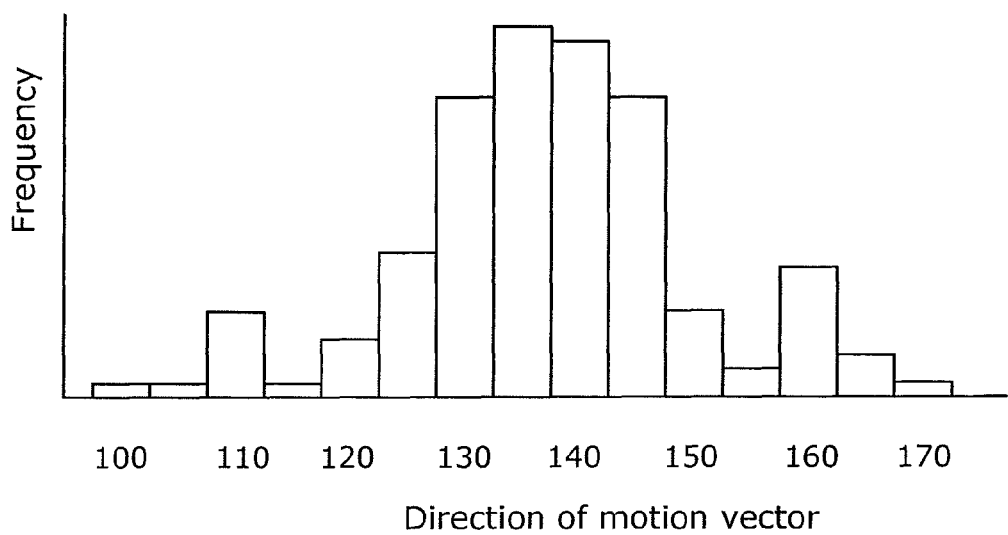

Specifically, the still object detecting unit 142 creates a histogram indicating the relationship between the directions of the motion vectors and the frequency of the motion vectors in the respective directions, as shown in FIG. 19($b$). Then, the still object detecting unit 142 accumulates the motion vectors in descending order of frequency, and adopts, for example, the motion vectors reaching up to 50 percent of the total frequency as candidates for similar vectors (motion vectors of still objects), then discards the rest. In addition, the still object detecting unit 142 calculates the average value of the size and the variance of the similar vector candidates, extracts vectors falling within 75 percent of the variance for example, and, with this as a final result, adopts such vectors as the motion vectors of the still objects. In this case, the still object detecting unit 142 sets, as initial settings, the pitch of the directions of the motion vectors necessary for determining the horizontal axis of the histogram, the percentages for the cumulative frequencies necessary for determining the similar vector candidates, and the variance value necessary for extracting the final result from the similar vector candidates.

It should be noted that the above description is merely one example, and the present invention does not provide restrictions on the method of detecting the motion vectors of still objects. Furthermore, the setting of the similarity in the motion vectors of the still objects is executed by reading data from a memory included in the still object detecting unit 142.

The second setting for the image blur correcting unit 114 is the setting of the framing region. The framing region is set using a predetermined percentage with respect to the number of pixels and lines of the input picture 117, for example. In the case where it is assumed that the number of pixels and lines of the input picture 117 is 1080 pixels and 720 lines, respectively, and the percentage for the framing region is 75%, the number of pixels and lines for the framing region becomes 810 pixels and 540 lines, respectively. As shown in FIG. 10, the position of the framing region is determined so that the center of the framing region 160 matches the center of the input picture 117. The setting of the framing region is performed by the framing region setting unit 141 which is an internal structure of the image blur correcting unit 114.

It should be noted that the above description is merely one example, and the present invention does not provide restrictions on the method for setting the framing region. For example, percentages for the number of pixels and lines of the framing region with respect to the input picture may be separately set. The setting of the framing region is executed by reading data from a memory included in the image blur correcting unit 114.

Continuing from the initialization in step S100, the image sensor unit 103 image-captures the subject 101 and outputs the image-captured picture as an input picture 117 (step S101). The first picture feature amount transforming unit 104 transforms the input picture 117 into a picture feature amount and outputs the input picture feature amount 118 (step S102). The blur detecting unit 105 detects the presence or absence of blurring (step S103). As a result, when blurring is detected (blurred in step S103), the blur synthesizing unit 107 performs blur synthesizing on the blur-free image-captured pictures 129 and generates blur-synthesized pictures 130 (step S104). The closest-picture feature amount detecting unit 113 obtains the blur-removal picture feature vector picture 133 by referring to the blur-removal picture feature amount replacement table unit 110 (step S105). The image blur correcting unit 114 corrects the image blur of the blur-removal picture feature vector picture 133 and outputs the result as the image blur-corrected picture 134 (step S106).

On the other hand, when blurring is not detected (blur-free in step S103), the input picture 117 is written into the blur-free image-captured picture temporary memory unit 106 (step S107). The input picture feature amount 118 is inputted to the image blur correcting unit 114 (step S108). The image blur correcting unit 114 corrects the image blur of the input picture feature amount 118, and outputs the result as the image blur-corrected picture 134 (step S109).

The output unit 115 outputs the image blur-corrected picture 134 as the output picture 102 (step S110).

Meanwhile, the 3-dimensional motion of the camera can be broken down into rotational motion and translational motion. The method of correcting image blur by making the size of the framing region constant and changing the position of the framing region mainly corrects image blur occurring due to rotational motion. On the other hand, image blur occurring due to translational motion is corrected by changing the size of the framing region. Consequently, when considering the rotational motion and the translational motion in an integrated manner, the camera motion calculation unit 143 and the framing region correcting unit 144 may perform 3-dimensional affine transformation, detect the rotational motion and translational motion of the camera in an integrated manner, and change the position and the size of the framing region. Such an integrated detection is equivalent to least squares approximation of the 3-dimensional affine transformation matrix coefficients using plural motion vectors. As described above, by generalizing using the integrated 3-dimensional affine transformation, image blur correction that is more accurate than in the case of changing the position of the fixed-sized framing region described in FIG. 34 becomes possible.

It should be noted that when a non-volatile memory is used for the blur-free image-captured picture temporary memory unit 106 and the blur-removal picture feature amount replacement table unit 110, data can be held even after power to the image-capturing apparatus 100 is cut off. Accordingly, after the reactivation of the image-capturing apparatus 100, the data of the blur-free image-captured picture temporary memory unit 106 and the blur-removal picture feature amount replacement table unit 110 can be used immediately.

As described above, with the image-capturing apparatus 100 in the present embodiment, it is possible to record images without image blur during the image-capturing of a sports scene in which movement of the subject is intense. Furthermore, blurring caused by camera motion can be removed, and even a user that is not used to camera image-capturing can freely image-capture video without worrying about image blur.

Second Embodiment

In the present embodiment, an image-capturing, recording and reproducing apparatus which includes a recording medium unit which records an image-captured picture.

Figure 20:
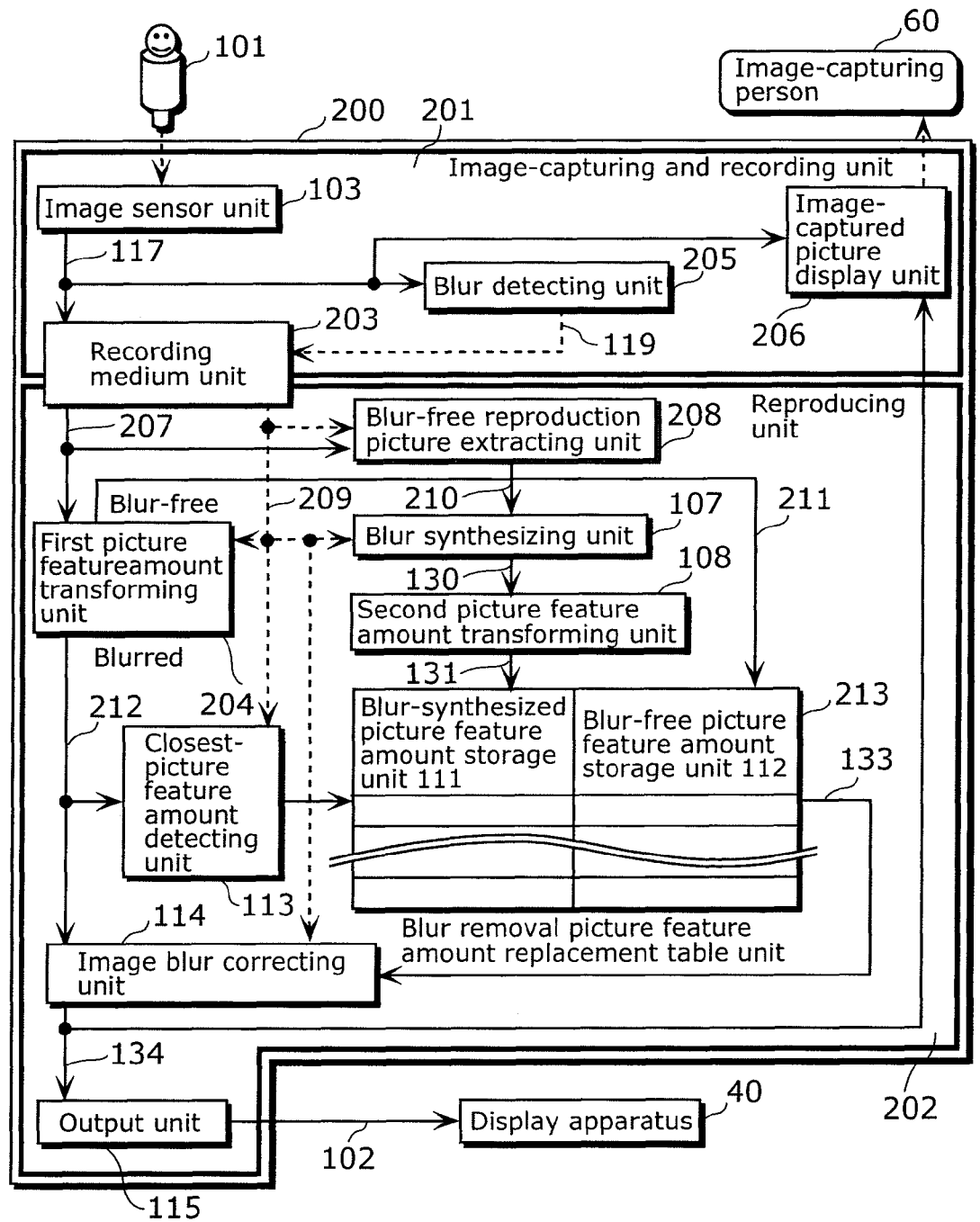
FIG. 20 is a block diagram showing the configuration of an image-capturing, recording and reproducing apparatus in a second embodiment of the present invention.

FIG. 20 is a block diagram showing the configuration of an image-capturing, recording and reproducing apparatus 200 according to the second embodiment of the present invention. It should be noted that the same reference numbers are assigned to parts which are the same as in the image-capturing apparatus 100 shown in FIG. 1, and their detailed description shall be omitted.

The image-capturing, recording and reproducing apparatus 200 is an apparatus which image-captures a subject 101 in the form of video, removes blurring which occurs in the input picture 117, corrects image blur, and outputs the output picture 102 in the form of video. As shown in FIG. 20, the image-capturing, recording and reproducing apparatus 200 includes an image-capturing and recording unit 201 which image-captures the subject 101 and records the image-captured picture in a recording medium unit 203, and a reproducing unit 202 which reproduces the picture recorded in the recording medium unit 203 and outputs the reproduced output picture 102. The output picture 102 is shown, for example, on the display apparatus 40 connected to the image-capturing, recording and reproducing apparatus 200.

The image-capturing and recording unit 201 includes the image sensor unit 103, the recording medium unit 203, a blur detecting unit 205, and an image-captured picture display unit 206, and records the image-captured input picture 117 in the recording medium unit 203, together with the blur detection information 119 which includes blur presence/absence information indicating whether or not blurring has occurred, and blur position information indicating the position of pixels in which blurring has occurred.

The blur detecting unit 205 detects, on a per pixel basis, the blurring that occurs in the input picture 117. Although the blur detection method is arbitrary, blurring can be detected through threshold value processing of the distance change of picture feature vectors as shown in FIG. 6(a), when the blur detecting unit 205 has the functions of the first picture feature amount transforming unit 104 and the blur detecting unit 105 included in the image-capturing apparatus 100. The blur detecting unit 205 switches the blur presence/absence information in the blur detection information 119 to ON when it is judged that blurring has occurred, and switches the blur presence/absence information in the blur detection information 119 to OFF when it is judged that blurring has not occurred. Furthermore, the blur detecting unit 205 outputs information indicating the position of a pixel in which blurring has occurred, as the blur position information in the blur detection information 119.

The image-captured picture display unit 206 displays the input picture 117 to the image-capturing person 60. With this, the image-capturing person 60 can check the image-capturing angle of view.

The recording medium unit 203 records the input picture 117 and the blur detection information 119. Therefore, the input picture 117 is identified as a "blurred image-captured picture" or a "blur-free image-captured picture", on a per picture basis.

FIG. 21 is a diagram describing an example of a recording format. The recording format includes a memory address portion 220 for managing recording positions in the recording medium unit 203, and a data portion 221. Each input picture 117, a time code 222 of the input picture 117, and the blur detection information 119 are recorded on the data portion 221. By referring to the time code 222, it is possible to recognize at which point in time in the image sequence an input picture is taken.

The reproducing unit 202 includes the recording medium unit 203, a first picture feature amount transforming unit 204, a blur-free reproduction picture extracting unit 208, the blur synthesizing unit 107, the second picture feature amount transforming unit 108, a blur removal picture feature amount replacement table unit 213, the blur-synthesized picture feature amount storage unit 111, the blur-free picture feature amount storage unit 112, the closest-picture feature amount detecting unit 113, the image blur correcting unit 114, and the output unit 115. The reproducing unit 202 generates the output picture 102 by reading the input picture 117 recorded on the recording medium unit 203, and correcting the blurring and the image blur in the input picture 117.

The recording medium unit 203 which has a reading function, reads the input picture 117 and the blur detection information 119, and outputs them as a reproduction picture 207 and blur detection information 209, respectively. Therefore, the reproduction picture 207 is identified as a "blurred reproduction picture" or a "blur-free reproduction picture", on a per picture basis.

After the reproduction picture 207 is read from the recording medium unit 203, the reproducing unit 202 operates separately in a "table creating mode" for creating the blur removal picture feature amount replacement table unit 213 and a "correcting mode" for correcting the blurring and the image blur in the reproduction picture 207.

Figure 22:
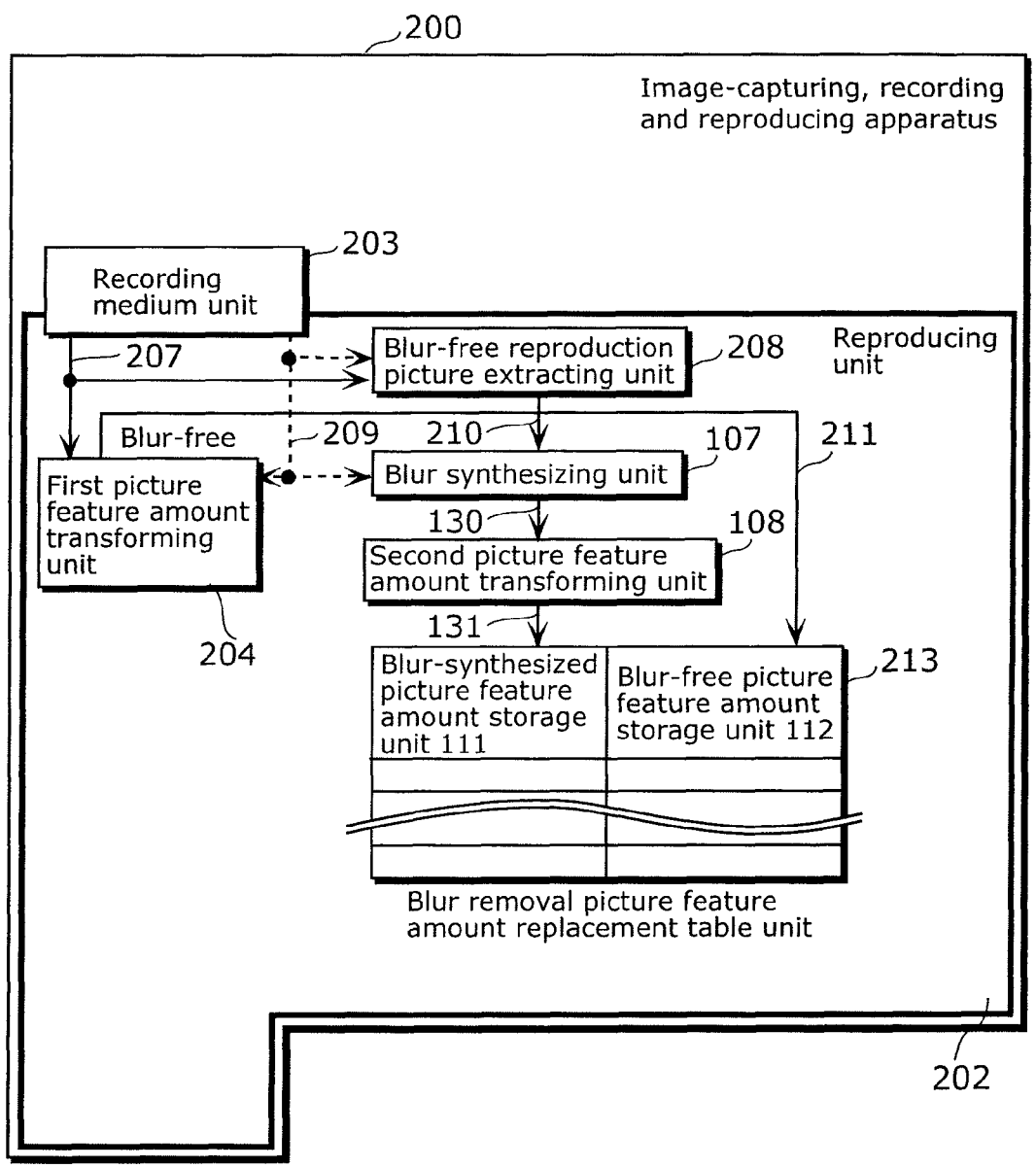
FIG. 22 is a diagram describing the operations in a table creating mode.
Figure 23:
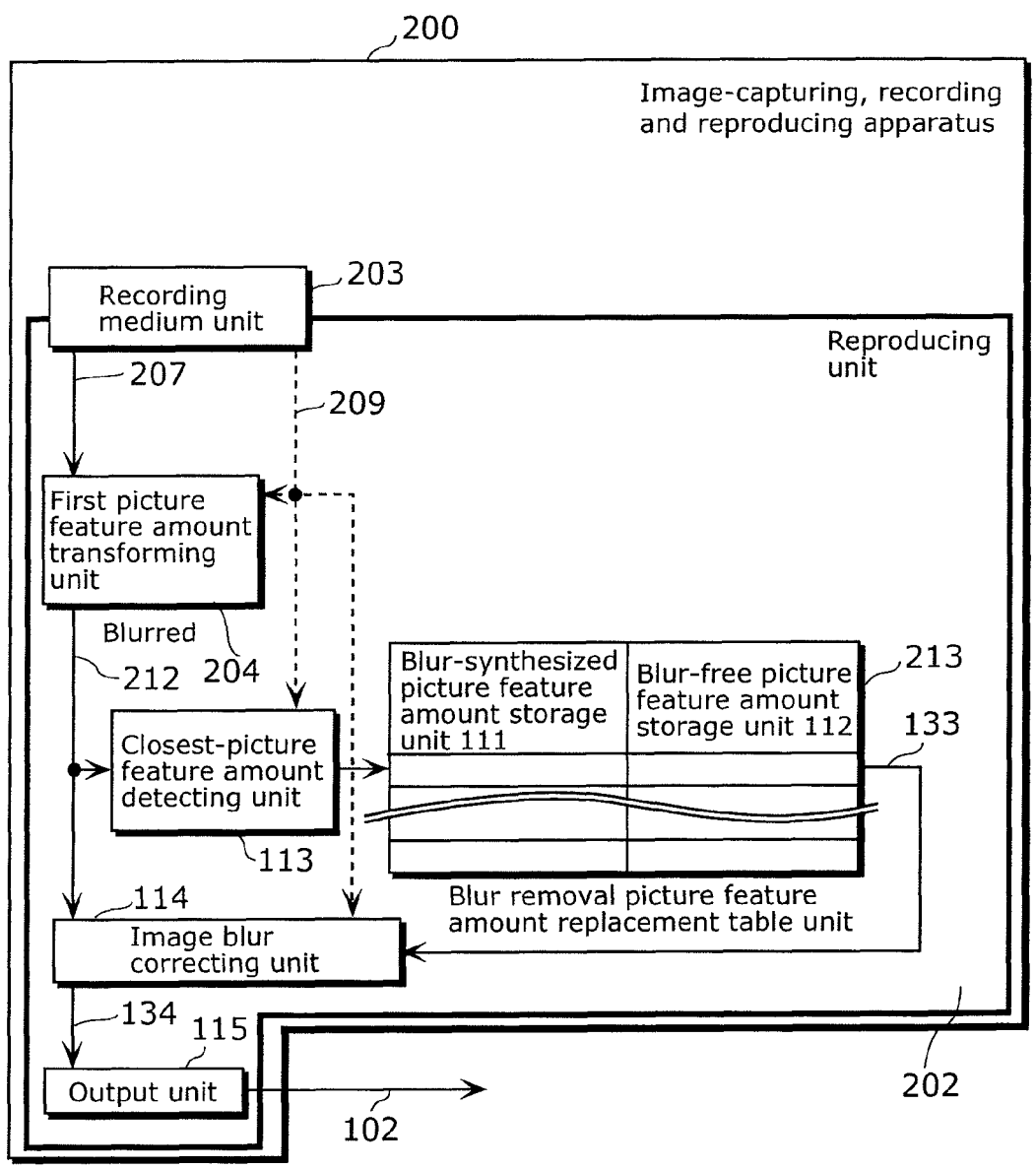
FIG. 23 is a diagram describing the operations in a correcting mode.

FIG. 22 is a block diagram showing only the parts which operate in the table creating mode, among the constituent elements of the reproducing unit 202, and corresponds to the operation up to when data is written into the blur removal picture feature amount replacement table unit 213 based on the reproduction picture 207 read from the recording medium 203. FIG. 23 is a block diagram showing only the parts which operate in the correcting mode, among the constituent elements of the reproducing unit 202, and corresponds to the operation up to when the blurring in the reproduction picture 207 read from the recording medium unit 203 is removed using the blur removal picture feature amount replacement table unit 213, and the image blur in the reproduction picture 207 is corrected in the image blur correcting unit 114. The table creating mode is executed before the correcting mode and is positioned for preparing the blur removal picture feature amount replacement table unit 213 which is required in the correcting mode. Hereinafter, the operation of the reproducing unit 202 shall be described by being divided into the table creating mode (FIG. 22) and the correcting mode (FIG. 23).

First, the table creating mode of the reproducing unit 202 shall be described.

When the blur presence/absence information in the blur detection information 209 is OFF, the blur-free reproduction picture extracting unit 208 judges that the reproduction picture 207 does not include blurring, and outputs the blur-free reproduction picture 210 to the blur synthesizing unit 107. When the blur presence/absence information in the blur detection information 209 is ON, the blur-free reproduction picture extracting unit 208 stops outputting and the blur-free reproduction picture 210 is not supplied to the blur synthesizing unit 107. Upon receiving the blur-free reproduction picture 210, the blur synthesizing unit 107 generates a blur-synthesized picture 130 by artificially causing blurring to occur in the inputted blur-free reproduction picture 210, in the same manner as in the image-capturing apparatus 100 in the first embodiment. The second picture feature amount transforming unit 108 generates the blurred composite picture feature amount 131, and stores it in the blur-synthesized picture feature amount storage unit 111.

Among reproduction pictures 207, the first picture feature amount transforming unit 204 transforms into a picture feature amount only a picture that does not include blurring, and outputs it as the reproduction picture feature amount 211. In order to judge the presence or absence of blurring, the first picture feature amount transforming unit 204 obtains the blur detection information 209 and transforms the reproduction picture 207 into a picture feature amount and outputs the reproduction picture feature amount 211, when the blur presence/absence information in the blur detection information is OFF. The reproduction picture feature amount 211 is stored in the blur-free picture feature amount storage unit 112.

It should be noted that for the picture feature amount used in blur removal, a few pictures ahead the occurrence of blurring are referred to, as shown in FIG. 6. This is because, in general, for temporally distant pictures, the image-captured scenes are different and the difference in picture feature amounts is great, and thus the number of picture feature amounts that can be used for blur removal is limited. Consequently, the blur removal picture feature amount replacement table unit 213 of the image-capturing, recording and reproducing apparatus 200 synchronously records the time code of each reproduction picture 207 as well, so the picture feature amount immediately preceding the time code of the blurred reproduction picture can be referred to. It should be noted that for the picture feature amount used in blur removal, a few pictures immediately after the disappearance of the blurring may be referred to instead of the few pictures immediately ahead of the occurrence of blurring.

The recording medium unit 203 has a random reading function and can specify stored data such as the memory address, time code, and blur detection information, and access data in a skipping manner. Consequently, in a video sequence in which blurred pictures and blur-free pictures exist together, it is possible to refer to the blur presence/absence information in the blur detection information 119, random access only the portions in which blurring has occurred, generate a blur-synthesized picture feature amount and a blur-free picture feature amount and store these in the blur removal picture feature amount replacement table unit 213.

Next, the correcting mode of the reproducing unit 202 shall be described.

Among reproduction pictures 207, the first picture feature amount transforming unit 204 transforms into a picture feature amount only a picture that includes blurring, and outputs it as the reproduction picture feature amount 211. Specifically, in order to judge the presence or absence of blurring, the first picture feature amount transforming unit 204 obtains the blur detection information 209 and, when the blur presence/absence information in the blur detection information is ON, transforms the reproduction picture 207 into a picture feature amount and outputs the reproduction picture feature amount 211. The series of operations by the closest-picture feature amount detecting unit 113 and the image blur correcting unit 114 to which the reproduction picture feature amount 211 is inputted, and operations continuing therefrom, are the same as in the image-capturing apparatus 100 in the first embodiment, and thus their description shall be omitted.

It should be noted that the table creating mode can be operated at all times while power to the image-capturing, recording and reproducing apparatus 200 is on, and that it operates in such a way that, when new data is written into the recording medium unit 203, picture feature amounts for blur removal (the blur-synthesized picture feature amount 131 and the reproduction picture feature amount 211) are sequentially registered in the blur removal picture feature amount replacement table unit 213. In the usual video image-capturing, there is a time lag between "image-capturing" and "reproducing the image-captured picture" and, even when checking an image-captured picture immediately after image-capturing, a few seconds of time lag occurs. Consequently, by sequentially calculating the blur removal picture feature amounts from the image-captured data and registering them in the blur removal picture feature amount replacement table unit 213, the blur removal picture feature amount replacement table unit 213 can be prepared before starting the reproduction of the image-captured pictures. Even when it is assumed that all the operations of the table creating mode are not yet completed at the time when the reproduction instruction for the image-captured picture is generated, it is sufficient to double the speed at which the reproduction picture 207 is read from the recording medium unit 203, and execute the table creating mode and the correcting mode by time sharing. Since the processing for the table creating mode progresses faster than in the correcting mode by as much as the time lag between "image-capturing" and "reproducing the image-captured picture", the operation of the table creating mode is to be completed before this time-difference expires. Except for picture checking after image-capturing, there is generally some margin of time in the switching from the table creating mode to the correcting mode, and a frequent form of use is, for example, reproducing image-captured pictures of pictures that were image-captured while traveling, after returning home.

Furthermore, by using a non-volatile memory in which data is held even after power to the image-capturing, recording and reproducing apparatus 200 is cut off, for the blur removal picture feature amount replacement table unit 213, re-registration in the blur removal picture feature amount replacement table unit 213 can be prevented. With this, after re-activating the image-capturing, recording and reproducing apparatus 200, the correcting mode can be executed immediately.

In addition, it is also possible to return the output (the output picture 102) of the output unit 115 to the recording medium unit 203, and write it into the recording medium unit 203. In this case, the recording medium unit 203 executes the reading of the reproduction picture 207 and the writing of the output picture 102 by time sharing. The output picture 102 is a picture on which blur removal and image blur correction have been performed and, when reproducing the output picture 102 written in the recording medium unit 203, there is no need to cause the operation of the correcting mode, and it is sufficient to output the output picture 102 directly to the outside of the image-capturing, recording and reproducing apparatus 200.

Figure 24:
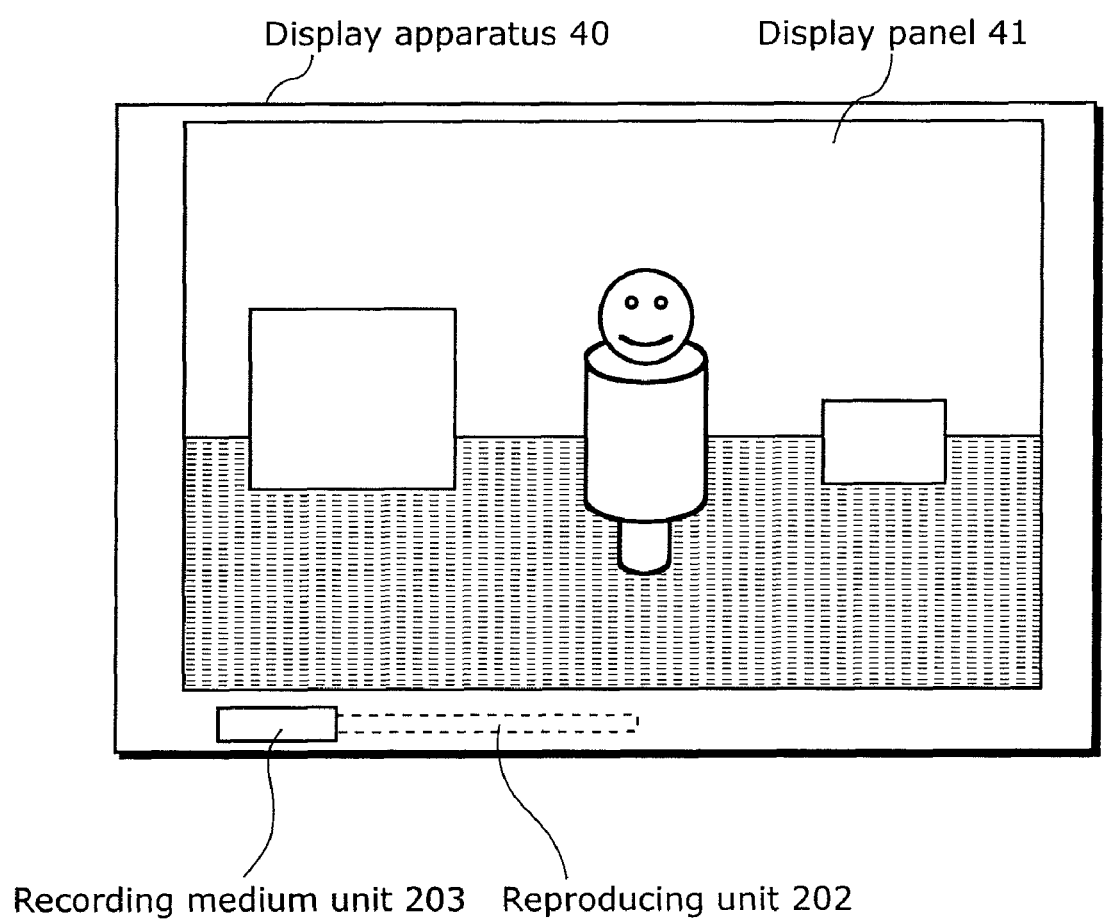
FIG. 24 is an external schematic diagram showing an example of a display apparatus having a built in reproducing unit.

It should be noted that the reproducing unit 202 may be built into the display apparatus 40. As shown in FIG. 24, a recording medium on which the input picture 117 and the blur detection information 119 are stored is used by being inserted into the recording medium unit 203 provided in the display apparatus 40. The reproducing unit 202 built into the display apparatus 40 generates the output picture 102 on which blur removal has been performed, and this is shown on a display panel 41.

As described above, with the image-capturing, recording and reproducing apparatus 200 in the present embodiment, it is possible to record images without image blur during the image-capturing of a sports scene in which movement of the subject is intense. Furthermore, blurring caused by camera motion can be removed, and even a user that is not used to camera image-capturing can freely image-capture video without worrying about image blur. In particular, by removing the recording media, the exchange of data with other devices becomes possible. Furthermore, the blur removal picture feature amount replacement table unit 213 can be created in the idle time from the end of image-capturing and before the start of reproduction, blur detection accuracy and blur-synthesizing accuracy can be increased, and thus the picture quality of the output picture 102 can be increased.

Third Embodiment

In the present embodiment, an image-capturing, recording and reproducing apparatus which executes blur removal according to an instruction received from the image-capturing person shall be described.

Figure 25:
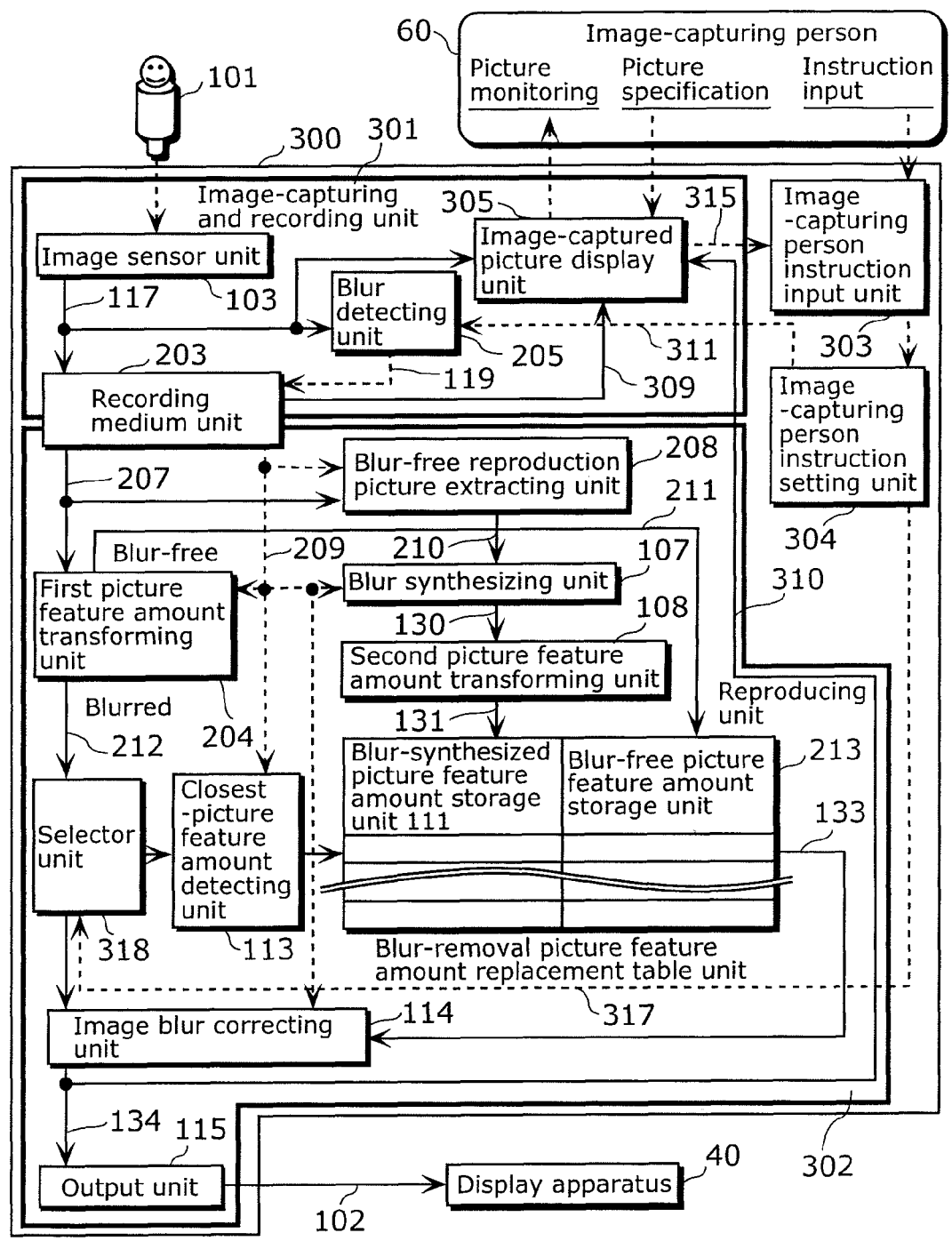
FIG. 25 is a block diagram showing the configuration of an image-capturing, recording and reproducing apparatus in the third embodiment of the present invention.

FIG. 25 is a block diagram showing the configuration of an image-capturing, recording and reproducing apparatus 300 according to the third embodiment of the present invention. It should be noted that the same reference numbers are assigned to parts which are the same as those in the image-capturing, recording and reproducing apparatus 200 shown in FIG. 20, and their detailed description shall be omitted.

The image-capturing, recording and reproducing apparatus 300 is an apparatus which image-captures a subject 101 in the form of video, removes blurring which occurs in the input picture 117, corrects image blur, and outputs the output picture 102 in the form of video. As shown in FIG. 25, the image-capturing, recording and reproducing apparatus 300 includes an image-capturing and recording unit 301 which image-captures the subject 101 and records the image-captured picture in a recording medium unit 203, a reproducing unit 302 which reproduces the images recorded in the recording medium unit 203 and outputs the reproduced output picture 102, an image-capturing person instruction input unit 303, and an image-capturing person instruction setting unit 304. The output picture 102 is shown, for example, on the display apparatus 40 connected to the image-capturing, recording and reproducing apparatus 300.

The image-capturing and recording unit 301 includes the image sensor unit 103, the recording medium unit 203, the blur detecting unit 205, and an image-captured picture display unit 305, and records the image-captured input picture 117 in the recording medium unit 203, together with the blur detection information 119 which includes blur presence/absence information indicating whether or not blurring has occurred, and blur position information indicating the position of pixels in which blurring has occurred.

The image-capturing person instruction input unit 303 accepts instructions for enabling/disabling blur removal, specifications for the blur removal region, and specifications for the blur-free region.

Figure 26:
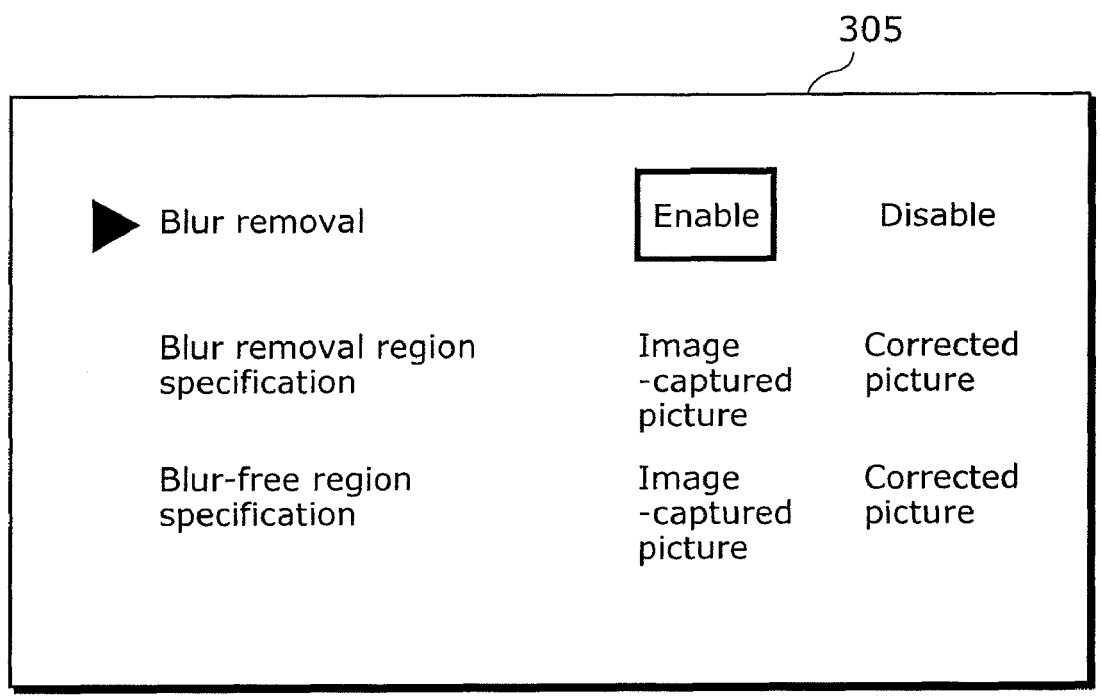
FIG. 26 is a diagram describing an on-screen display on which an image-capturing person inputs instructions.

FIG. 26 is a diagram describing an on-screen display with which the image-capturing person 60 inputs an instruction. The left side is the instruction menu. The "enable/disable blur removal" instruction menu is selected, and, in the example in FIG. 26, "enable" is selected. Buttons or dials included in the image-capturing, recording and reproducing apparatus 300 are used in the instruction menu selection. The image-captured picture display unit 305 is used for the on-screen display shown in FIG. 26, and is shared with the displaying of the image-captured pictures.

As an example of "disable" blur removal selection, there is the "panning shot". The panning shot is an image-capturing method in which a subject passing-by in front (for example, a vehicle moving at high-speed, a runner in a sports scene) is continuously kept in-frame by changing the orientation of the camera. In the case of such image-capturing method, in order to intentionally cause the occurrence of blurring and provide a sense of speed to the image-captured picture, it is necessary to disable the blur removal processing.

Figure 27:
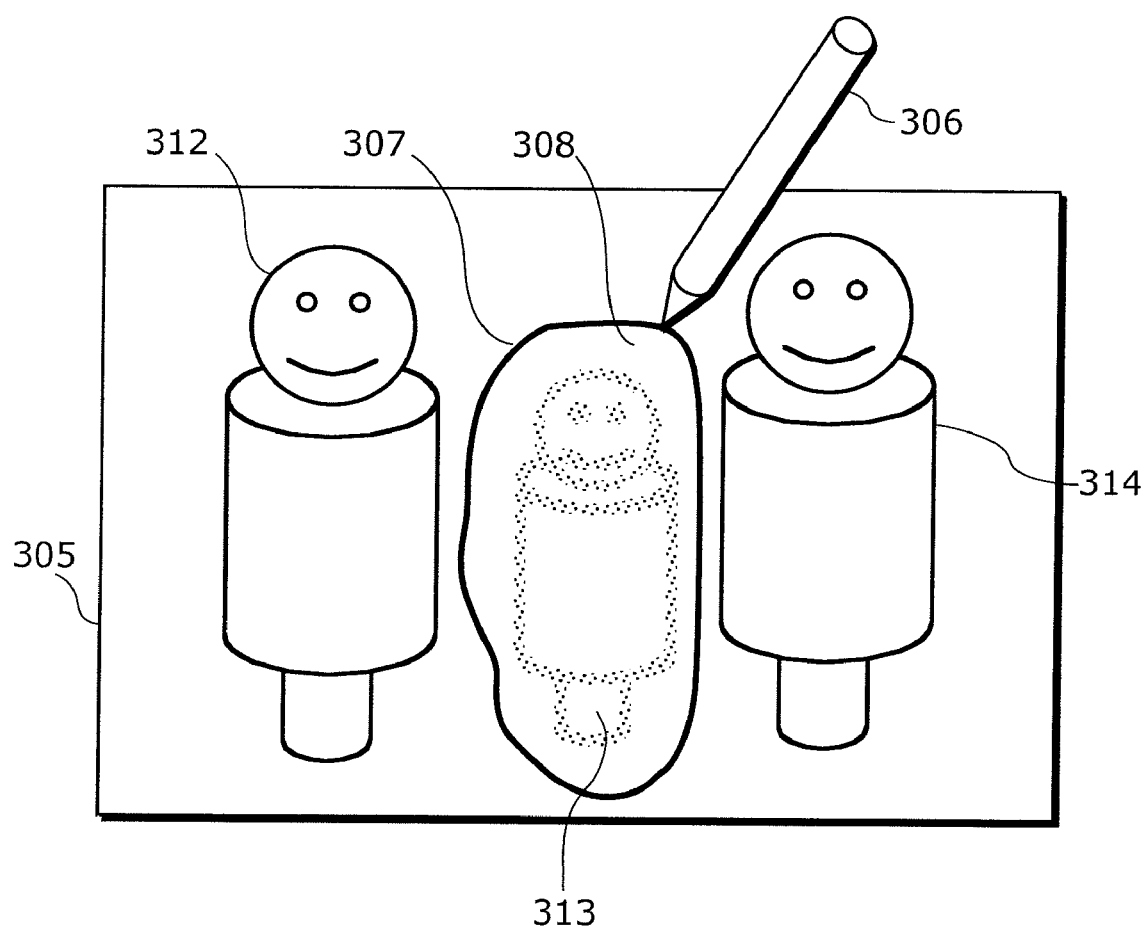
FIG. 27 is a diagram describing a method for specifying a blur removal region.

FIG. 27 is a diagram describing a method of specifying the blur removal region, and shows an example which presumes the case where, among a subject 312, a subject 313, and a subject 314, the subject 313 moves while the shutter is open and thus blurring occurs.

In the specifying of the blur removal region, the image-captured picture display unit 305 is used and, as shown in FIG. 27, a partial region of the input picture 117 or the reproduction picture 207 is specified. The image-capturing person 60 specifies, directly on the picture, the region to which the blur removal processing is to be applied. The image-captured picture display unit 305 is configured of a touch panel, and the image-capturing person 60 specifies a region 308 as the target region for blur removal, by drawing a curved line 307 using a pointing device 306 or by directly using the image-capturing person 60's finger. The blur removal target region is inputted to the image-capturing person instruction input unit 303 as a region identification signal 315, and blur removal is performed only on pixels belonging to the region 308.

When "image-captured picture" is selected in the specification of the blur removal region in FIG. 26, the input picture 117 recorded in the recording medium unit 203 is outputted to the image-captured picture display unit 305 via a path 309. The input picture 117 is a picture on which the blur removal processing has not been performed. Therefore, the "image-captured picture" is selected when, in executing blur removal from here onward, the image-capturing person 60 explicitly specifies the target on which blur removal is to be performed. In this case, the image-capturing person instruction input unit 303 outputs the region 308 as an image-capturing person specified blur signal 311 to the blur detecting unit 205, via the image-capturing person instruction setting unit 304 described later. The blur detecting unit 205 performs the blur detection processing only on the region 308 inputted as the image-capturing person specified blur signal 311.

On the other hand, when "corrected picture" is selected in the specification of the blur removal region, an image blur-corrected picture 134 on which blur removal and image blur correction has been performed is outputted to the image-captured picture display unit 305 via a path 310. The reproduction picture 207 is a picture on which blur removal and image blur correction has been performed. Therefore, the "corrected picture" is selected when the image-capturing person 60 specifies a portion for which blur removal is insufficient. In this case, the blur detecting unit 205 should update the setting for the blur detection by making use of the information regarding the region 308, and the image-capturing person instruction input unit 303 outputs the region 308 as an image-capturing person specified blur signal 311 to the blur detecting unit 205, via the image-capturing person instruction setting unit 304 described later. For example, when performing the threshold value processing for the distance change of the picture feature vectors shown in FIG. 6, the blur detecting unit 205 updates the setting so as to reduce the distance change threshold value for the region 308 inputted as the image-capturing person specified blur signal 311, and judge that blurring has occurred even with a smaller distance change.

The specification of the blur-free region is used in order to increase the blur detection accuracy of the blur detecting unit 205 by having the image-capturing person 60 look at the picture displayed on the image-captured picture display unit 305 and explicitly specify the blur-free region.

Figure 28:
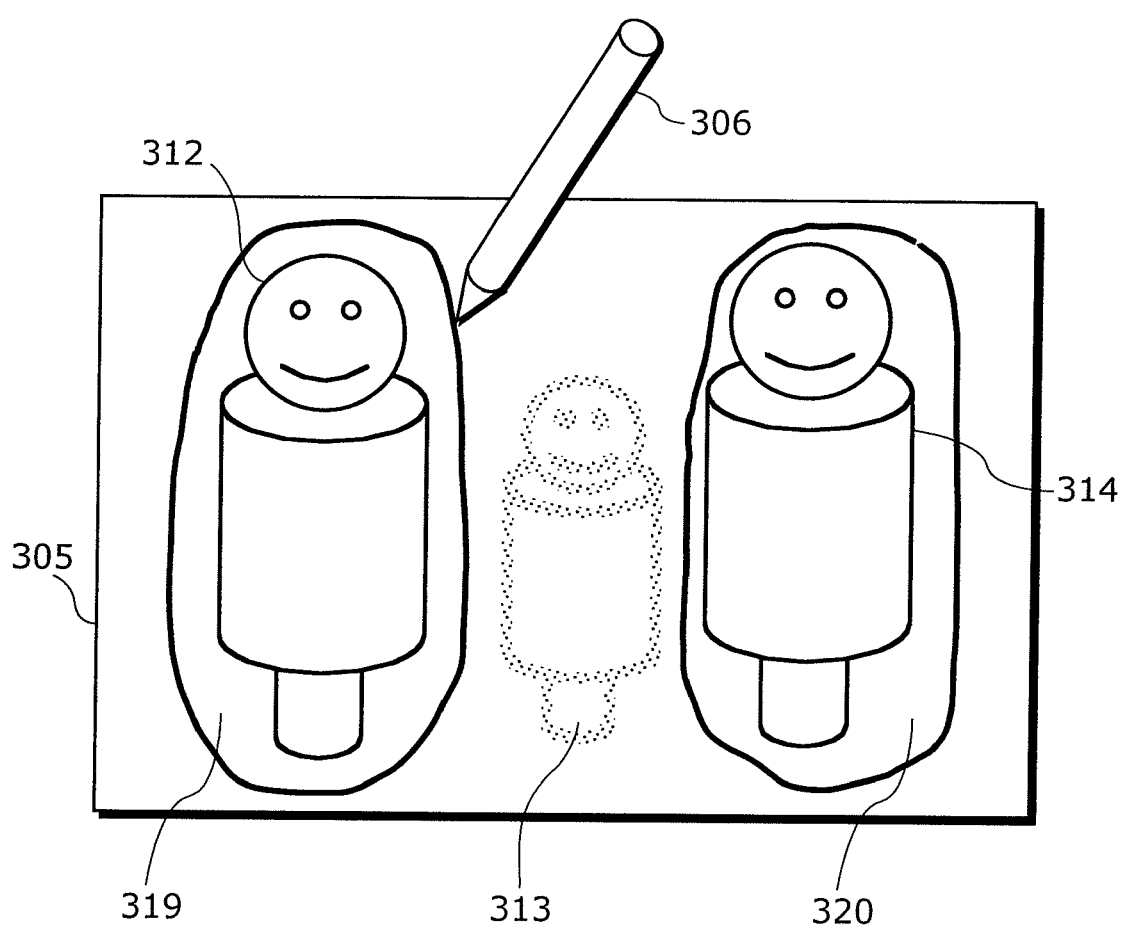
FIG. 28 is a diagram describing a method for specifying a blur-free region.

FIG. 28 is a diagram showing an example in which the blur-free region is specified, and the example presumes the case where, among a subject 312, a subject 313, and a subject 314, the subject 313 moves while the shutter is open and thus blurring occurs. Here, a region 319 enclosing the subject 312 and a region 320 enclosing the subject 314 are specified by the image-capturing person 60 as being blur-free. The blur removal target region excluding the blur-free regions (region 319 and region 320 in FIG. 28) is outputted to the image-capturing person instruction input unit 303 as a region identification signal 315, and blur removal is performed only on pixels belonging to the region excluding the blur-free regions.

When "image-captured picture" is selected in the specification of the blur-free region in FIG. 26, the input picture 117 recorded in the recording medium unit 203 is outputted to the image-captured picture display unit 305 via a path 309. The input picture 117 is a picture on which the blur removal processing has not been performed. Therefore, the "image-captured picture" is selected when, in executing blur removal from here onward, the image-capturing person 60 explicitly specifies the target on which blur removal will not be performed. Here, by specifying a predetermined region as blur-free, it is possible to cause the occurrence of blurring and obfuscation only within such region. In this case, the image-capturing person instruction input unit 303 outputs the blur-free region (region 319 and region 320 in FIG. 28) as a blur-free region signal 321 to the blur-free reproduction picture extracting unit 208, via the image-capturing person instruction setting unit 304. The blur-free reproduction picture extracting unit 208 outputs the region within the specified blur-free region as the blur-free reproduction picture 210.

On the other hand, when "corrected picture" is selected in the specification of the blur-free region, an image blur-corrected picture 134 on which blur removal and image blur correction has been performed is outputted to the image-captured picture display unit 305 via a path 310. The reproduction picture 207 is a picture on which blur removal and image blur correction has been performed. Therefore, the "corrected picture" is selected when the image-capturing person 60 specifies a portion for which blur removal is sufficient. In this case, in the blur removal picture feature amount replacement table unit 213, the picture feature amount of the region that is specified as blur-free is maintained as is, and is re-used in subsequent blur removal processing. The blur detecting unit 205 should update the setting for the blur detection by making use of the information regarding the region 308, and the image-capturing person instruction input unit 303 outputs the region excluding the blur-free region (region 319 and region 320 in FIG. 28) as an image-capturing person specified blur signal 311 to the blur detecting unit 205, via the image-capturing person instruction setting unit 304 described later. For example, when performing the threshold value processing for the distance change of the picture feature vectors shown in FIG. 6, the blur detecting unit 205 updates the setting so as to reduce the distance change threshold value for the region excluding the blur-free region, inputted as the image-capturing person specified blur signal 311, and judges that blurring has occurred even with a smaller distance change.

The image-capturing person instruction setting unit 304 deploys the instructions from the image-capturing person 60, accepted by the image-capturing person instruction input unit 303, to the respective modules of the image-capturing, recording and reproducing apparatus 300. The identification of the enabling/disabling of blur removal is conveyed from the image-capturing person instruction setting unit 304 to a selector unit 318, according to a blur removal identification signal 317. When enable is selected for the blur removal, the sector unit 318 outputs the reproduction picture feature amount 211 to the closest-picture feature amount detecting unit 113, and blur removal is executed using the blur removal picture feature amount replacement table unit 213. On the other hand, when disable is selected for the blur removal, the sector unit 318 outputs the reproduction picture feature amount 211 to the image blur correcting unit 114, and image blur correction is executed without performing the blur removal processing.

As described above, with the image-capturing, recording and reproducing apparatus 300 in the present embodiment, it is possible to record images without image blur during the image-capturing of a sports scene in which movement of the subject is intense. Furthermore, blurring caused by camera motion can be removed, and even a user that is not used to camera image-capturing can freely image-capture video without worrying about image blur. In particular, when intentional occurrence of blurring is desired such as in a panning shot, the image-capturing person can disable the blur removal processing, and thus enabling a wider range of image representation. Furthermore, when the image-capturing person judges that blurring still remains in a picture that has undergone blur removal, more accurate blur removal becomes possible through the direct specification, by the image-capturing person, of the region in which blurring remains and the region in which there is no occurrence of blurring.

Fourth Embodiment

In the present embodiment, an image-capturing, recording and reproducing apparatus which performs blur removal on a per picture basis, based on blur detection frequency shall be described.

Figure 29:
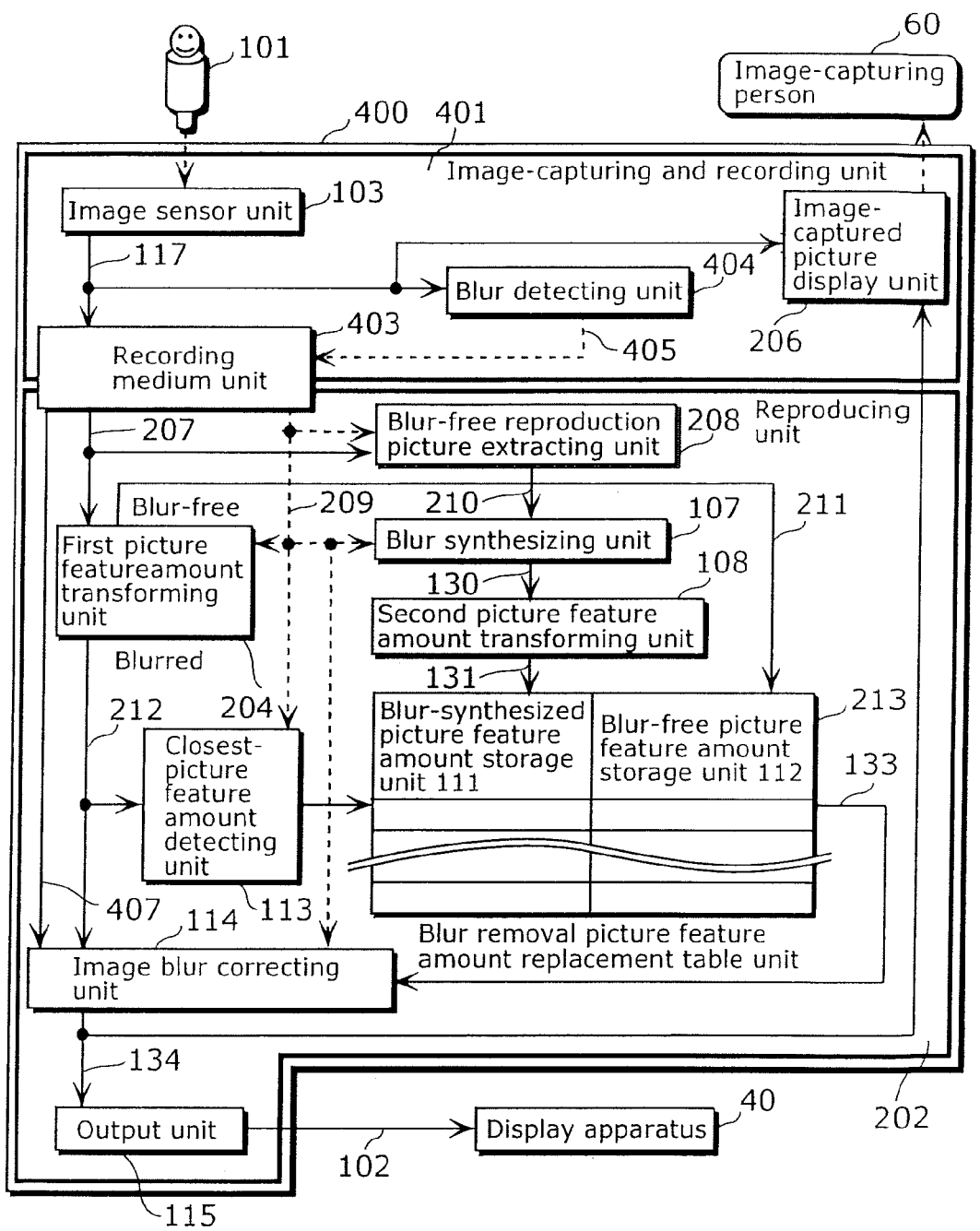
FIG. 29 is a block diagram showing the configuration of an image-capturing, recording and reproducing apparatus in a fourth embodiment of the present invention.

FIG. 29 is a block diagram showing the configuration of an image-capturing, recording and reproducing apparatus 400 according to the fourth embodiment of the present invention. It should be noted that the same reference numbers are assigned to parts which are the same as those in the image-capturing, recording and reproducing apparatus 200 shown in FIG. 20, and their detailed description shall be omitted.

As shown in FIG. 29, the image-capturing, recording and reproducing apparatus 400 is an apparatus which image-captures a subject 101 in the form of video, removes blurring which occurs in the input picture 117, corrects image blur, and outputs the output picture 102 in the form of video, and includes an image-capturing and recording unit 401 and a reproducing unit 402.

The image-capturing and recording unit 401 includes the image sensor unit 103, a blur detecting unit 404, a recording medium unit 403, and the image-captured picture display unit 206, and records the image-captured input picture 117 in the recording medium unit 203, together with the blur detection information 119 which includes blur presence/absence information indicating whether or not blurring has occurred, and blur position information indicating the position of pixels or blocks in which blurring has occurred.

The reproducing unit 402 reproduces the images recorded on the recording medium unit 403, and outputs the reproduced output picture 102. The output picture 102 is shown, for example, on the display apparatus 40 connected to the image-capturing, recording and reproducing apparatus 400.

The blur detecting unit 404 detects blurring using the same method as the blur detecting unit 105 shown in FIG. 6. In addition, the blur detecting unit 404 calculates blurring occurrence frequency on a per picture basis, judges that blurring has occurred uniformly over the entire picture when the calculated frequency exceeds an occurrence frequency threshold value, and replaces the blurred picture with a blur-free picture on a per picture basis instead of performing picture feature amount replacement on a per pixel or per block basis. The replacement on a per picture basis allows for faster processing than the picture feature amount replacement on a per pixel basis or a per block basis, and is more resistant to the effects of artifacts caused by picture feature amount replacement.

Figure 30:
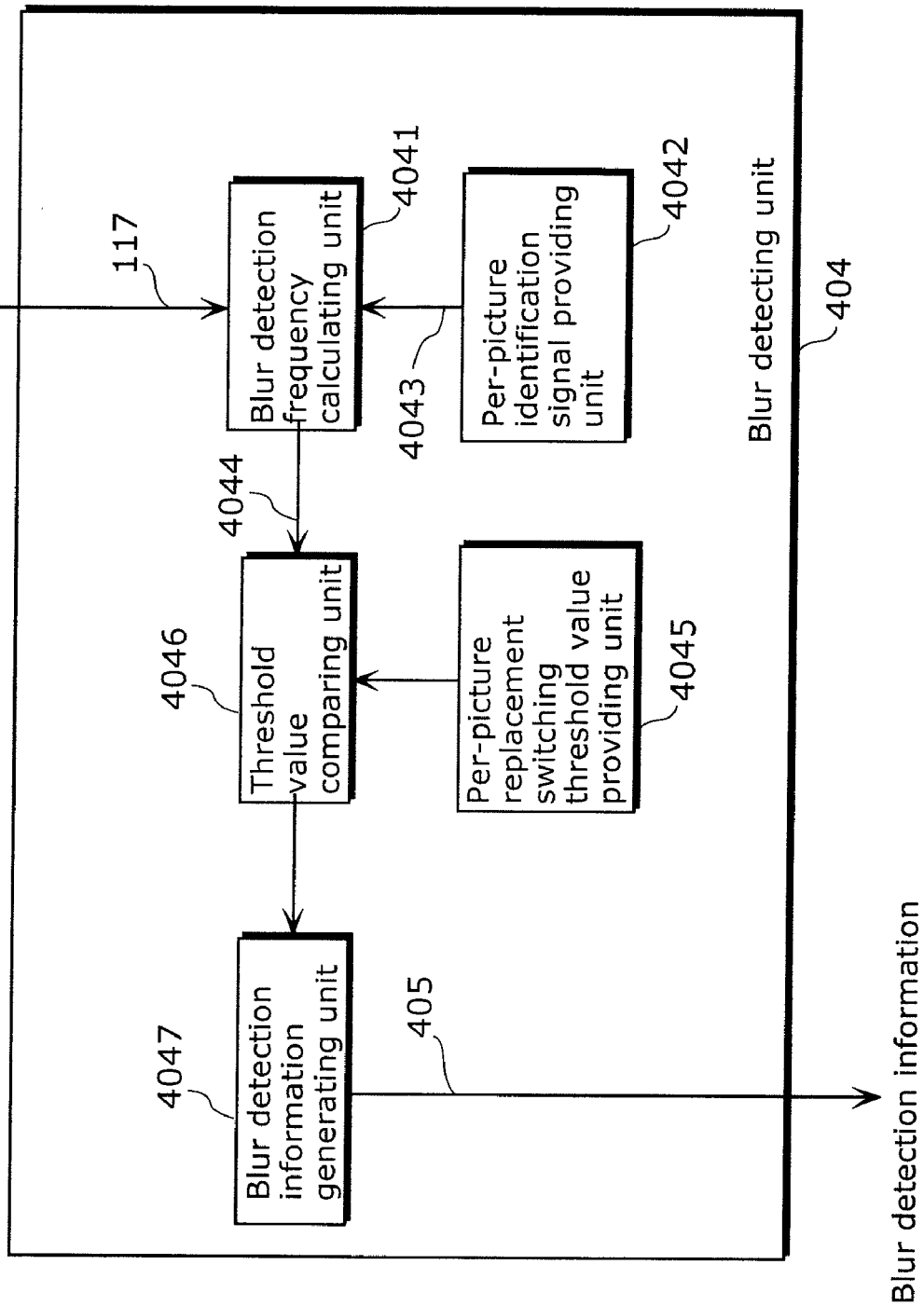
FIG. 30 is a block diagram showing an example of the internal configuration of a blur detecting unit.

FIG. 30 is a block diagram showing the internal configuration of the blur detecting unit 404. A blur detection frequency calculating unit 4041 counts the number of pixels or blocks in the input picture 117, in which blurring has occurred. Since the blurring detection frequency is calculated on a per picture basis, a per-picture identification signal 4043 indicating the first pixel and the last pixel of a picture data string is inputted to the blur detection frequency calculating unit 4041, from a per-picture identification signal providing unit 4042. The blur detection frequency calculating unit 4041 adopts, as the blur detection frequency, the ratio between the counted number of pixels in which blurring has occurred and the number of pixels in the entire picture or the ratio between the counted number of blocks in which blurring has occurred and the number of blocks in the entire picture, and outputs the blur detection frequency as a blur detection frequency signal 4044. A per-picture replacement switching threshold value providing unit 4045 provides, to a threshold value comparing unit 4046, a blur detecting frequency threshold value for switching from the replacement of picture feature values on a per pixel basis or a per block basis to the replacement of picture feature amounts on a per picture basis. When the blur detection frequency signal 4044 is greater than the threshold value provided by the per-picture replacement switching threshold value providing unit 4045, the threshold value comparing unit 4046 instructs the replacement of picture feature amounts on a per picture basis to a blur detection information generating unit 4047. The blur detection information generation unit 4047 writes bits which indicate the unit of replacement for the picture feature amounts, into blur detection information 405. For example, two bits are secured in order to indicate the unit of replacement for the picture feature amounts, and "00" denotes the per-pixel basis, "01" denotes the per-block basis, and "10" denotes the per-picture basis.

The recording medium unit 403 switches output destinations depending on whether the output is a blurred picture or a blur-free picture, in the same manner as the recording medium unit 203 in FIG. 20. In addition, when the blur detection information 405 specifies the per-picture basis ("10" in the above-described example) for the unit of replacement for the picture feature amounts, the blur-free picture is outputted to the image blur correcting unit 114 via a path 407. In the blur-free picture selection method, a past blur-free picture that is closest from the point where blurring occurred is selected as described in FIG. 6.

Accordingly, the replacement on a per picture basis allows for faster processing than the picture feature amount replacement on a per pixel basis or a per block basis, and is more resistant to the effects of artifacts caused by picture feature amount replacement.

Fifth Embodiment

In the present embodiment, an image-capturing, recording and reproducing apparatus which removes blurring by replacing picture feature amounts on a per picture basis when zoom factor is high shall be described.

Figure 31:
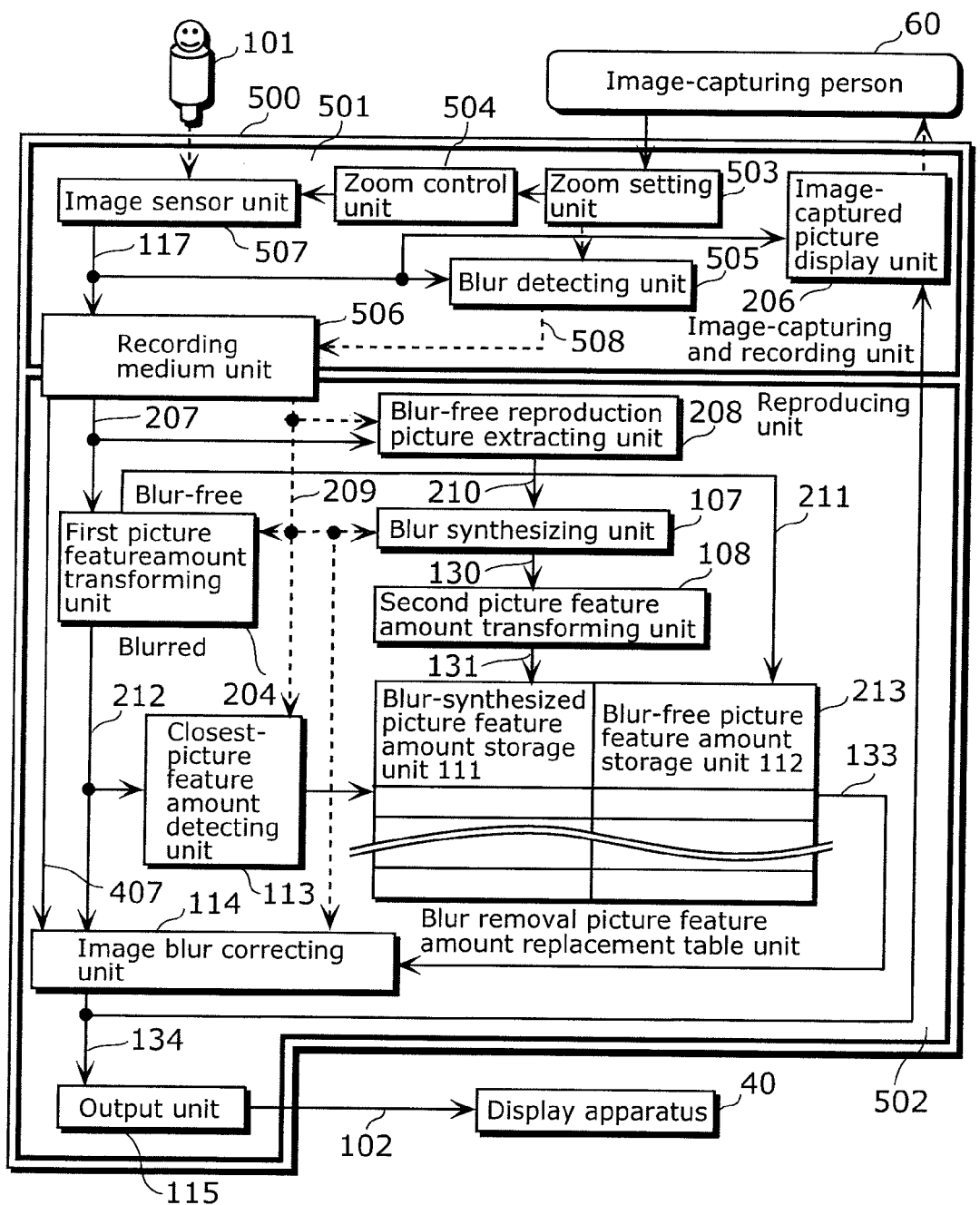
FIG. 31 is a block diagram showing the configuration of an image-capturing, recording and reproducing apparatus in a fifth embodiment of the present invention.

FIG. 31 is a block diagram showing the configuration of an image-capturing, recording and reproducing apparatus 500 according to the fifth embodiment of the present invention. It should be noted that the same reference numbers are assigned to parts which are the same as those in the image-capturing, recording and reproducing apparatus 200 shown in FIG. 20, and their detailed description shall be omitted.

The image-capturing, recording and reproducing apparatus 500 is an apparatus which image-captures a subject 101 in the form of video, removes blurring which occurs in the input picture 117, corrects image blur, and outputs the output picture 102 in the form of video. The image-capturing, recording and reproducing apparatus 500 includes an image-capturing and recording unit 501 which image-captures the subject 101 and records the image-captured picture in a recording medium unit 506, a reproducing unit 502 which reproduces the images recorded in the recording medium unit 506 and outputs the reproduced output picture 102, an image sensor unit 507, a zoom setting unit 503, a zoom control unit 504, and a blur detecting unit 505. The output picture 102 is shown, for example, on the display apparatus 40 connected to the image-capturing, recording and reproducing apparatus 500.

The image-capturing and recording unit 501 includes the image sensor unit 507, the zoom setting unit 503, the zoom control unit 504, the blur detecting unit 505, the recording medium unit 506, and the image-captured picture display unit 206. The image-capturing and recording unit 501 records the image-captured input picture 117 on the recording medium unit 506 together with blur detection information 508 including blur presence/absence information indicating whether or not blurring has occurred, and blur position information indicating the position of a pixel or block in which blurring has occurred.

The image sensor unit 507 can image-capture an enlarged picture with a relatively narrow angle of view or a reduced picture having a relatively wide angle of view, whose respective angles of view are controlled according to the zoom factor set by the image-capturing person 60 using the zoom setting unit 503. The present invention does not provide restrictions on the zoom method and it is possible to use an arbitrary method such as an optical zoom which changes the angle of view in the optical system, electronic zoom which changes the angle of view by image processing. The image-capturing person 60 can check the angle of view for image-capturing by looking at the image-captured picture display unit 206.

The zoom control unit 504 controls the image sensor unit 507 so that the zoom factor set by the zoom setting unit 503 is met.

The blur detecting unit 505 detects blurring using the same method as the blur detecting unit 105 described in FIG. 6, and obtains the zoom factor from the zoom setting unit 503 and switches the unit of replacement for the picture feature amounts according to the zoom factor. Specifically, since the angle of view becomes narrow when the zoom factor becomes high, the possibility for the occurrence of blurring increases. Furthermore, when the angle of view is narrow, the type of subject that can fit within the angle of view becomes limited, and the possibility that a flat subject will be reflected increases as compared to wide-angle image-capturing. Since blurring occurs uniformly in the entire frame when a flat subject is image-captured with the inclusion of blurring, picture feature amount replacement performed on either the per pixel basis or the per block basis achieves the same results. If this presumption is correct, rather than replacing picture feature amounts on a per pixel basis or a per block basis, collective replacement on a per picture basis is more efficient in terms of processing load. Replacing picture feature amounts on a per picture basis means, in other words, selecting one blur-free picture. Therefore, with replacement of picture feature amounts on a per picture basis, there is no concern about artifacts generated by the replacement of picture feature amounts on a per pixel basis or a per block basis, and reliability is also high in terms of picture quality.

Figure 32:
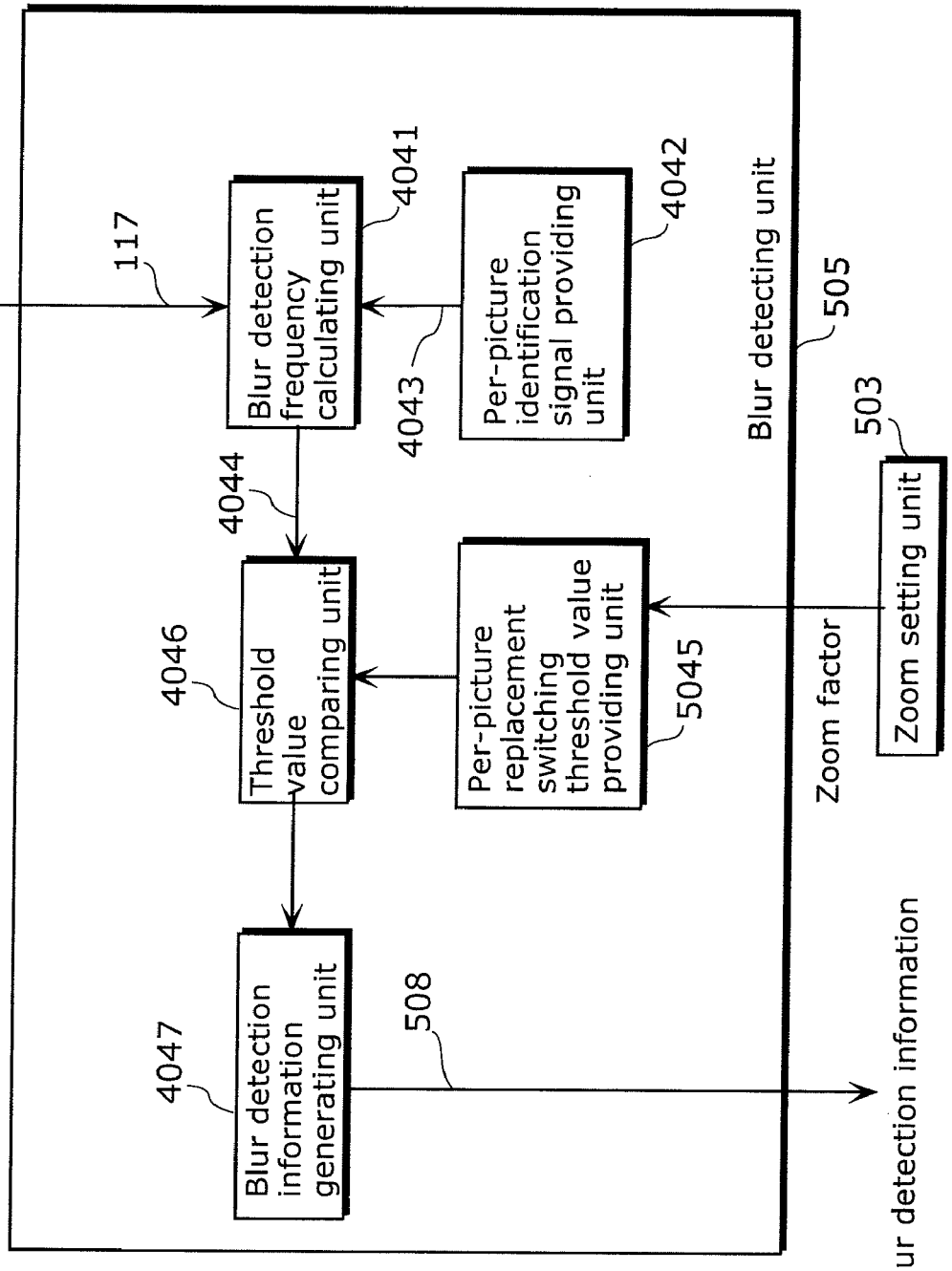
FIG. 32 is a block diagram showing an example of the internal configuration of a blur detecting unit.
Figure 33:
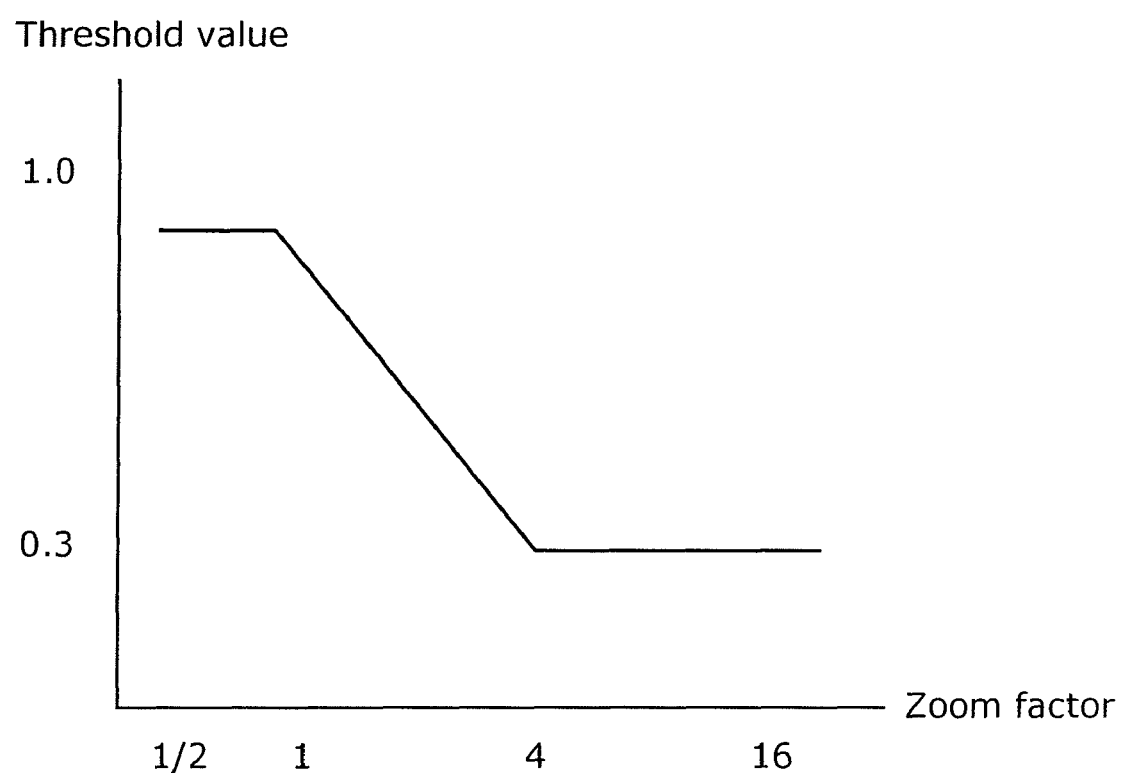
FIG. 33 is a diagram describing the adjustment of a threshold value according to a zoom factor.

Based on the aforementioned points of view, compared to the blur detecting unit 404, the blur detecting unit 505 is configured to allow the inputting of zoom factor, as shown in FIG. 32, and a per-picture replacement switching threshold value providing unit 5045 performs threshold value setting according to the zoom rate. Specifically, as shown in FIG. 33, when the zoom factor exceeds 4, and blur detection frequency is equal to or greater than 0.3 (pixels or blocks including blurring occupy 30 percent of the total number of pixels or total number of blocks) picture feature amounts are replaced on a per picture basis. Furthermore, when zoom factor falls below 1, and the blur detection frequency is equal to or greater than 0.9 (pixels or blocks including blurring occupy 90 percent of the total number of pixels or total number of blocks) picture feature amounts are replaced on a per picture basis.

Accordingly, by performing the replacement of picture feature amounts on a per picture basis during high-factor zoom image-capturing in which blur occurrence possibility increases, it is possible to reduce processing load, and generate high-quality blur-removed pictures having few artifacts.

Although the image-capturing apparatus and the image-capturing, recording and reproducing apparatus according to the present invention has been described thus far based on the first through fifth embodiments, the present invention is not limited to these embodiments. As long as they do on depart from the teachings of the present invention, modifications of the above-described embodiments and other embodiments implemented by arbitrarily combining the respective constituent elements in the first to third embodiments are intended to be included in the present invention.

Industrial Applicability

The image-capturing apparatus and the image-capturing, recording and reproducing apparatus according to the present invention can be implemented in video devices in general, such as a video movie camera, a television, a digital still camera equipped with a video image-capturing function, or a camera-equipped mobile phone. Furthermore, the image-capturing apparatus and the image-capturing, recording and reproducing apparatus according to the present invention can also be implemented in the widely popular personal computer.

The invention claimed is:

1. An image-capturing apparatus which corrects blurring that occurs in an image-captured picture, said image-capturing apparatus comprising:
   an image-capturing unit configured to image-capture pictures in video form;
   a blur detecting unit configured to detect occurrence of blurring in an image-captured picture that is image-captured by said image-capturing unit, and a temporal position at which the blurring has occurred;
   a blur synthesizing unit configured to generate blur-synthesized pictures by using blur-free image-captured pictures and a blurred image-captured picture, and synthesizing artificial blurring onto the blur-free image-captured pictures, the blur-free image-captured pictures being image-captured pictures in which the blurring is not detected by said blur detecting unit, and the blurred image-captured picture being a picture in which the blurring is detected;
   a picture feature amount transforming unit configured to transform each of the blur-free image-captured pictures, the blur-synthesized pictures, and the blurred image-captured picture into a picture feature amount; and a blur correcting unit configured to correct the blurring in the blurred image-captured picture by identifying a blur-synthesized picture having a picture feature amount that is most similar to the picture feature amount of the blurred image-captured picture and replacing the picture feature amount of the blurred image-captured picture with the picture feature amount of a blur-free image-captured picture corresponding temporally to the identified blur-synthesized picture, the identifying and replacing being performed for each of pixels or blocks in the temporal position at which the blurring is detected by said blur detecting unit, wherein the picture feature amount is a characteristic value reflecting a difference in a brightness value of a target pixel and its surrounding pixels.

2. The image-capturing apparatus according to claim 1, wherein said blur correcting unit includes:

a replacement table unit configured to generate a replacement table in which the picture feature amounts of the blur-synthesized pictures and the picture feature amounts of the blur-free image-captured pictures are associated with each other, each of the blur-synthesized pictures corresponding temporally to a corresponding one of the blur-free image-captured pictures; and a correcting unit configured to identify a blur-synthesized picture with a picture feature amount that is closest to the picture feature amount of the blurred image-captured picture by using the replacement table, and to replace the picture feature amount of the blurred image-captured picture with the picture feature amount of the blur-free image-captured picture corresponding temporally to the identified blur-synthesized picture.

3. The image-capturing apparatus according to claim 1, wherein said blur synthesizing unit is configured to generate each of the blur-synthesized pictures by detecting a motion of said image-capturing apparatus, creating a blur model which temporally interpolates between the blur-free image-captured picture and the blurred image-captured picture according to the motion of said image-capturing apparatus during a period between the blur-free image-captured picture and the blurred image-captured picture, and synthesizing the artificial blurring onto the blur-free image-captured picture using the created blur model.

4. The image-capturing apparatus according to claim 1, wherein said blur correcting unit is configured to separately execute a table generating mode in which a replacement table unit generates a replacement table, and a correcting mode in which said correcting unit corrects the blurring in the blurred image-captured picture using the replacement table.

5. The image-capturing apparatus according to claim 1, further comprising a storage unit configured to store the image-captured pictures that are image-captured by said image-capturing unit, together with blur detection information indicating the occurrence of the blurring detected by said blur detecting unit and a position at which the blurring has occurred, wherein said blur detecting unit, said blur synthesizing unit, and said picture feature amount transforming unit are each configured to read the pictures and the blur detecting information stored in the storage unit, and to perform processing on the read pictures.

6. The image-capturing apparatus according to claim 1, wherein said picture feature amount transforming unit is configured to transform each of the image-captured pictures that are image-captured by said image-capturing unit into a picture feature amount on a per pixel basis or a per block basis, and said blur detecting unit is configured to track similarity of the picture feature amounts of the image-captured pictures in chronological order, and to judge, when an amount of change in a picture feature amount exceeds a predetermined threshold value, that the blurring has occurred in a position of a pixel or a block of the picture feature amount that exceeded the threshold value.

7. The image-capturing apparatus according to claim 1, further comprising a temporary storage unit configured to temporarily store the blur-free image-captured pictures, wherein, when said blur detection unit detects the blurring, said blur synthesizing unit is configured to generate the blur-synthesized pictures by synthesizing the artificial blurring onto the blur-free image-captured pictures stored in said temporary storage unit.

8. The image-capturing apparatus according to claim 1, further comprising an instruction accepting unit configured to accept a selection for whether or not blur correction is to be performed, wherein said blur correcting unit is configured to correct the blurring in the blurred image-captured picture only when the selection to perform the blur correction is accepted by said instruction accepting unit.

9. The image-capturing apparatus according to claim 8, wherein said instruction accepting unit is further configured to accept a region on which the blur correction is to be performed, and said blur correcting unit is configured to correct the blurring in the burred image-captured picture only on the region on which the blur correction is to be performed accepted by said instruction accepting unit.

10. The image-capturing apparatus according to claim 8, wherein said instruction accepting unit is further configured to accept a region on which the blur correction is not to be performed, and said blur correcting unit is configured not to correct the blurring in the burred image-captured picture on the region on which the blur correction is not to be performed accepted by said instruction accepting unit.

11. The image-capturing apparatus according to claim 1, wherein said blur detection unit includes:

a blur detection frequency calculating unit configured to calculate a blur detection frequency within the blurred image-captured picture;

a threshold value comparing unit configured to judge whether to execute the replacement of the picture feature amounts for correcting the blurring, on a whole or part of the blurred image-captured picture, by comparing the blur detection frequency with a threshold value; and a blur detection information generating unit configured to add a unit of picture-feature-amount replacement to the blur detection information, based on a result of the judgment by said threshold value comparing unit, and when the blur detection information specifies replacement of the picture feature amounts on the whole of the blurred image-captured picture, the blurring is corrected by replacing the whole of the blurred image-captured picture with the blur-free image-captured picture instead of executing the replacement of the picture feature amounts.

12. The image-capturing apparatus according to claim 11, further comprising:

a zoom setting unit configured to set a zoom factor defining an angle of view for the image-capturing, wherein said threshold value comparing unit is configured to perform the judgment by comparing the blur detection frequency with the threshold value that is adjusted according to the zoom factor set by said zoom setting unit.

13. An image-capturing method of correcting blurring that occurs in an image-captured picture, said image-capturing method comprising:

image-capturing pictures in video form;

detecting occurrence of blurring in an image-captured picture that is image-captured in said image-capturing, and a temporal position at which the blurring has occurred;

generating blur-synthesized pictures by using blur-free image-captured pictures and a blurred image-captured picture, and synthesizing artificial blurring onto the blur-free image-captured pictures, the blur-free image-captured pictures being image-captured pictures in which the blurring is not detected in said detecting, and the blurred image-captured picture being a picture in which the blurring is detected;

transforming each of the blur-free image-captured pictures, the blur-synthesized pictures, and the blurred image-captured picture into a picture feature amount; and correcting the blurring in the blurred image-captured picture by identifying a blur-synthesized picture having a picture feature amount that is most similar to the picture feature amount of the blurred image-captured picture and replacing the picture feature amount of the blurred image-captured picture with the picture feature amount of a blur-free image-captured picture corresponding temporally to the identified blur-synthesized picture, the identifying and replacing being performed for each of pixels or blocks in the temporal position at which the blurring is detected in said detecting, wherein the picture feature amount is a characteristic value reflecting a difference in a brightness value of a target pixel and its surrounding pixels.

14. A non-transitory computer-readable medium storing a program for correcting blurring that occurs in an image-captured picture, said program causing a computer to execute:

image-capturing pictures in video form;

detecting occurrence of blurring in an image-captured picture that is image-captured in said image-capturing, and a temporal position at which the blurring has occurred;

generating blur-synthesized pictures by using blur-free image-captured pictures and a blurred image-captured picture, and synthesizing artificial blurring onto the blur-free image-captured pictures, the blur-free image-captured pictures being image-captured pictures in which the blurring is not detected in said detecting, and the blurred image-captured picture being a picture in which the blurring is detected;

transforming each of the blur-free image-captured pictures, the blur-synthesized pictures, and the blurred image-captured picture into a picture feature amount; and correcting the blurring in the blurred image-captured picture by identifying a blur-synthesized picture having a picture feature amount that is most similar to the picture feature amount of the blurred image-captured picture and replacing the picture feature amount of the blurred image-captured picture with the picture feature amount of a blur-free image-captured picture corresponding temporally to the identified blur-synthesized picture, the identifying and replacing being performed for each of pixels or blocks in the temporal position at which the blurring is detected in said detecting, wherein the picture feature amount is a characteristic value reflecting a difference in a brightness value of a target pixel and its surrounding pixels.

* * * * *